US012812468B2

(12) United States Patent
Katzav et al.

(10) Patent No.: US 12,812,468 B2
(45) Date of Patent: Nov. 24, 2026

(54) RAN CENTRALIZATION SOLUTION

(71) Applicant: Parallel Wireless, Inc., Nashua, NH (US)

(72) Inventors: Ofir Ben Ari Katzav, Zur Itshak (IL); Koby Shimonovich, Netivot (IL); Nadav Kaminsky, Ganei Tiqva (IL)

(73) Assignee: Parallel Wireless, Inc., Nashua, NH (US)

( * ) Notice: Subject to any disclaimer, the term of this patent is extended or adjusted under 35 U.S.C. 154(b) by 199 days.

(21) Appl. No.: 18/582,475

(22) Filed: Feb. 20, 2024

(65) Prior Publication Data

US 2025/0008374 A1 Jan. 2, 2025

Related U.S. Application Data

(60) Provisional application No. 63/551,873, filed on Feb. 22, 2024, provisional application No. 63/606,092, (Continued)

(51) Int. Cl.
*H04W 28/08* (2023.01)
*H04W 28/02* (2009.01)

(52) U.S. Cl.
CPC ....... *H04W 28/08* (2013.01); *H04W 28/0284* (2013.01); *H04W 28/0289* (2013.01)

(58) Field of Classification Search
CPC .... H04W 28/0284; H04W 2/89; H04W 28/08
See application file for complete search history.

(56) References Cited

U.S. PATENT DOCUMENTS

| | | | |
|---|---|---|---|
| 2007/0180302 A1 | 8/2007 | Allen et al. | |
| 2011/0267967 A1 | 11/2011 | Ratasuk et al. | |

(Continued)

FOREIGN PATENT DOCUMENTS

| | | |
|---|---|---|
| EP | 2753142 A1 | 7/2014 |
| EP | 3869847 A1 | 8/2021 |

(Continued)

OTHER PUBLICATIONS

Fuller: "LTE eNobeB MAC Scheduler Introduction", Roke Manor Research Limited, https://www.scribd.com/document/127516521/LTE-Scheduler (Year: 2009).

*Primary Examiner* — Brian P Cox
(74) *Attorney, Agent, or Firm* — Michael Y. Saji

(57) ABSTRACT

Generally, a combination of the following features are present to provide a centralization solution, in some embodiments: Latency compensation and auto-calibration of the delay between the PHY and the radio; Leveraging loopback in the radio (ORAN standard defined); Measurement based on air timing and/or RRH early/late feedbacks; and ability to understand routing changes and recalibrate latency compensation. In one embodiment, a method is provided for providing workload redundancy in a virtualized radio access network (RAN), comprising: distributing a baseband workload from a plurality of cells onto a first virtualized baseband unit (vBBU) at a centralized site; provisioning a second vBBU as a redundant vBBU for the plurality of cells; synchronizing state from the first vBBU to the second vBBU according to a first periodicity; performing failover from the first vBBU to the second vBBU at a first time; and adjusting an operating latency during the performed failover such that the plurality of cells continues operation without an interruption of service.

7 Claims, 51 Drawing Sheets

Related U.S. Application Data filed on Dec. 4, 2023, provisional application No. 63/499,239, filed on Apr. 30, 2023, provisional application No. 63/493,599, filed on Mar. 31, 2023, provisional application No. 63/487,245, filed on Feb. 27, 2023, provisional application No. 63/485,790, filed on Feb. 17, 2023, provisional application No. 63/484,485, filed on Feb. 11, 2023.

(56) References Cited

U.S. PATENT DOCUMENTS

| | | | | |
|---|---|---|---|---|
| 2015/0189550 | A1 | 7/2015 | Harrang | |
| 2017/0311183 | A1 * | 10/2017 | Cotanis | H04L 47/11 |
| 2018/0287696 | A1 | 10/2018 | Barbieri et al. | |
| 2020/0137594 | A1 * | 4/2020 | Notargiacomo | H04W 36/06 |
| 2020/0351650 | A1 | 11/2020 | Maria | |
| 2021/0037421 | A1 | 2/2021 | Allan | |
| 2021/0377801 | A1 | 12/2021 | Noriega | |
| 2022/0272594 | A1 | 8/2022 | Anderson et al. | |
| 2022/0417784 | A1 | 12/2022 | Bellamkonda et al. | |

FOREIGN PATENT DOCUMENTS

| | | | |
|---|---|---|---|
| WO | 2016004119 | A1 | 1/2016 |
| WO | 2023038692 | A1 | 3/2023 |

* cited by examiner

STANDARD NETWORK SEPARATED INTO CLUSTER

CONGESTED SITE REACHING THE THRESHOLD
AND ALERTING THE SON APP

WITH RAN CENTRALIZATION STEERING WILL
HAPPEN ACROSS THE ENTIRE CLUSTER

4000

4100

4300

4900

RAN CENTRALIZATION SOLUTION

CROSS-REFERENCE TO RELATED APPLICATIONS

The present application claims the benefit of priority under 35 U.S.C. § 119(e) to U.S. Provisional Patent Applications 63/499,239 "RAN Centralization Solution," 63/484,485 "Cluster level approach for RAN user scheduling," 63/485,790 "Dynamic latency compensation and packet security for RAN transport," 63/487,245 "Cluster level approach for RAN user scheduling," 63/493,599 "Cluster Level Approach for RAN Application Redundancy and Resiliency," 63/606,092 "RAN Centralization With Network Agility," and "63/551,873 RAN Centralization With Network Agility," each of which is hereby incorporated by reference in its entirety.

This application also hereby incorporates by reference in their entirety for all purposes the U.S. patent application, filed Feb. 11, 2023 under U.S. provisional patent application No. 63/484,485 and titled "Cluster level approach for RAN user scheduling"; the U.S. patent application, filed Feb. 17, 2023 under U.S. provisional patent application No. 63/485,790 and titled "Dynamic latency compensation and packet security for RAN transport"; the U.S. patent application, filed Feb. 24, 2023 under U.S. provisional patent application No. 63/486,943 and titled "Novel approach for high capacity, long range, wireless link with point to multipoint capabilities and embedded link security"; the U.S. patent application, filed Feb. 27, 2023 under U.S. provisional patent application No. 63/487,245 and titled "Cluster level approach for RAN user scheduling"; the U.S. patent application, filed Mar. 31, 2023 under U.S. provisional patent application No. 63/493,599 and titled "Cluster Level Approach for RAN Application Redundancy and Resiliency"; the U.S. patent application, filed Mar. 31, 2023 under U.S. provisional patent application No. 63/493,599 and titled "Cluster Level Approach for RAN Application Redundancy and Resiliency"; and the U.S. patent application, filed Apr. 7, 2023 under U.S. provisional patent application No. 63/494,900 and titled "UL Link Adaptation for Bandwidth Optimization". This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

A radio access network includes a radio head, preferably located at an elevated location; physical layer (PHY) processing for the base station to provide processing of the analog radio signals received at the base station, and a fronthaul connection between the radio and the PHY processing. In the prior art, these two are typically located at the same site, with processing typically being done in a compute cabinet at the foot of the tower where the radio head is mounted.

SUMMARY

Centralization is a term we are using to describe a bundle of technologies toward truly remote RRH—the ability to separate the RRH and DU and accommodate significant added latency without significant performance impact.

Generally, a combination of the following features are present to provide a centralization solution, in some embodiments: Latency compensation and auto-calibration of the delay between the PHY and the radio; Leveraging loopback in the radio (ORAN standard defined); Measurement based on air timing and/or RRH early/late feedbacks; and ability to understand routing changes and recalibrate latency compensation. This is not about requiring specific infrastructure type and works on fiber optics, copper, wireless.

Additionally, the following features may also be present that are enabled by the use of a centralized solution: cloud HW cluster; cluster level traffic steering and admission control; inter-site UL diversity, cluster level power efficiency, cross-site scheduling, multi-site carrier aggregation (CA). These features can provide highly advantageous deployment readiness, spectral efficiency and optimization, and cluster management features as well.

In one embodiment, a method is provided for providing workload redundancy in a virtualized radio access network (RAN), comprising: distributing a baseband workload from a plurality of cells onto a first virtualized baseband unit (vBBU) at a centralized site; provisioning a second vBBU as a redundant vBBU for the plurality of cells; synchronizing state from the first vBBU to the second vBBU according to a first periodicity; performing failover from the first vBBU to the second vBBU at a first time; and adjusting an operating latency during the performed failover such that the plurality of cells continues operation without an interruption of service.

The distributed baseband workload may include a PHY workload and a stack workload for each of the plurality of cells. Synchronizing state may further comprise synchronizing deltas. Synchronizing state may further comprise synchronizing at a 1 transport time interval (TTI) resolution. Adjusting an operating latency may further comprise adjusting one or more of: a transmission window; a delay adjustment; a number of processing units assigned to PHY processing; a number of processing units assigned to stack processing; performing load shedding; reducing supported multiple-in multiple-out (MIMO) layers; performing selective uplink control processing; increasing a number of retransmission; and changing a ratio of time allocated for stack processing versus PHY processing. The method may further comprise restoring service from the second vBBU to the first vBBU at a second time. The method may further comprise maintaining a redundant vBBU for a plurality of primary vBBUs.

DETAILED DESCRIPTION

RAN Centralization Solution (72812)

Figure 1:
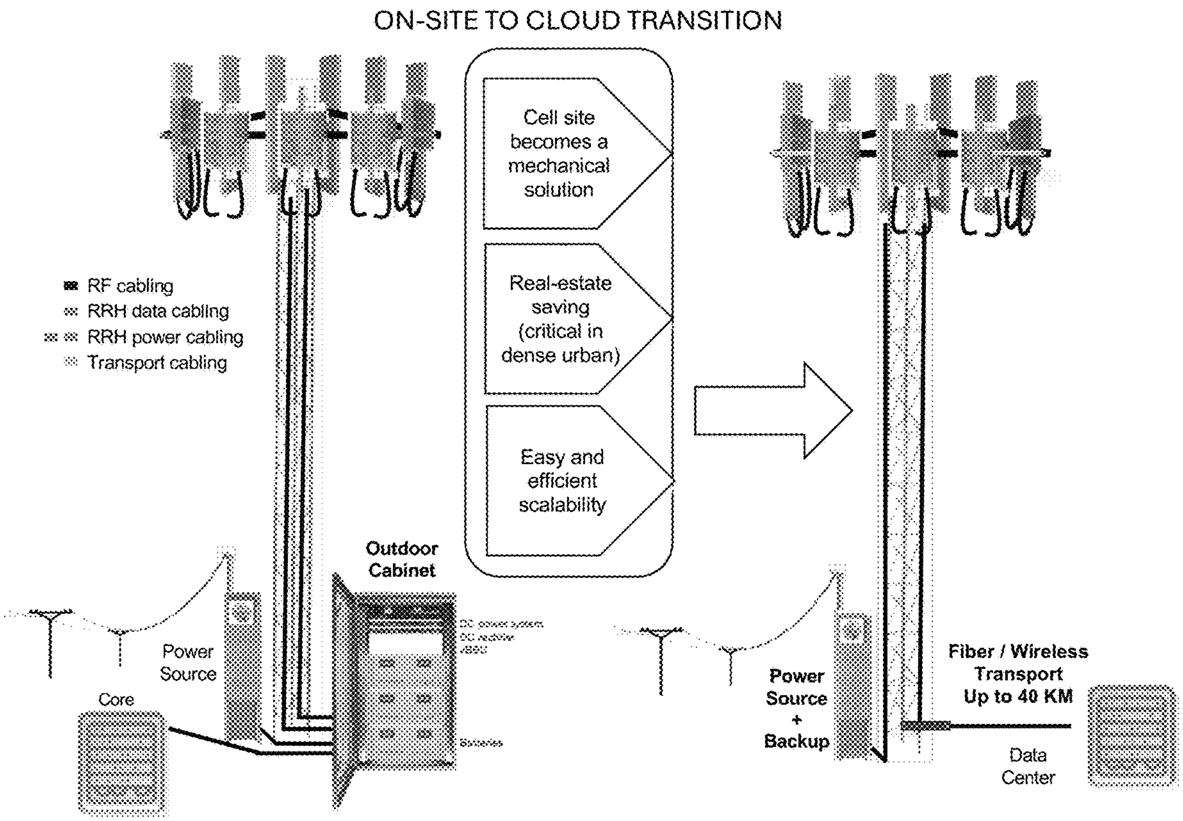
FIG. 1 is a schematic drawing of a cellular radio access network showing an on-site to cloud transition, in accordance with some embodiments.

Centralization is a term we are using to describe a bundle of technologies toward truly remote RRH—the ability to separate the RRH and DU and accommodate significant added latency without significant performance impact.

Generally, a combination of the following features are present to provide a centralization solution, in some embodiments: Latency compensation and auto-calibration of the delay between the PHY and the radio; Leveraging loopback in the radio (ORAN standard defined); Measurement based on air timing and/or RRH early/late feedbacks; and ability to understand routing changes and recalibrate latency compensation. This is not about requiring specific infrastructure type and works on fiber optics, copper, wireless.

Additionally, the following features may also be present that are enabled by the use of a centralized solution: cloud HW cluster; cluster level traffic steering and admission control; inter-site UL diversity, cluster level power efficiency, cross-site scheduling, multi-site carrier aggregation (CA). These features can provide highly advantageous deployment readiness, spectral efficiency and optimization, and cluster management features as well.

Latency compensation: Can be accommodated by PHY processing on expense of PHY timing budget and without further higher-level change to the system processing timing, in some embodiments. Can be accommodated by the stack processing-balancing the delay by taking from Stack processing time. Balance both in PHY and Stack—static balance or dynamic balance given the load on both PHY and Stack. (Stack may include MAC, RLC, PDCP, RRC in some embodiments.)

Wireless FH: Traditional wireless links are usually not high enough either in capacity or range. A favorable alternative to traditional wireless fronthaul is mmWave based point to multi point wireless link, which can generate very large capacity for reasonably large distances. This type of wireless can be enhanced with the following features. Point to multipoint: Can create a mesh like deployment with inherited redundancy links (see, e.g., US20170077979A1 and US20210297864A1, each hereby incorporated by reference). Simplifies the deployment-better than traditional point to point link. Advanced digital beam forming that can (with or without AI/ML) to perform the initial beam acquisition and moreover maintain tracking which is useful for non static end point. Done with commodity components on mm Wave standard outline from 5G—this means that the operator will be able to license that spectrum more easily and will be in less competition (compared to Microwave) on link licenses/capacity. Another approach that can be used is laser based link—there are suitable interoperable solutions already with very short distances.

M-Plane/u-Plane security with long reach fronthaul: RU-DU long distance separation means that there is a link (the fronthaul) which is now passing in non-secured areas. There are few cyber attack concerns with this approach and proper solution per each: Attack of MGMT plane to gain control or disturb RRH configurations—this can be easily accommodated with basic or advanced IP link security.

Man in the middle attack means that one is listening to the medium between the RRU and the DU (which are now separated) and can extract the data on the link, distort it or inject alternate data stream. A common (somewhat overkill approach) for that is to allow IPSEC link between the two as usually done over the backhaul in the distributed architecture. Less demanding approach is to take simple error correction approach which can prevent alternative data injection and identify also data distortion. Various approaches are suitable as long as the selected error correction and identification approach is simple yet not trivial and usually implemented by dedicated HW block. Important note: the security measures taken for the data over the long fronthaul link can also mitigate link errors when done wirelessly.

2G full centralization: 2G can stretch the delay to equivalent to 150 KM (750 uSec) without any performance hit. Above this latency is also possible with more tweaking to the PHY and Stack. Full centralization of the RAN to a central virtual node allows the customer to load balance the 2G cells, co-process the 2G signals and balance resources (=customer investment) between legacy tech to new ones, with partial centralization allowing for a portion of these advantages. Gain future agility/elasticity of data center resources. With co-processing between 2G and 4G on the data center one can implement DSS approaches more easily. Centralization can also monitor and navigate UEs better between the legacy tech and the new one (e.g. 4G). Combination of 2G and truly remote RRH can (with some constraints) to work based on high latency wireless link like Microwave/vSAT.

Centralization creates new and improved approaches for RAN service redundancy. Full centralization, as well as partial centralization to some extent, redefines the SW application architecture is a sense that a per cell or site functionality is not becoming a generic service to cluster level (e.g. transport/HW acceleration/data or control aggregators/etc.). On the other side, the RAN SW applications (e.g. PHY or Stack) can be kept in the same sizing and functionality as cell site application as well as being redesigned to functional blocks (e.g. PDCP/scheduler/RACH) being a service for multiple (many cells or many sites). The latter can be implemented using microservices. This means that there are very small and efficient functions being operated independently and without mutual dependency so if one fails, rest can continue their normal operation. With full RAN centralization, basic RAN functionalities can be ramped and jointly provide the cluster level RAN service. In either approach (scaling up existing applications to many centralized cells, and, the RAN service broken to RAN functionalities as "micro services"), the centralized solution allows one to create new redundancy approaches which can be at the functionality level up to the full application level. This can be achieved by having active-idle or active-active relationship with backup application that can instantaneously get to be operational if the previously operational one crashed for some reason. Similarly, it is a given that in many applications, (both in app scaling and functionality micro services), an option to do a "hot swap" of the application serving the users to a different one without impact on performance—example: assuming one stack application is crashing and its data bases are available for other Stack applications, given proper control functions, one (or more) of the other Stacks can take over the data base of the Stack that crashed and serve its users with zero service interruption.

Multi-site/multi-RRH improvements of cluster level management/optimization and increase spectral efficiency (cell capacity) are contemplated. Interference leverage instead of mitigation. LIIII. RAN functions/applications running jointly on same HW open the opportunity to share data streams/points between different functions easily, e.g., as shared memory approach (as well as via other options to share the data efficiently); this means that shared data bases down to the IQ-samples level sharing is now possible without the excessive overhead of the distributed approach. In the distributed approach, the data exchange was mainly done with X2 interface between the eNBs (sites)—this is higher functionality interface. In order to do joint processing in the PHY level, and excessive amount of data needed to be exchanged which made that approach less viable.

Data sharing between sites and the ability to jointly process it makes the deployment to have the ability to be distributed macro grade antennas system which now there is a greater spatial diversity created by having ×2-4× the number of antennas.

In common deployments (urban), the multi-site cluster have overlapping coverage areas of 30-50% (rough number). Traditionally, these areas are considered as interference areas in which the overlapping cells need to accommodate the interface (using ICIC approaches for example). When the overlapping cells running in centralized architecture, there are new possibilities, some known from literature, some previously not feasible due to the distributed architecture nature.

Stack level: Cluster level, or at least multi-site scheduling allowing the cluster to minimize interference of the network just by more intelligent scheduling such that highly interfering UE will be scheduled in RBs/time that minimize the scheduling to the other UEs on neighbor sites. Cluster can share side information between cells such that link adaptation algorithms can boost/reduce a specific UE link parameters not only to get that UE to have proper data link but also to minimize (reduce) or overcome (boost) link parameters—this can be more easily understood if we assume that all UE locations are well known including the air channel conditions between each UE to each cell in the surrounding. With this level of data, and without any compute limitations, one can get to the optimal scheduling.

Multi-site CA—given the fact that the protocol Stack application(s) is co-running on single machine, the holistic Stack entity can now control and exchange data with each cell/site PHYs (true for full centralization as well as mini-DU approach). This means that UE that got poorer service than possible or even without CA given its link conditions is now able to get CA with higher TPT by doing the transaction with multiple sites. That can potentially increase the "CA coverage area" compared to single site (=sector) CA. This may mean greater CA abilities in the inter-sector zone. Some of the actions that became possible with only using the RIC are now possible in the Stack(s) level without the RIC involvement.

PHY level: With access to the raw data as well as the processed data in the signal processing lineup coming from each antenna/cell, each PHY can now leverage neighbors PHY data. This allows what is commonly known as joint processing although this doesn't mean that's all the PHYs are single entity. More efficiently, each PHY will be able to get the data and processed information from other PHY.

This joint processing allowing the PHY to gain in multiple fronts: UL diversity which was commonly activated per cell (RRH) can be now activated cross cells (RRHs) from different sites have the same coverage area-doubling the amount of RRHs (or more accurately, antennas) resulting with 3 dB (2×) improvement in SINR which makes the link conditions much better. One shall note that the common overlapping areas are not cell-center but are the locations between cells (what is commonly called cell-edge)-those Ues in the overlapping area can enjoy the additional 3 dB improvement and maintain better link conditions than before. DL MU-MIMO with 4×4 RRHs becomes more viable-we saw that 4×4 MU-MIMO may be beneficial for overall network TPT. It was also evident that 8×8 capable RRH will allow extracting full gain from DLMU-MIMO. This kind of RRHs is commonly more expensive and require network upgrade to such capability. With the centralization approach (and assuming different RRHs in the network can be synced properly enough) we can generate the DL-MU-MIMO scenarios between neighboring sites without changing much in the network building blocks. DL-MU-MIMO can increase network capacity by about 50%. Interference can now be leveraged to gain more spectral efficiency—this means that overlapping service area can be managed as areas where there are more than single RRH there (hence enjoying from many more antennas that can collaborate)—the above examples are ways to leverage that. Another approach is iterative joint decoding—this means that with UL data decoding iterations, the jointly processed data can improve overtime while cleaning signals that are considered as interference and then process the cleaner version of the interfered data (like removing layers of interference from the signal and getting improved SINR each time)—this is similar to dirty paper coding approach but with different meaning of decoding the UE data fully. Mesh experience becomes possible—assuming 2 neighboring sites are capable of joint processing. The UE can now be served by first base station and while it moved toward the second base station the service continuity can be as if there was no HO process—this means that the UE context and the needed data for HO is transparent to the base station entities which the actual physical antenna that is communicating with the UE over the RF medium is changing as function of UE location. The idea is the Stack entities are somewhat disconnected/flexible from the physical RRH/antenna layout—this means that there are 2 layers of the network, one is the physical one and the second is the SW service one which needs to be detached as possible from the physical layout.

Compute resource balancing for cluster level peal (instead of cell site): With full centralization, the amount of compute resources allocated per site doesn't require to accommodate site peak scenario any longer, instead, the allocation is given for multi-site cluster. In such case, the total peak load (hence the total compute allocation) is less than sum of peaks when considering the distributed approach. This means that one can and shall allocate much less resources for the cluster level in centralization-our prediction is close to 50% reduction in CPU allocation.

We can consider separate PHY and Stack CPU allocation (as in today) and there consider the savings for each one of them separately. Alternatively, we can build the centralized solution in a way that there will be vertical optimization (meaning the overall processing of both the PHY and Stack are well balanced all together (sharing resources between PHY and Stack) as well as horizontal optimization (meaning, different PHYs are sharing same resources together)—both approached together will enable improved or optimal core allocation.

With full centralization, PHY shall now act as a big inline/look aside HW accelerator that can accommodate 10's-100's of sites. Building such accelerator will make the PHY processing of a full cluster to be as compute efficient as possible. In general this approach may consider SW level flexibility and very high scalability to be able to answer the requirements and allow the benefits of the centralization.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

In some embodiments, one or more network functions as described herein may be provided by virtualized servers, which may be provided using containerization technology. Containers decouple applications from underlying host infrastructure. This makes deployment easier in different cloud or OS environments. A container image is a ready-to-run software package, containing everything needed to run an application: the code and any runtime it requires, application and system libraries, and default values for any essential settings. Containers may include the use of Kubernetes or other container runtimes.

In Kubernetes, A pod (as in a pod of whales or pea pod) is a group of one or more containers, with shared storage and network resources, and a specification for how to run the containers. A Pod's contents are always co-located and co-scheduled, and run in a shared context. A Pod models an application-specific "logical host": it contains one or more application containers which are relatively tightly coupled. In non-cloud contexts, applications executed on the same physical or virtual machine are analogous to cloud applications executed on the same logical host. Pods are configured in Kubernetes using YAML files.

For example, a controller for a given resource provided using containers handles replication and rollout and automatic healing in case of Pod failure. For example, if a Node fails, a controller notices that Pods on that Node have stopped working and creates a replacement Pod. The scheduler places the replacement Pod onto a healthy Node.

The use of containerized technologies is rapidly spreading for providing 5G core (5GC) technologies. The present disclosure is deployed using containerized technologies, in some embodiments.

In some embodiments, the use of long distance fiber (up to and exceeding 40 km) can enable high-speed, low-latency fronthaul to facilitate centralized deployments, in accordance with the present disclosure. FIG. 1 is a schematic drawing of a cellular radio access network showing an on-site to cloud transition, in accordance with some embodiments. On the left, a prior art cellular radio access network is shown. A power source and a core network are shown connected to an outdoor cabinet, which in turn contains a DC power switch, a DC rectifier, and a vBBU, along with batteries. The outdoor cabinet is at the base of a tower, and wires connect the outdoor cabinet to radio elements at the top of the tower.

Continuing on, on the right, an on-site to cloud transition is shown, with the advantages that: the cell site becomes a mechanical solution; real estate saving is provided, which is critical in dense urban; and easy and efficient scalability is provided. The power source is no longer coupled to the outdoor cabinet but connects directly to the radio elements on the tower. As well, fiber/wireless transport of up to 40 km is shown, directly connecting the radio elements on the tower to a data center.

When on-site compute in an outdoor cabinet is moved up to 40 km away using fiber or wireless fronthaul transport, the cell site becomes more flexible as it becomes primarily a mechanical solution, and also realizes savings in real estate, critical in dense urban, and with easy and efficient scalability.

Figure 2:
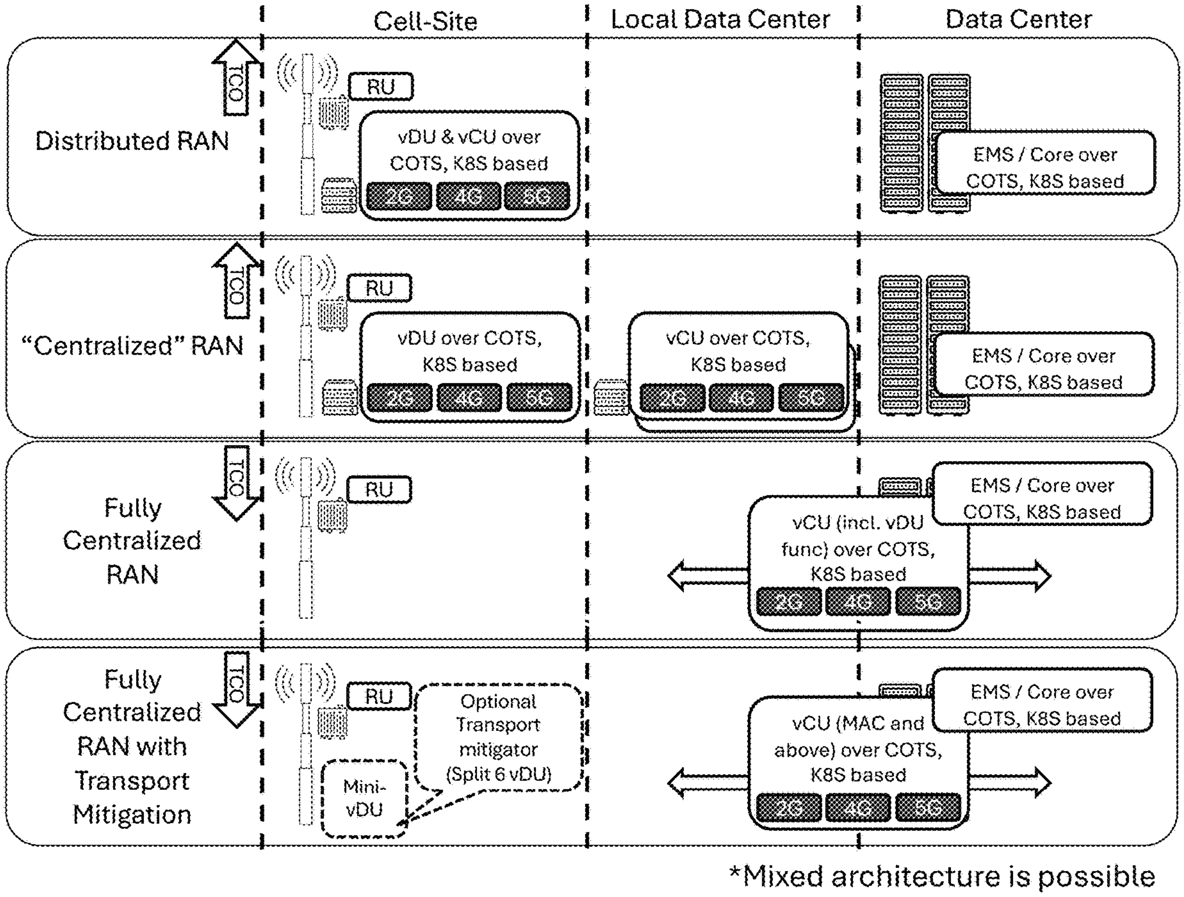
FIG. 2 is a further schematic drawing of a cellular radio access network showing an on-site to cloud transition, in accordance with some embodiments.

FIG. 2 is a further schematic drawing of a cellular radio access network showing an on-site to cloud transition, in accordance with some embodiments. Four layers are shown schematically, depicting different scenarios, from more distributed to more centralized: distributed RAN; "Centralized" RAN; fully centralized RAN; and fully centralized RAN with transport mitigation. Different impacts are shown for each layer, for each of: the cell site; the local data center; and the data center (which is a more remotely located data center than the local data center). A mixed architecture is also possible, mixing elements of these four schematic layers.

Distributed RAN, which is the traditional deployment scenario with equipment loaded cell-site, requires site level operation & performance management, and is limited to site level performance. "Centralized" RAN or C-RAN, evolved to relax compute burden from the cell site, is still typically limited to site level operation & performance management and site level performance. Herein described is another concept for centralized RAN, up to and including fully centralized. Characteristics include a 'Mechanical' cell-site-easier to maintain; Full RAN on any data center hierarchy; and lowest TCO (total cost of ownership) due to increased degrees of freedom created by full centralization, one BBU serving many sites; cluster level performance management & network optimization, with the tradeoff being increased complexity on transport.

A centralized approach has several advantages. Deployment referred as cluster as opposed to site in the traditional approach. This is CAPEX/OPEX saving. Resource sharing cross site leading to overall more efficient footprint (e.g. compute power is predicted to be reduced). Higher agility and greater future proofing are provided, as this solution is easier to maintain/upgrade/modify, easier to change technology, open for multi-vendor solution if required, with improved SLA. Advanced features becomes more appealing (e.g. full COMP, multi-site CA, multi-site MU-MIMO)-leveraging PHY processing on same machine/data center instead of distributed at cell-sites-increasing spectral efficiency. Cluster level optimizations yield better result than cell site level (e.g. power consumption optimization of BBU/DU). No need to account for cell-site peak in site planning, RAN centralization dynamically handle site's peak on less accumulative resources. RAN HW acceleration approach becomes more cost effective. As well, Cell site real-estate saving by eliminating cell site BBUs and reduced power backup footprint; Cell site operation relaxed by easier installation and maintenance; lower skillset is enough.

Figure 3:
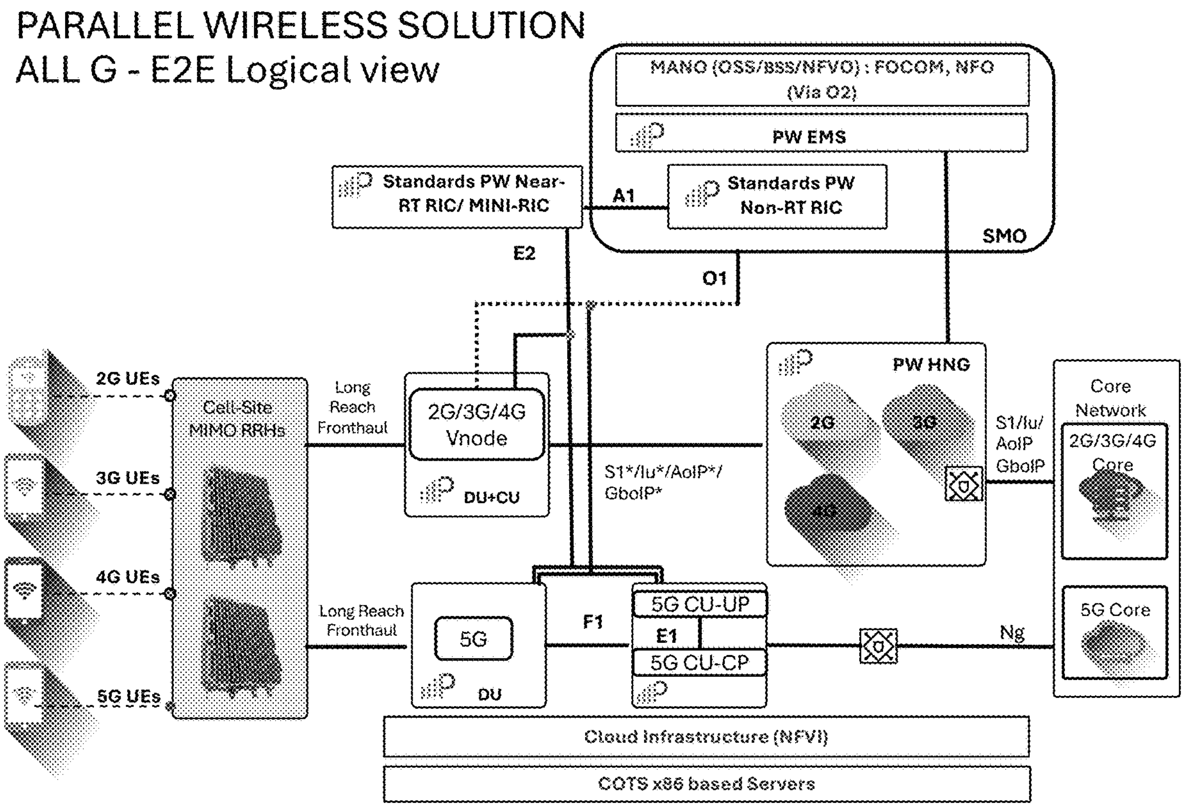
FIG. 3 is a schematic drawing of a cellular network architecture, in accordance with some embodiments.

FIG. 3 is a schematic drawing of a cellular network architecture, in accordance with some embodiments. An All-G architecture is shown handling 2G, 3G, 4G, and 5G UEs, along with various 5G network components and elements. The network elements shown are used to support each of the Gs. The network elements are shown as running on a cloud infrastructure, which may include NFVI or containers, and runs on COTS x86 servers (or other non-x86 servers). Fully Centralized RAN with Transport Mitigation involves a 'Mechanical' cell-site with very small compute platform; Cluster level performance management & network optimization excluding PHY joint processing; Relaxed transport complexity; RAN (MAC and above) on any data center hierarchy. In full centralization, transport layer needs to carry more traffic and stricter on latency. In some embodiments leveraging fiber optic where available; introduction of high capacity, long (enough) distance wireless transport options; and latency mitigation implemented on the RAN side including management of latency dynamics when required, enables centralization. In some embodiments, a mixed architecture (centralized and not centralized) possible where transport challenge can't be accommodated with some erosion to centralization gain.

FIG. 3 is a schematic diagram of a multi-RAT (radio access technology) core network for use with a centralized RAN, in accordance with some embodiments and as is further described elsewhere herein and in the documents incorporated by reference.

Open RAN is the movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Below is the Open RAN architecture as defined by ORAN alliance.

CU function is split into CU-CP (Control Plane) and CU-UP (User Plane) function to provide Control and User Plane separation. Open RAN solution needs to support: Open Interfaces between different functions; Software based functions; Cloud Native functions; Intelligence support via support for xApps/rApps; 3rd Party RRHs; Disaggregated functions; White Box COTS hardware support; and Data Path separated from Control plane traffic.

Abbreviations used in this disclosure: CU-CP: This node handles RRC and the control plane part of the PDCP protocol. This node communicates with DU over F1-C interface and with CU-UP over E1 interface as defined in 3GPP specifications. CU-UP/s: This node handles user plane part of PDCP protocol and SDAP protocol. It communicates with CU-CP over E1 interface and with DU over F1-U interface. SMO (Service management and orchestration): control of infra structure component like CPU/Memory and scale up and scale down operations. FCAPS (Fault, Configuration, Security, Performance, Accounting) management of Open-RAN elements (gNB-CU-CP, gNB-CU-UP, gNB-DU). AMF/SMF: 3GPP defined 5G core network element for control signaling. UPF: 3GPP defined 5G core network element for data-plane traffic. DU (gNB-DU): 3GPP defined 5G access network element.

Figure 39:
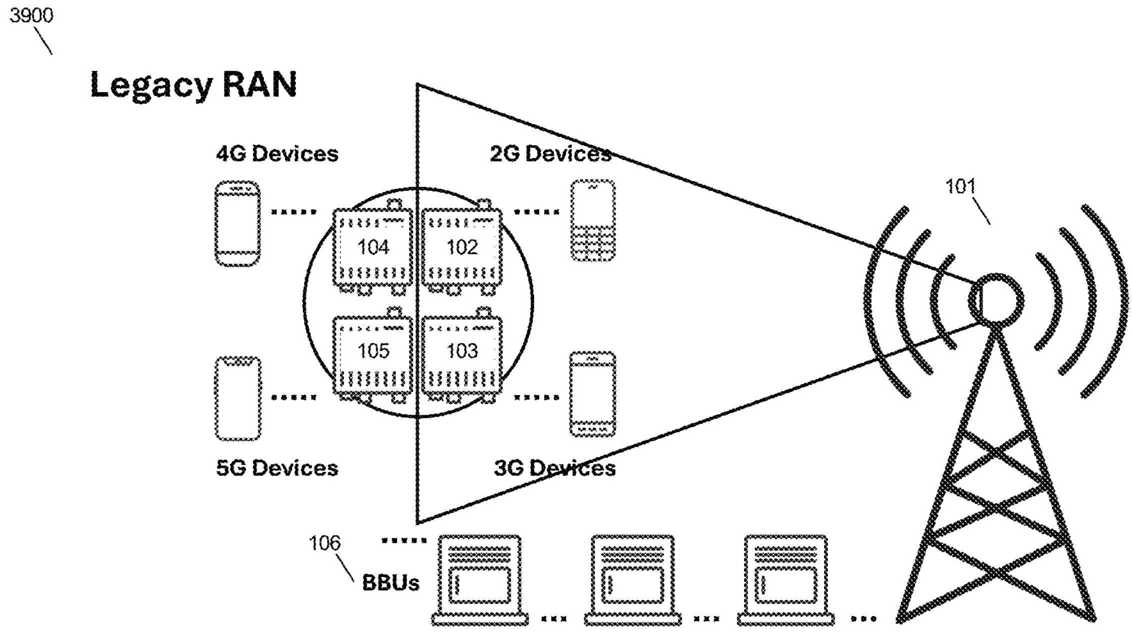
FIG. 39 is a schematic diagram of a legacy RAN deployment architecture, as known in the prior art.

FIG. 39 is a schematic diagram of a legacy RAN deployment architecture, as known in the prior art. Radio tower 3901 is used for co-locating a 2G base station 3902, 3G base station 3903, 4G base station 3904, and 5G base station 3905, each individual RAT base station having its own radio(s) and processing. To support and enable the radios to perform their necessary functions, including PHY, MAC, backhaul, RRC, etc., several base band units (BBUs) 106 are typically located at the base of the tower and are connected to the individual RAT base stations using a physical cable. This cable itself introduces signal loss and heat/power wastage. The BBUs themselves are expensive to purchase and deploy to the site, are expensive to operate given their need for real estate, HVAC and electrical support, and are expensive also to maintain, as a typical maintenance activity requires a dedicated truck roll to the site with a skilled technician.

Figure 40:
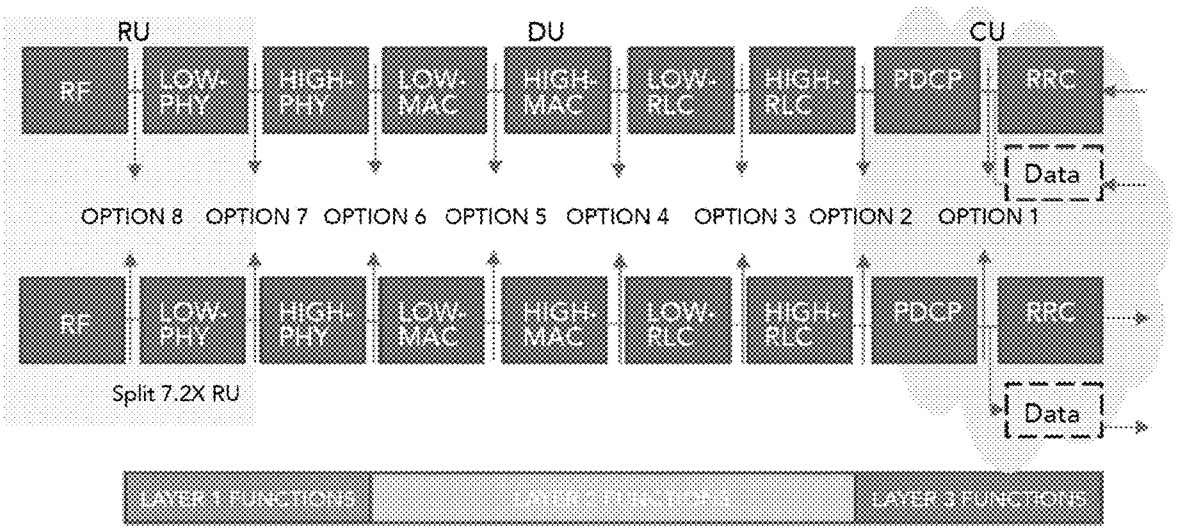
FIG. 40 is a schematic diagram of 3GPP functional splits, as known in the prior art.

FIG. 40 shows a schematic diagram of radio functional splits showing split 7.2X RU as well as other splits. The use of these functional splits is encouraged by ORAN.

5G New Radio (NR) was designed to allow for disaggregating the baseband unit (BBU) by breaking off functions beyond the Radio Unit (RU) into Distributed Units (DUs) and Centralized Units (CUs), which is called a functional split architecture. This concept has been extended to 4G as well.

RU: This is the radio hardware unit that coverts radio signals sent to and from the antenna into a digital signal for transmission over packet networks. It handles the digital front end (DFE) and the lower PHY layer, as well as the digital beamforming functionality. 5G RU designs are supposed to be inherently intelligent, but the key considerations of RU design are size, weight, and power consumption. Deployed on site.

DU: The distributed unit software that is deployed on site on a COTS server. DU software is normally deployed close to the RU on site and it runs the RLC, MAC, and parts of the PHY layer. This logical node includes a subset of the eNodeB (CNB)/gNodeB (gNB) functions, depending on the functional split option, and its operation is controlled by the CU.

CU: The centralized unit software that runs the Radio Resource Control (RRC) and Packet Data Convergence Protocol (PDCP) layers. The gNB consists of a CU and one DU connected to the CU via Fs-C and Fs-U interfaces for CP and UP respectively. A CU with multiple DUs will support multiple gNBs. The split architecture lets a 5G network utilize different distributions of protocol stacks between CU and DUs depending on midhaul availability and network design. It is a logical node that includes the gNB functions like transfer of user data, mobility control, RAN sharing (MORAN), positioning, session management etc., except for functions that are allocated exclusively to the DU. The CU controls the operation of several DUs over the midhaul interface. CU software can be co-located with DU software on the same server on site.

When the RAN functional split architecture (FIG. 40) is fully virtualized, CU and DU functions runs as virtual software functions on standard commercial off-the-shelf (COTS) hardware and be deployed in any RAN tiered datacenter, limited by bandwidth and latency constraints.

Option 7.2 (shown) is the functional split chosen by the O-RAN Alliance for 4G and 5G. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

Figure 41:
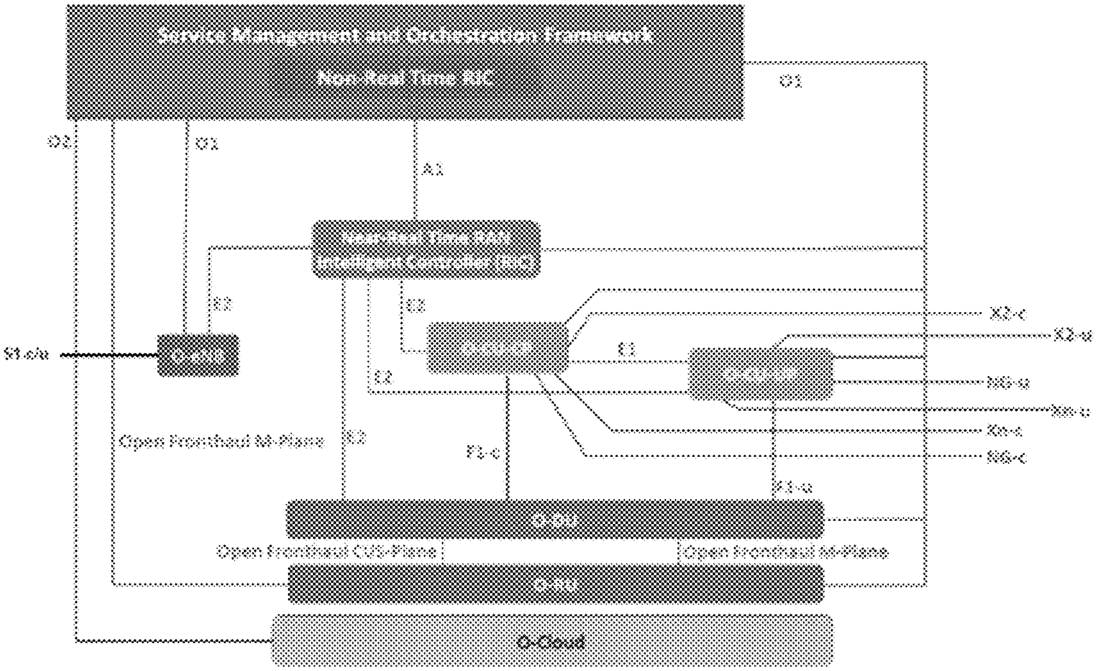
FIG. 41 is a schematic diagram of an Open RAN 4G/5G deployment architecture, as known in the prior art.

FIG. 41 is a schematic diagram of an Open RAN 4G/5G deployment architecture, as known in the prior art. The O-RAN deployment architecture includes an O-DU and O-RU, as described above with respect to FIG. 40, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network (not shown). Absent from the ORAN network concept is any integration of 2G, 3G. Also absent is any integration of a 2G/3G/4G DU or RU.

Figure 4:
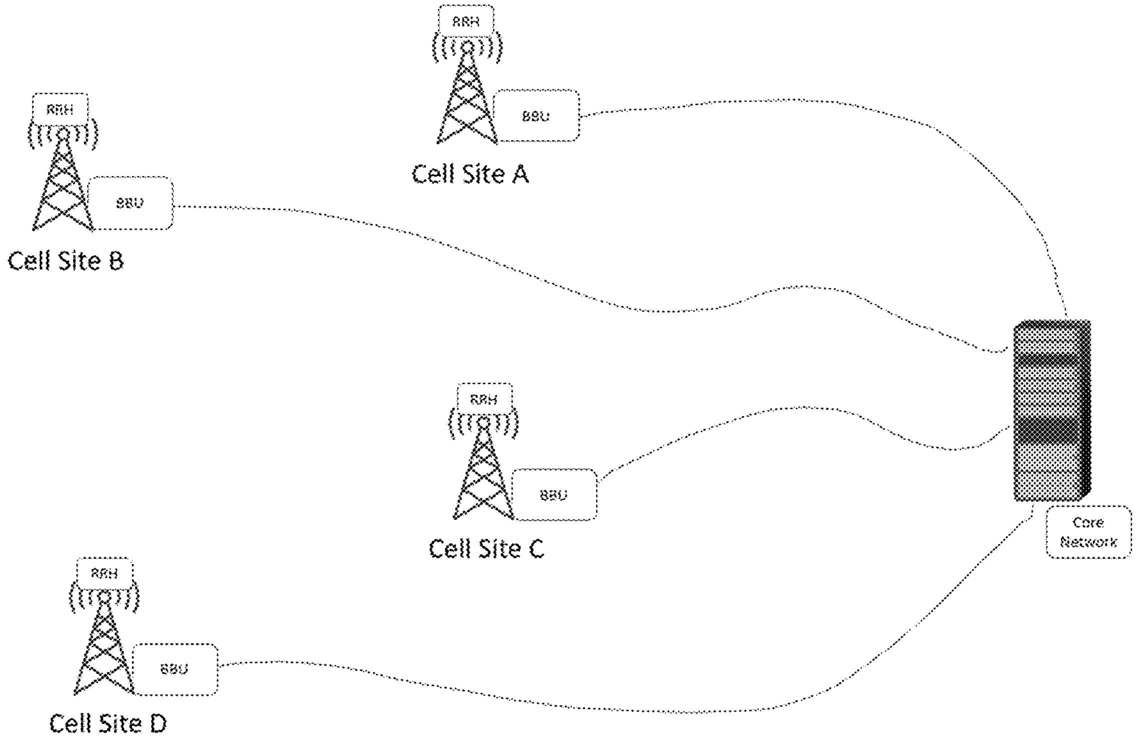
FIG. 4 is a schematic drawing of a distributed cellular radio access network architecture, in accordance with some embodiments.
Figure 42:
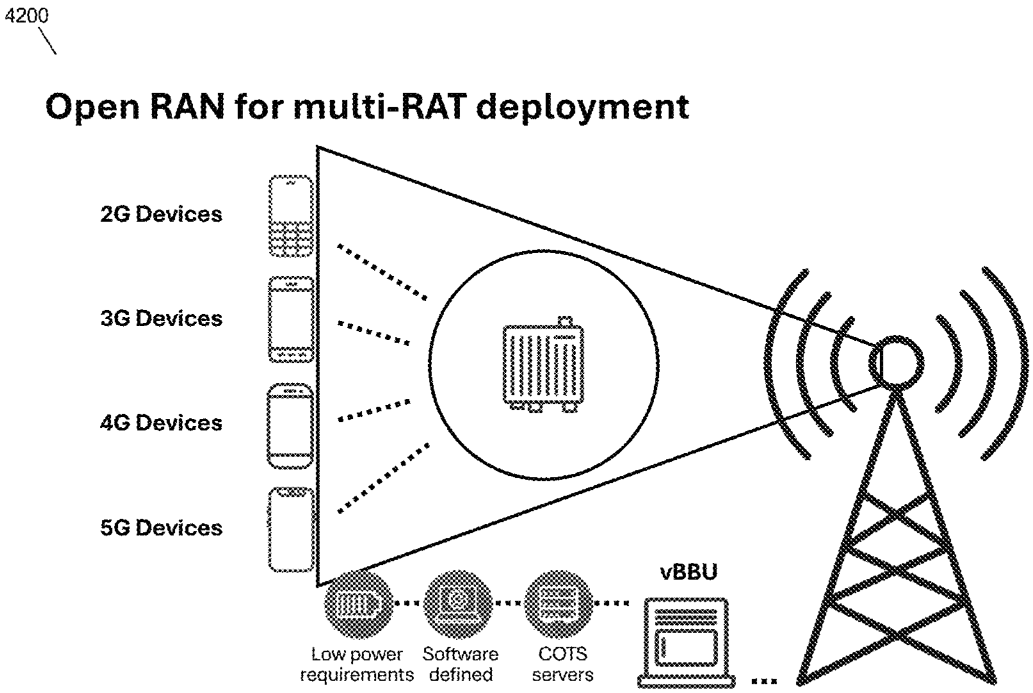
FIG. 42 is a first schematic diagram of a multi-RAT RAN deployment architecture, in accordance with some embodiments.

FIG. 42 is a first schematic diagram of a multi-RAT RAN deployment architecture, in accordance with some embodiments. FIG. 42 shows a radio tower with a remote radio head (RRH) supporting multiple RATs, 2G/3G/4G/5G, but without requiring four generations of radio base stations as shown in FIG. 39. Instead, one or more software-upgradable, remotely configurable base stations is coupled to radio heads and filters that are able to operate on the appropriate frequencies for 2G, 3G, 4G, and 5G RATs. The multiple BBUs located at the bottom of the tower in FIG. 1 have been replaced with one or more vBBUs, baseband units that are rearchitected to use modern virtualization technologies. FIG. 4 can be enabled using a technology like CPRI or eCPRI, which enables digitization and transfer of radio I/Q samples for further processing at a BBU or vBBU.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware.

Figure 43:
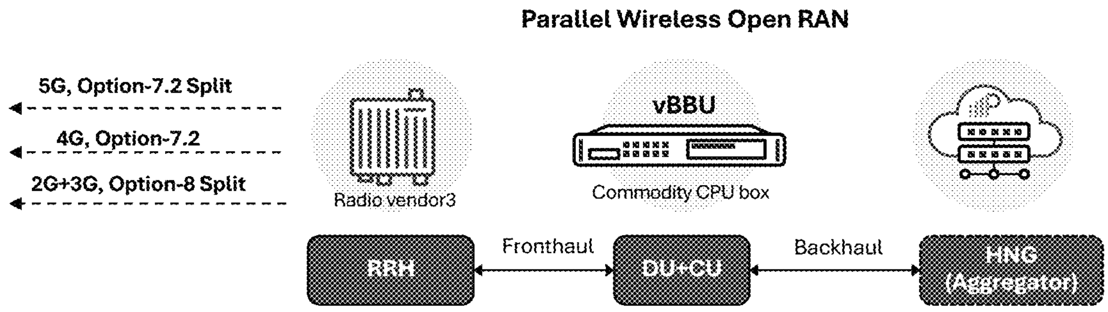
FIG. 43 is a second schematic diagram of a multi-RAT RAN deployment architecture, in accordance with some embodiments.

FIG. 43 is a second schematic diagram of a multi-RAT RAN deployment architecture, in accordance with some embodiments. As shown, a single RRH supports a 5G RAT with an Option 7.2 split, a 4G RAT with an Option 7.2 split, and 2G+3G with an Option 8 split. With the Option 7.2 split, the PHY is split into High PHY and Low PHY. For option 7-2, the uplink (UL), CP removal, fast Fourier transform (FFT), digital beamforming (if applicable), and prefiltering (for PRACH (Physical Random Access Channel) only) functions all occur in the RU. The rest of the PHY is processed in the DU. For the downlink (DL), the inverse FFT (IFFT), CP addition, precoding functions, and digital beamforming (if applicable) occur in the RU, and the rest of the PHY processing happens in the DU. This is the preferred ORAN split for 5G, and can also be used for 4G. For 2G+3G, an Option 8 split is preferred, where only RF will be performed at the RU and further processing (PHY/MAC/RLC/PDCP) is performed at the vBBU. This is desirable because the processing and latency requirements for 2G and 3G are lower, and are readily fulfilled by a BBU or VBBU.

Continuing with FIG. 43, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway services, may be the next destination via the backhaul connection; the HNG may disaggregate the different RAT communications to be directed to different RAT cores (i.e., a 2G core, a 3G core, a 4G core, a 5G core and so on). In some embodiments and in certain situations, an HNG may perform virtualization or interworking of aggregated communications such that, e.g., 2G communications may be interworked to 4G IP voice communications and routed through the 4G core. In some embodiments, the HNG may perform virtualization of one or more cores such that the communications may not need to terminate at a RAT-specific core; this feature may be combined with interworking in some embodiments. In some embodiments, no aggregator may be present and the vBBU may directly route communications to each RAT's individual core.

Figure 44:
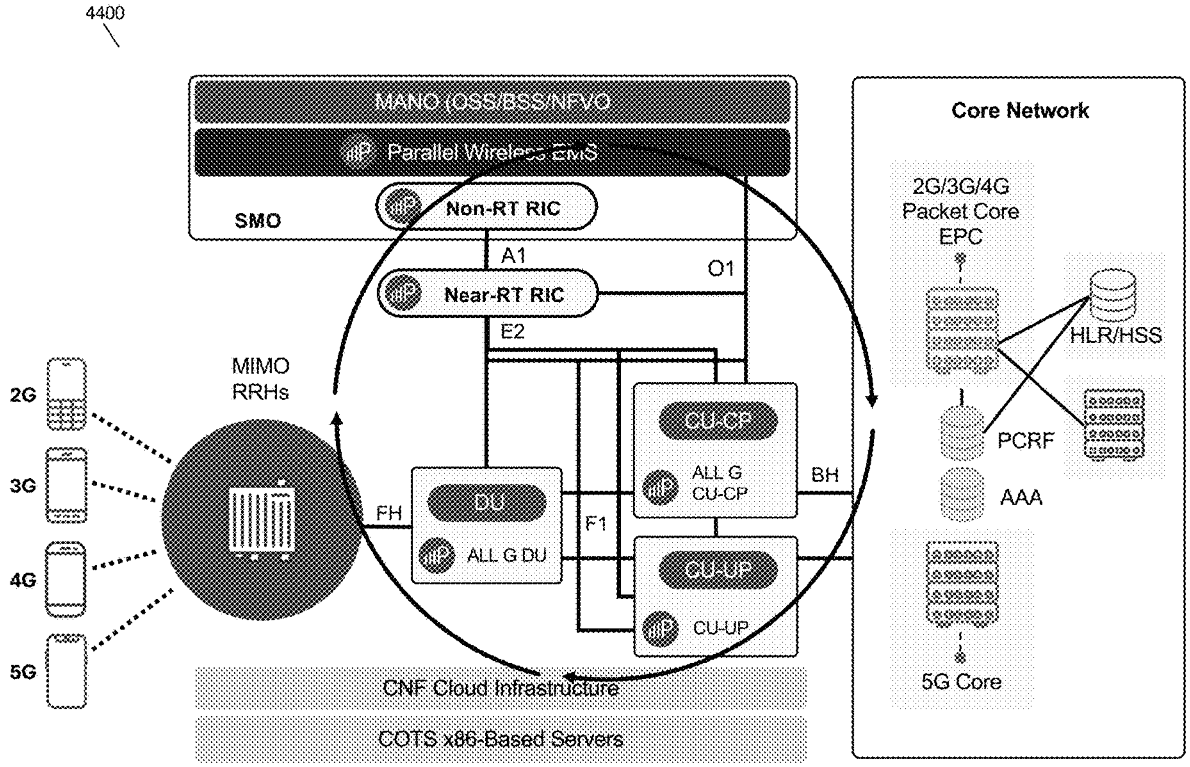
FIG. 44 is a third schematic diagram of a multi-RAT RAN deployment architecture, in accordance with some embodiments.

FIG. 44 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

Open Radio Access Network (Open RAN) is a movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Open RAN has published specifications for the 4G and 5G radio access technologies (RATs).

The first RAT may be 4G or 5G, and The radio fronthaul interface may be Common Public Radio Interface (CPRI) or Enhanced Common Public Radio Interface (eCPRI). The second RAT may be 2G or 3G, and The radio fronthaul interface may be Common Public Radio Interface (CPRI) or Enhanced Common Public Radio Interface (eCPRI). The first and the second functional RU may be colocated on a single physical device and virtualized to operate as separate processes. The first and the second functional RU may be instantiated as virtualized containers.

The multi-RAT non-RT RIC may be coupled to a network operator service management and orchestration (SMO) functionality. The method may further comprise a multi-RAT central unit control plane (CU-CP) and multi-RAT central unit user plane (CU-UP).

Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

Figure 45:
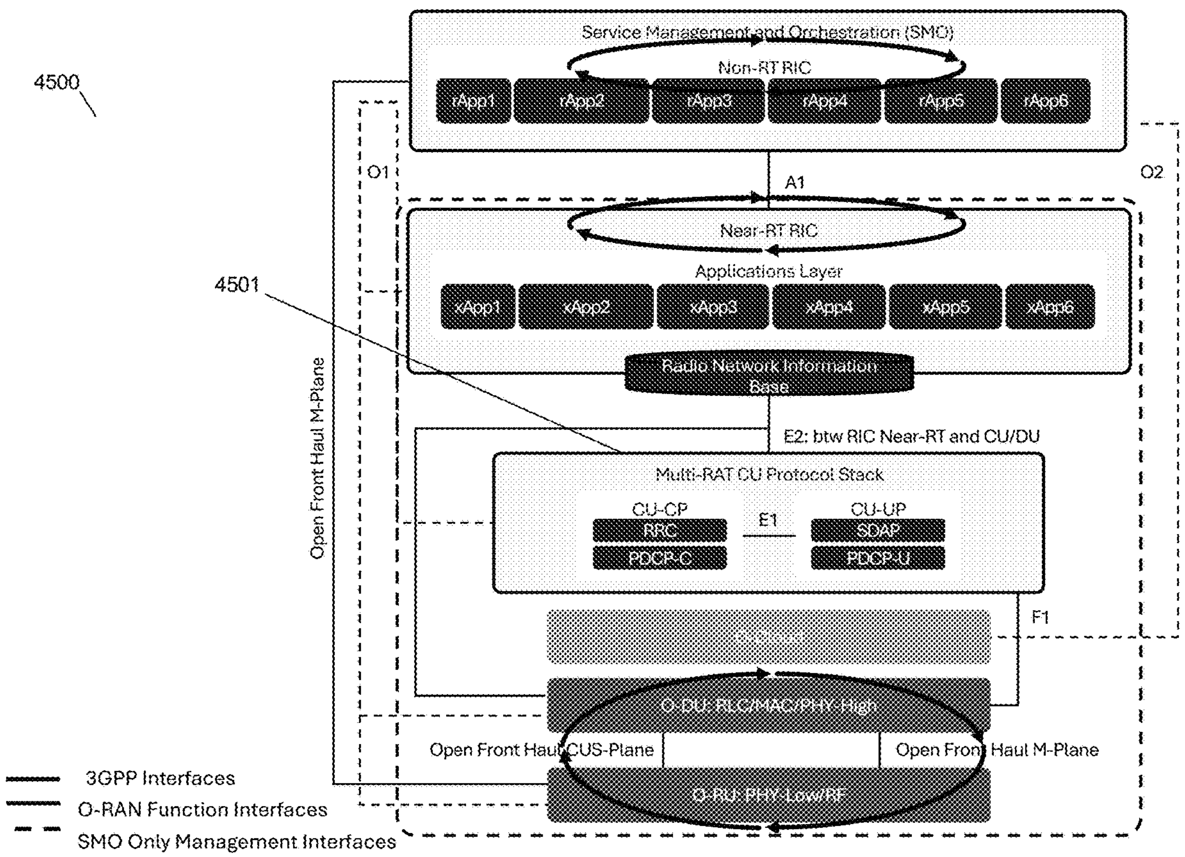
FIG. 45 is a fourth schematic diagram of a multi-RAT RAN deployment architecture, in accordance with some embodiments.

FIG. 45 is a fourth schematic diagram of a multi-RAT RAN deployment architecture, in accordance with some embodiments. The multi-RAT CU protocol stack 4501 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G.

Figure 46:
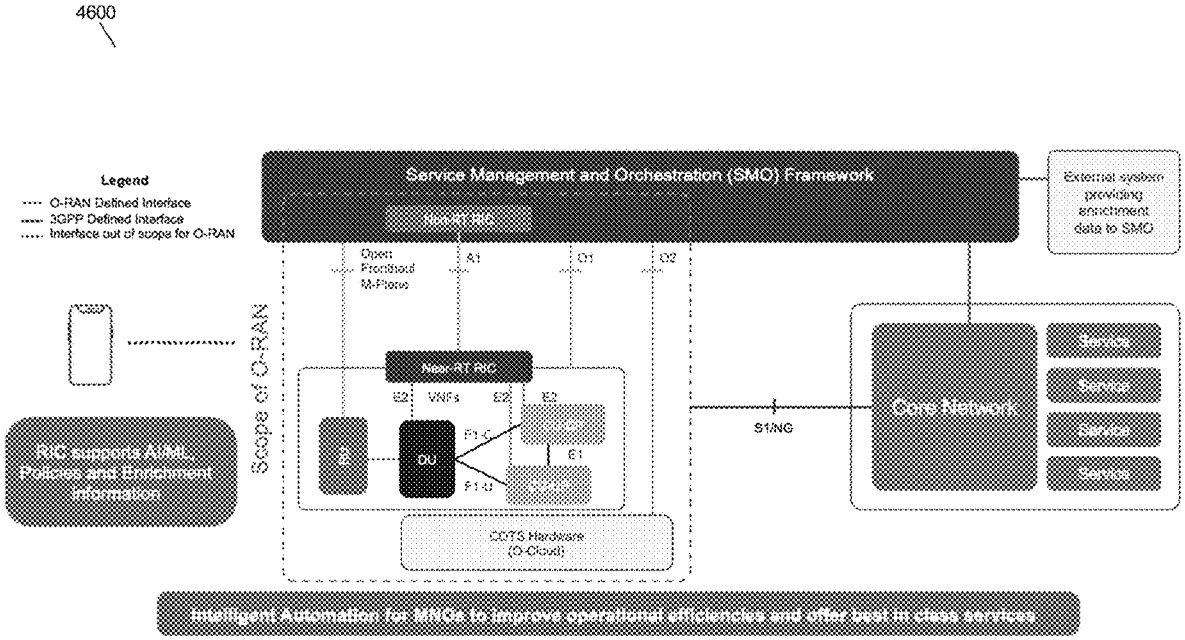
FIG. 46 is a fifth schematic diagram of a multi-RAT RAN deployment architecture, in accordance with some embodiments.

FIG. 46 is a fifth schematic diagram of a multi-RAT RAN deployment architecture, in accordance with some embodiments. This schematic diagram shows the use of the near/non-RT RIC to provide AI/ML (artificial intelligence and machine learning) policies and enrichment across Gs. This may also involve an SMO framework that is outside of the RAN, that is interfaced through the non-RT RIC, and may also involve an external system providing enrichment data to the SMO, as well as the core network and any services thereon, in some embodiments. The all-G Non-RT RIC serves as the integration point for performing network optimizations and adjustments that take into account any offline processes for AI/ML that involve adjustments that operate outside of the UE latency window (for 4G/5G~100 ms), in some embodiments.

Figure 47:
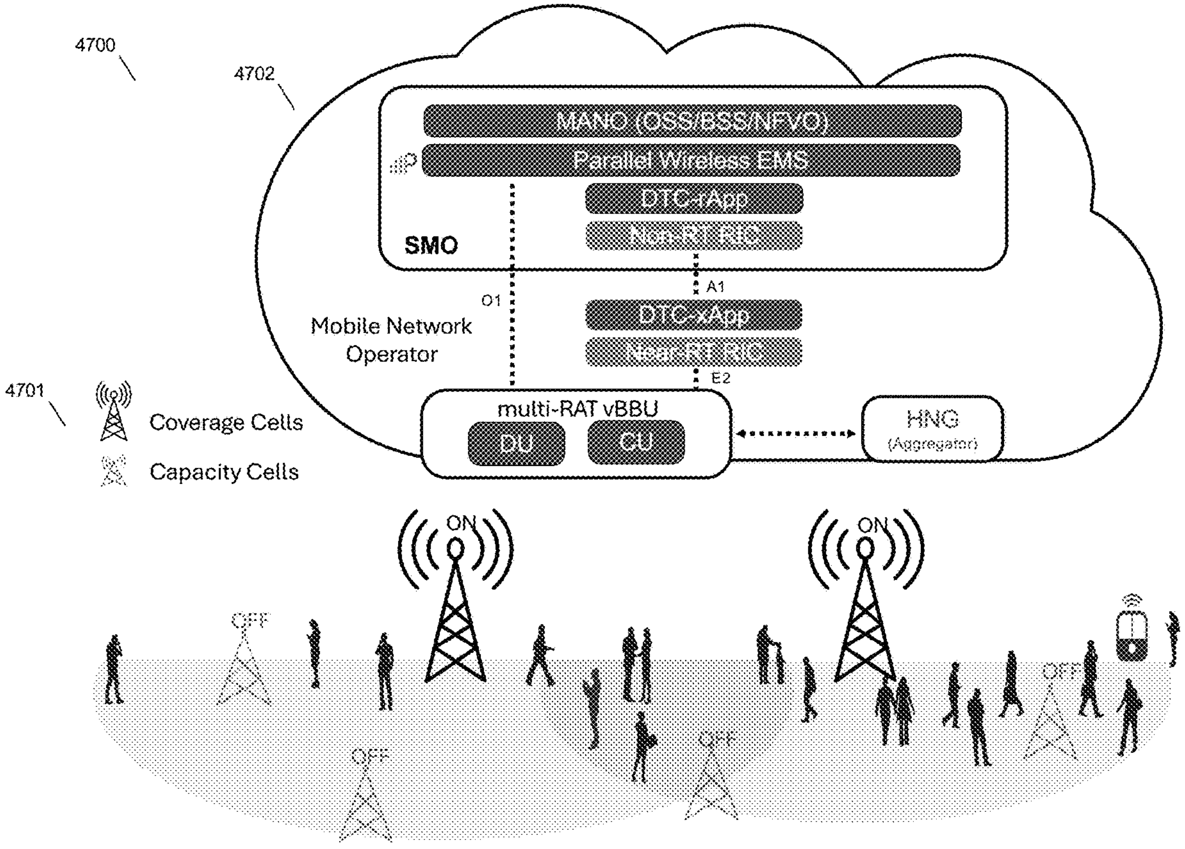
FIG. 47 is a schematic diagram of a multi-RAT RAN deployment in operation, in accordance with some embodiments.

FIG. 47 is a schematic diagram of a multi-RAT RAN deployment in operation, in accordance with some embodiments. Diagram 4701 is a schematic diagram of users in proximity to a variety of cells, labeled coverage cells and capacity cells. Coverage cells provide users with a connection to the network that is durable, typically located at a high tower; this type of connection may not, however, enable high bandwidth given the large number of users supported at such cells. Capacity cells support a smaller number of users and use different radio technologies to enable high throughput to users. Capacity and coverage cells are enabled to trade off users as needed to maintain the needs of the network and the users as well. The diagram shows that while there are several capacity cells available in the network, they are all turned off.

Diagram 4702 is a schematic diagram of the operator network, in accordance with some embodiments. A multi-RAT vBBU is in communication with a near-RT RIC and a non-RT RIC, as well as a Parallel Wireless element management system (EMS), which provides the system with awareness about active network nodes, as well as a MANO (OSS/BSS/NFVO) for network operational capabilities. The coverage and capacity cells shown in 4701 are in communication with the all-G near-RT RIC and all-G non-RT RIC. Network functions are managed by applications, called xApps when running on the near-RT RIC and rApps when running on the non-RT RIC, and these applications are in communication with each other and aware of the network conditions through information available at the systems on which they are running.

In operation, for some embodiments, for example, when a coverage cell is heavily loaded, an rApp on the non-RT RIC and an xApp on the near-RT RIC coordinate to identify a mitigation, which can include identifying an appropriate capacity cell to activate; activating the cell; and handing over users from the coverage cell to the newly active cell. In another example, in some embodiments, in the case that admission control is identified as causing too many users to be admitted to the network at the same time, throttling may be performed. Monitoring of network load and a subsequent instruction to perform throttling may be initiated at the near-RT RIC using an xApp, in some embodiments. This may be a multi-RAT activity and this may involve monitoring of network load for a first RAT and an instruction to perform throttling for a second RAT, in some embodiments.

Figure 48:
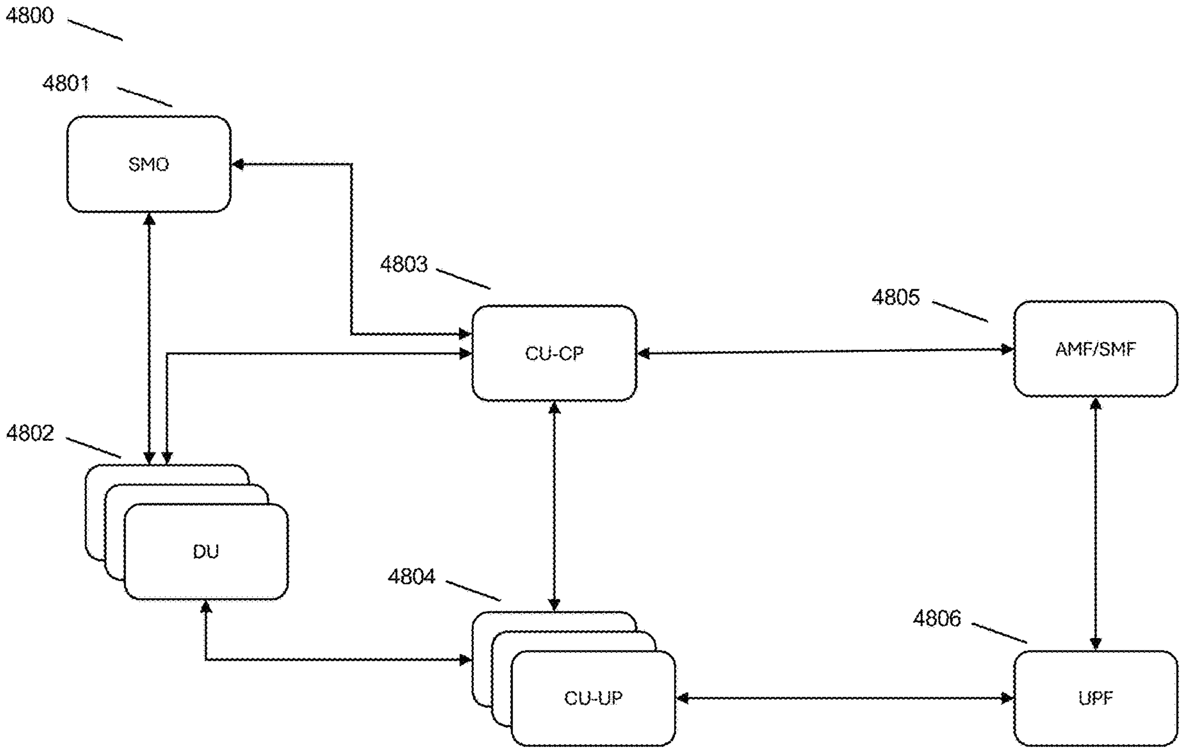
FIG. 48 is a schematic diagram of a 5G core, in accordance with some embodiments.

FIG. 48 shows a schematic diagram 4800 of a CU-CP Open RAN architecture, in accordance with a 5G architecture. CU-CP 4803 is in communication with a plurality of DUs 4802, with one or more CU-UPs 4804, service management and orchestration node (SMO) 4801, and AMF/SMF 4805. UPF 4806 is also in communication with AMF/SMF and CU-UP.

Figure 49:
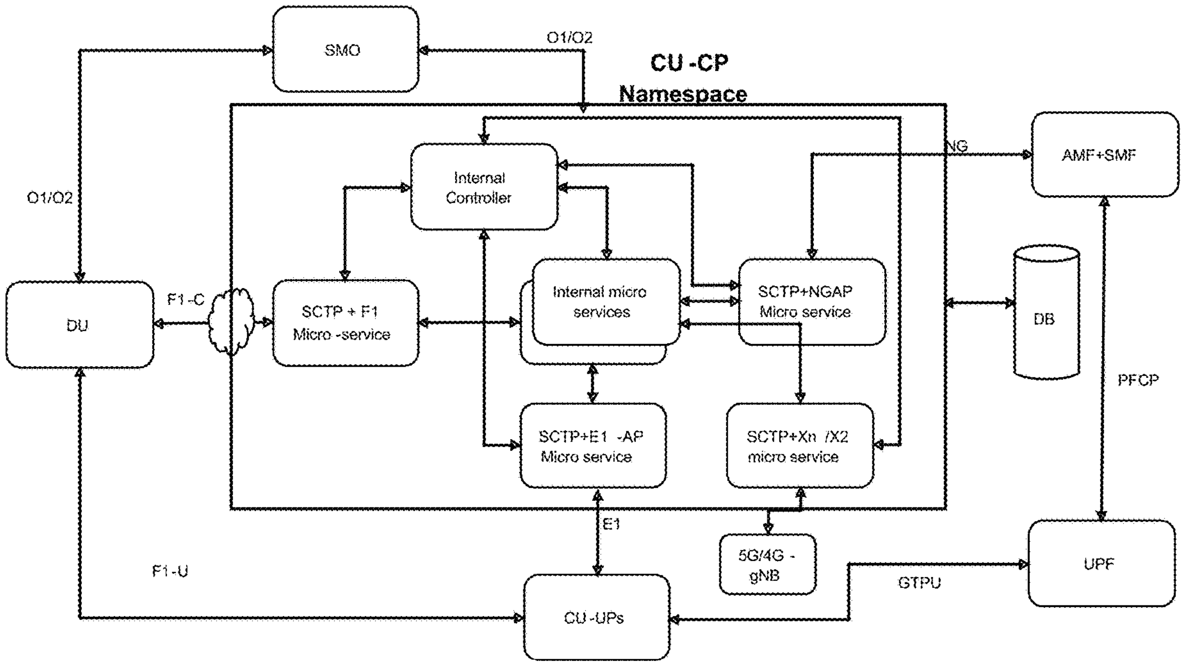
FIG. 49 is a schematic diagram of a CU-CP namespace, in accordance with some embodiments.

FIG. 49 shows a CU-CP internal logical architecture and internal nodes shown as microservices, in accordance with some embodiments. A variety of microservices provide the benefits of a microservices-based architecture, such as massively parallel processing, restart and management and availability, advanced monitoring, etc. This microservices architecture enables 4G and 5G, as shown, and can be readily extended to 2G and 3G as well (not shown). All of these nodes can use microservices, in some embodiments. However, although a microservice architecture provides high availability and scalability for stateless services seamlessly, it is noted that a session created on SCTP association can be lost if one of the SCTP pods (microservices) crashes and existing connection are not restored in time-bound manner.

Figure 50:
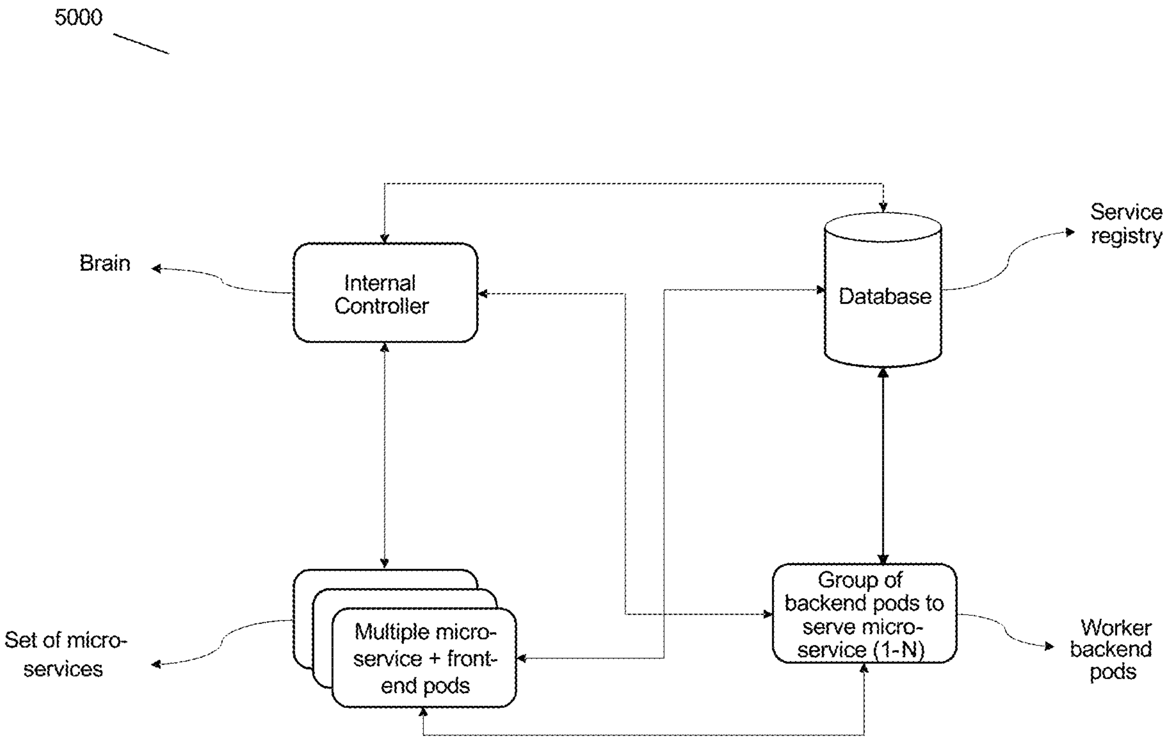
FIG. 50 is a schematic diagram of a microservice control architecture, in accordance with some embodiments.

FIG. 50 is a schematic diagram of a microservice control architecture, in accordance with some embodiments. Shown is a schematic diagram showing a pod microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod.

In some embodiments, an internal controller keeps track of health of some or all pods & micro services in a given namespace. As soon as any pod/container crashes, it updates the remaining pods. And takes necessary steps to bring system in workable state.

In some embodiments, a database (Service registry) may act as service registry database for some or all pods and microservice in given namespace. All the pods on start-up can update required information in database & fetch required information from service registry database.

The disclosed high availability solution is intended to enhance availability of a single pod solution, as follows. In Kubernetes, a Pod (as in a pod of whales or pea pod) is a group of one or more containers, with shared storage and network resources, and a specification for how to run the containers. A Pod's contents may be co-located and co-scheduled, and run in a shared context. A Pod models an application-specific "logical host": it contains one or more application containers which are relatively tightly coupled. In non-cloud contexts, applications executed on the same physical or virtual machine are analogous to cloud applications executed on the same logical host. Pods get their own IP and services get a cluster IP. Cluster IP is internal only. Kubernetes creates a cluster when a pod is created. Kubernetes supports a method for tracking which pods are available and/or down. It tracks which ones are live and which ones are down. While Kubernetes is described herein, other container management and orchestration methods are understood to be supported in the spirit of the present disclosure.

Pods are configured in Kubernetes using YAML files. A controller for the resource handles replication and rollout and automatic healing in case of Pod failure. For example, if a Node fails, a controller notices that Pods on that Node have stopped working and creates a replacement Pod. The scheduler places the replacement Pod onto a healthy Node.

In telecom, it is desirable to have a single controller running at a single time, not multiple controllers. This is because there are often situations where state is required to be kept at the service provider. This results in a single controller being visible, and, standby controller being invisible to others. However, Kubernetes does not have any concept of active and standby, and this concept is facilitated by the addition of labels or selectors as follows.

There are a variety of other higher-layer protocols and interfaces, such as F1, E1, Xn/X2, NGAP. No higher layer communication or change to these higher-layer protocols is needed to provide HA specifically for these. But since these protocols are implemented on top of SCTP, this approach also provides HA for these higher-layer protocols as well. Any protocols that sit on top of SCTP or using SCTP as a transport would be enabled with HA using this mechanism, in some embodiments. This would apply to 2G, 3G, 4G, 5G, or any other SCTP-reliant protocol.

Figure 51:
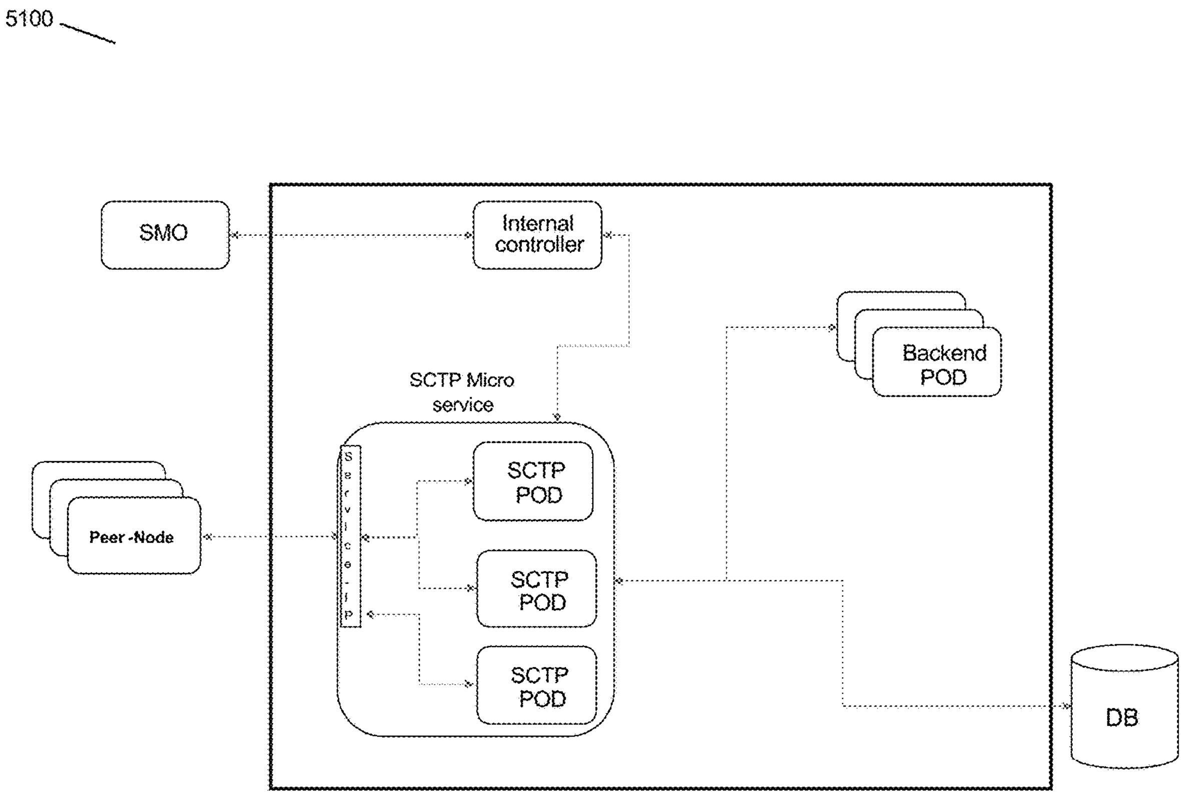
FIG. 51 is a schematic diagram of an SCTP microservice, in accordance with some embodiments.

FIG. 51 is a schematic diagram of an SCTP microservice, in accordance with some embodiments. An active-active model is shown, wherein one microservice is the primary and another microservice is the backup, with both being active and the backup ready to take over at any time.

Since any new SCTP connection will be given to any of the pods of SCTP-microservice, and one SCTP connection/association will be terminated on one of SCTP pod only and further traffic related to that association will flow via this connection/association only, each SCTP pod is over provisioned with additional active pods to handle additional load/connection if any of the pods is to fail, as shown. This provides high availability.

Cluster level approach for RAN user scheduling (72814/72816)

A fundamental side effect in multi-site deployments is the existence of cross-site interference—which is addressed in various attempts to implement ICIC mechanisms to the multi-site deployment.

We propose novel approach for cross sites/cells scheduling process in coordination by the processing entity (in a centralized or distributed manner), in real-time, utilizing a communication channel between the different processing entities in the cluster. Leveraging the coordinated operation of all sites allows to significantly reduce RF interference for the UEs served in the cluster.

As RAN technology evolves it is increasingly common for CSPs (cellular service providers) to adopt a Centralized RAN approach. This usually means re-locating the compute components of various cell sites to a single geographic location (e.g. local data-center)—effectively reducing the cost of maintaining of each individual location reducing costs by resources pooling (cooling, resource management, staff), allowing the adoption of advances cloud technologies, etc.

Having the compute platform in a single location (might even be virtualized on the same physical machine) allows implementation of features relying on real-time data sharing between them—which is impractical when the RAN compute platforms are separated apart.

In particular, adjusting the scheduling process based on other sites/cells scheduling decisions may reduce overall RF interference, allow to prioritize certain UEs/services over others and increase spectral efficiency as well as channel capacity on the cluster level.

For the ease of reading, a "RAN compute platform" will be referred to from this point on as a "BBU" or "Base Band Unit".

The traditional approach to RAN implementation is an "all-in-one" solution which is comprised of dedicated HW that serves the entire base-station (sector or site level) functionalities from the physical layer (L1) to the higher layer (L3).

An increasingly common trend is the decoupling of the different functionalities, implemented as a separation of dedicated Radio HW and COTS computing components serving the RAN functionalities (BBU), which reside in the cell site, as shown in FIG. 4.

This evolution of RAN allows the distancing of the BBU component up to a certain range which depends on the specific implementation and RAN constraints in terms of latency, jitter, FH technology etc.

Figure 5:
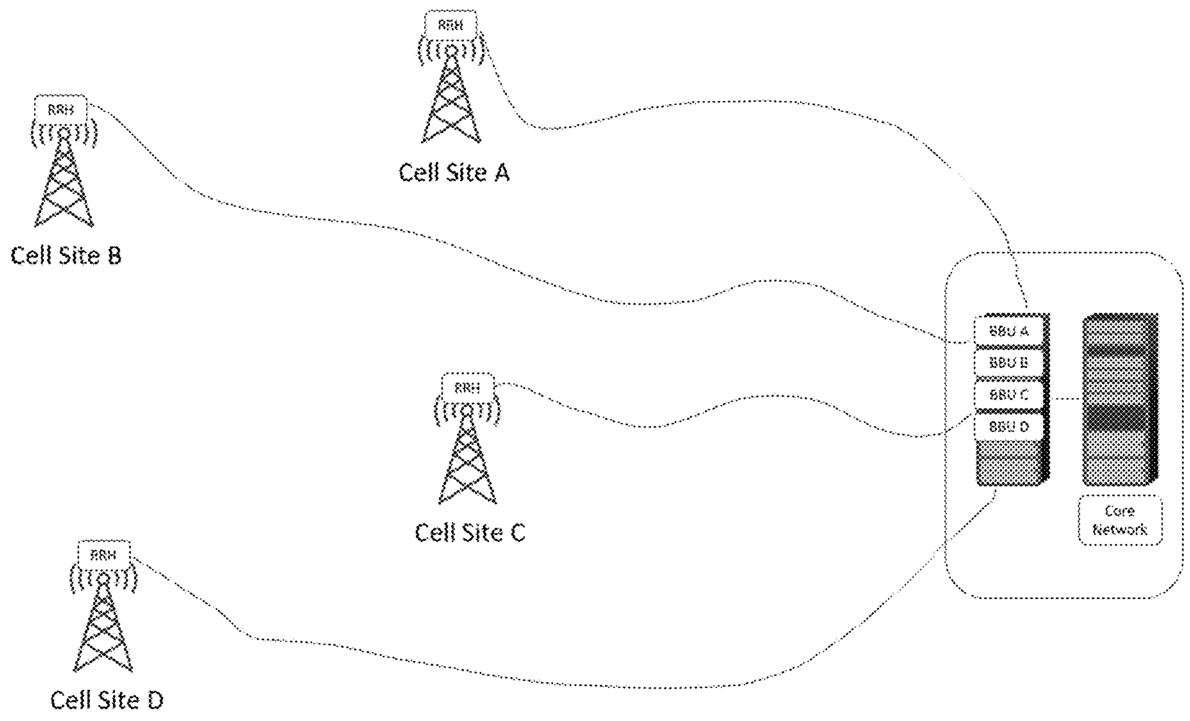
FIG. 5 is a schematic drawing of a cellular radio access network architecture with centralized BBU hosting, in accordance with some embodiments.

Centralizing the BBUs in a single location is generally referred to as C-RAN and can be greatly beneficial in terms of operation cost reduction, as shown in FIG. 5.

The centralization can be further leveraged to optimize network performance; due to being physically close, the BBUs can be interconnected with a communication channel (such as shared memory), allowing the application-level to coordinate different aspects of these sites' operation." This can be used to reduce radio interference that is caused when each Base Station acts independently.

One problem with RAN user scheduling is as follows. Radio Frequency (RF) Interference can mutually occur for cell sites with overlapping geographies and bandwidth reuse. Overlapping coverage area between any two adjacent cells varies between different types of deployment. The interference level is correlated to the size of the overlapping area which can get to high numbers of around 50% of the coverage area in dense urban deployment.

UE1 is attached to cell site A, UE2 and 3 are attached to cell site B, UE4 is attached to cell site C. When UE1 and UE2 UL allocations overlap in time and frequency, UE2 might interfere with cell site A to receive UE1's transmission (UL data).

Figure 6:
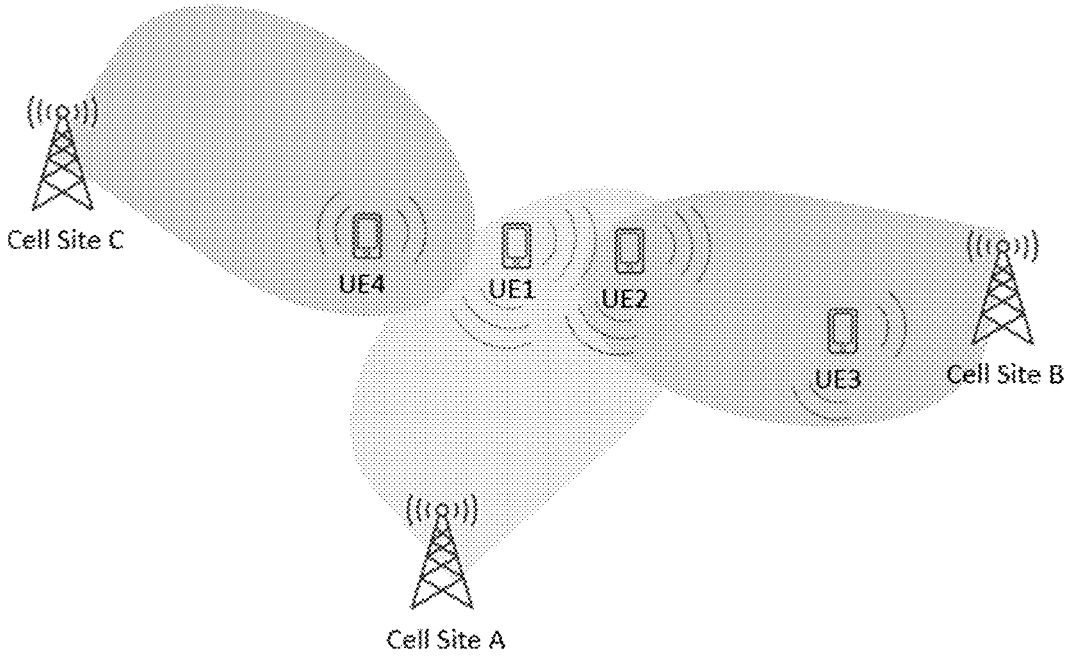
FIG. 6 is a schematic drawing of a cellular radio access network with UEs at the cell edge, in accordance with some embodiments.

In the same manner, when UE1 and UE2 DL allocations overlap in time and frequency, UE2 will experience a significant interference due to cell site A transmission to UE1 (DL data), as shown in FIG. 6.

The cause for the RF interference in the example above derives from the existence of individual scheduling processes in independent base stations, each, operating with no consideration of the other—this is an inherent aspect of the distributed architecture. Theoretically, a BBU performing scheduling tasks that has prior knowledge of neighboring cells scheduling data, can produce an optimal or at least significantly improved outcome in terms of defined benchmarks (SINR, TPT, etc).

Our suggested approach is to interconnect the BBUs, making it possible to carry out a cross-site collaborated/coordinated effort, while still adhering to the real-time constraints dictated by RAT standards-aiming to avoid a cross-site scheduling occurrence that may impose interference, or taking means to reduce its severity.

For a centralized multi-site deployment, this can be achieved in different ways, such as: Having a single scheduling entity for multi-site scheduling; Having a dedicated scheduler entity serving only cell-edge UEs (for each overlapping coverage area) that are most likely to suffer the interference, etc.; Having the individual BBU-level scheduling entities communicate to provide a better outcome. These scheduling entities can reside on separate HW machines, given the communication channel satisfies the latency requirements. The scheduling entities may be mapped to a specific O-RAN node, such as a near-RT RIC, or may be provided transparently without reference to the O-RAN standard, with each cell presenting to the higher layer or core as a standard CU/DU/RRU base station, in some embodiments.

Relating to FIG. 6, an acceptable optimized outcome could be to coordinate the UL/DL allocation, such that during UE1 allocation, cell site B can reuse that slot to serve UE3 an allocation, which is less likely to cause interference, since UE3 is out of cell site A coverage area, while UE2 is inside it.

The extent of centralization that is required for this concept can vary, and always requires the MAC instances to reside in relative proximity to each other. Proximity may mean centralized on the same physical machine, stacked servers (each hosting a partial or complete BBU instance), and/or components other than the MAC layer (L1, L3) may reside on the same machine or another, in the same physical location or another, centralized or distributed.

Based on this relative proximity, the communication channel used for data sharing may be based on any form of wired or wireless connection between physical machines, or a shared memory segment on a single machine, as long as it satisfies the latency requirements.

Location data and other side data obtained from the UE or generated by the network will be used to map sets of cells that may interfere with those UEs, as a basis for the coordination process. Alternatively or in conjunction, User classification process can be done using AI/ML approach to achieve the understanding which user is more likely to be subject to interference and from which neighbor cell or cells.

Figure 7:
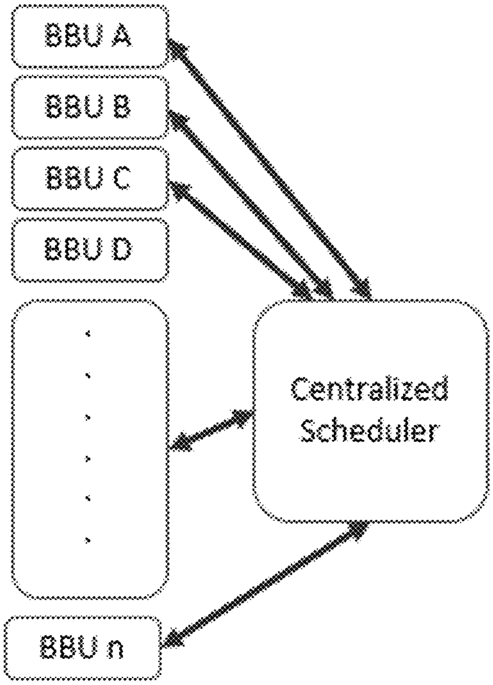
FIG. 7 is a schematic drawing of a cellular network architecture with a centralized BBU scheduler, in accordance with some embodiments.

The scheduling coordination process can be done utilizing a centralized scheduling approach for the cells in a cluster, in accordance with various embodiments, which may be: fully centralized, or semi-centralized. For a fully Centralized scheduler: a single scheduling entity simply serves all UEs on all different cells. The centralized scheduler can be implemented as a set of workers in a scheduling micro-service (or be broken down into several micro-services), acting as a single logical scheduling entity for the entire cluster. This is shown in FIG. 7. For a semi-Centralized scheduler, a common scheduling entity determines the allocations for cell-edge UEs only, then passes that information to the relevant individual schedulers to carry out the allocation and individually determine the allocation for the rest of the available BW.

The data exchange process required for centralized approach shall be: BBUs report their candidates to be scheduled (as per fully/semi centralized) and/or Bearer parameters and/or BO and/or RBs required and/or UE power headroom, etc. In return, the centralized scheduler will respond with each UEs allocation.

Figure 8:
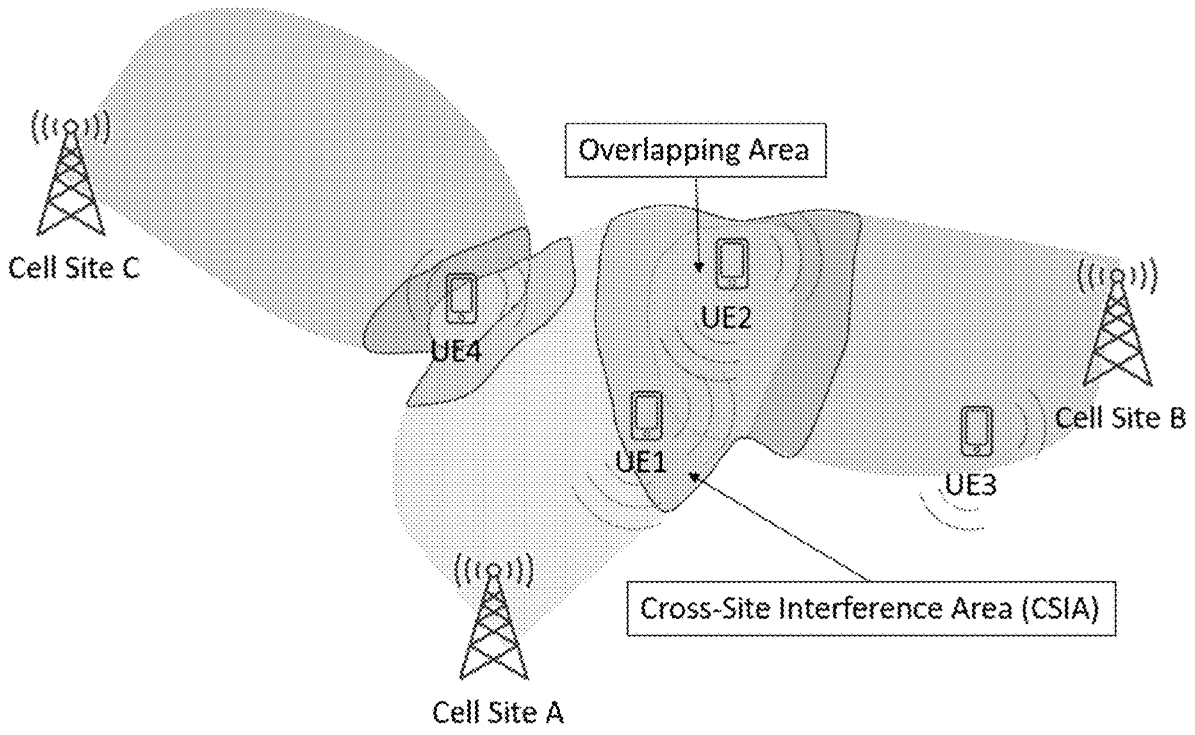
FIG. 8 is a schematic drawing of a cellular radio access network with UEs in a cross-site interference area, in accordance with some embodiments.
Figure 9:
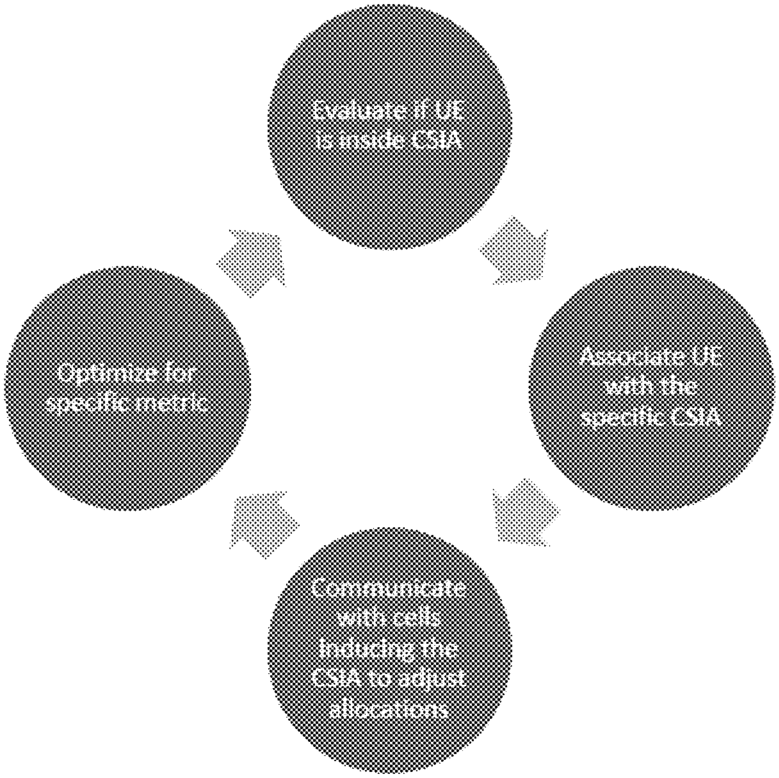
FIG. 9 is a flow diagram for a cellular radio access network with UEs in a cross-site interference area, in accordance with some embodiments.

The scheduling coordination process can be done utilizing an individual scheduling approach executed by each BBU, using the following steps, as shown in FIG. 9. For scheduling coordination, it is useful to define a Cross-Site Interference Area (CSIA) as an area in which UEs may be interfered by other cells (in overlapping DL allocations) or by UEs served by another cell (in overlapping UL allocations). In FIG. 8, one CSIA is induced by cells A and B, another by A and C. To reduce the interference in a CSIA, the cells inducing the CSIA shall communicate to coordinate/collaborate the UL/DL scheduling of UEs residing inside the CSIA.

In step 1 of the scheduling coordination process: Evaluate if UE is inside CSIA: To determine if a UE suffers for interference, we rely on CQI reports in DL and/or BLER percentage in UL and/or location reports and/or data accumulated over time. A single BBU may induce several interference areas with adjacent sites, as shown in FIG. 8.

In step 2 of the scheduling coordination process: Associate UE with specific CSIA: one or more of the following can be utilized to determine in which CSIA a specific UE resides in: UEs cell measurements reports (containing GPS data); MDT—Minimization of Drive Test; and/or correlation with data shared by other BBUs.

Data sharing and correlation with data shared by other BBUs may include the following, in some embodiments:

BBU shall list the CSIAs in a decreasing probability order (based on the known UE location or learning process gained from other typical transitions over time), then through a trial-and-error process will determine in which CSIA the UE resides in. This can be done since the BBU has knowledge of the UEs scheduled by other BBUs in each CSIA (detailed in Step 3).

The UE correlation process can be done in a passive approach (relying on the data shared by other BBUs considering many samples) or in reactive approach, where a BBU tries to deliberately cause collisions, to produce more samples for considering the correlation and accelerating the decision-making process.

Another reactive approach for data sharing and correlation can use the following process: UE suffers from interference and BBU suspects that UE resides in CSIA X, so the source of interference is another UE/s residing in CSIA X; BBU will request the other BBUs inducing CSIA X to share DMRS config parameters and DMRS sequence parameters with every data shared in step 3, for a defined period Y; the BBU will deliberately allocate the interfered UE with overlapping allocations as shared by the other BBUs, within that period Y; and by using IRC receiver and the data described above, BBU can determine the source/s of interference, thus associating the UE to a specific CSIA.

Another way to correlate UEs with specific CSIA is to use UE clustering for CSIA and non CSIA learned by AI/ML algorithm based on channel conditions and soft measurements, like but not only, SINR/CQI/Noise measurements/BLER/etc. can be leveraged to classify specific UE to specific CSIA zone. Depending on the desired certainty any subset of the above methods can be used individually or as a weighted combination of more than one of them.

In step 3 of the scheduling coordination process: communication is performed with each cell inducing the CSIA to adjust allocations. A common channel is defined for each CSIA, so that all BBUs involved in a CSIA can obtain data from each other. In a centralized architecture (as referred to above), a shared memory segment can be dedicated to serve this purpose. In a stacked-server architecture (as referred to above) each BBU needs to communicate its own data to all other BBUs on that channel. In each scheduling opportunity (TTI resolution), each BBU performs its scheduling process for candidate UEs. For all UEs associated to a CSIA, the following data shall be shared over the channel: PRB Start; Num PRB; and UE Score—as defined in the next paragraph.

A UE score or UE metric may be computed, in some embodiments, with a score being given to each UE allocation inside a CSIA, based on a cluster-level definition of the matric—this is intended to ensure that UE scores from different BBUs will be determined based on the same considerations, so that preferring the higher score will always optimize for that metric. Many different metrics can be considered, such as (and not limited to): Type of service—based on QCI; UE AMBR; Average number of re-transmissions; CQI; Overall channel TPT; minimizing SDR; UEs in Handover procedure; FEC iterations in UL; UE fairness (preventing starvation); and Cell-level priority, including round robin, weighted by number of UEs in CSIAs, and/or weighted by number of sector layers. These metrics can be used in any combination, and weightings of these metrics can be used to suit the needs of the carrier or operator.

Each BBU shall consider the data shared by other BBUs to determine if its scheduling draft requires adjustments. This shall be done by identifying any overlapping allocations with the other BBUs, and considering the score of the UEs served those allocations. The lower priority allocation may require adjustments, based on a cluster-level policy-which is performed at step 4 of the scheduling coordination process.

In step 4 of the scheduling coordination process, optimizing for one or more specific metrics, different measures can be taken to mitigate the expected interference, in some embodiments. For instance: scheduling a cell-edge UE that poses less risk of interference; scheduling a cell-center UE instead; giving priority to a higher-score UE served by a neighbor; reducing the number of PRBs in the allocation to eliminate or minimize the overlap; and/or reducing MCS to gain better robustness in expense of capacity.

The centralization can be further leveraged to optimize network performance; due to being physically close, the BBUs can be interconnected with a communication channel (such as shared memory), allowing the application-level to coordinate different aspects of these sites' operation. This can be used to reduce radio interference that is caused when each Base Station acts independently.

In certain embodiments it is possible to utilize features such as UL FFR, but that does not rely on real-time communication to optimize of a TTI timeframe. Instead, this approach allows to leverage the centralization on the application level to reduce radio interference, rather than just to benefit on the platform level (HW resource pooling, etc). This alternative may be combined with the other methods of centralized scheduling coordination described herein, in some embodiments.

FIG. 4 is a schematic drawing of a distributed cellular radio access network architecture, in accordance with some embodiments. The traditional approach to RAN implementation is an "all-in-one" solution which is comprised of dedicated HW that serves the entire base-station (sector or site level) functionalities from the physical layer (L1) to the higher layer (L3). An increasingly common trend is the decoupling of the different functionalities, implemented as a separation of dedicated Radio HW and COTS computing components serving the RAN functionalities (BBU), which reside in the cell site, as shown in FIG. 4. This evolution of RAN allows the distancing of the BBU component up to a certain range which depends on the specific implementation and RAN constraints in terms of latency, jitter, FH technology etc.

FIG. 5 is a schematic drawing of a cellular radio access network architecture with centralized BBU hosting, in accordance with some embodiments. Centralizing the BBUs in a single location is generally referred to as C-RAN and can be greatly beneficial in terms of operation cost reduction. The centralization can be further leveraged to optimize network performance; due to being physically close, the BBUs can be interconnected with a communication channel (such as shared memory), allowing the application-level to coordinate different aspects of these sites' operation." This can be used to reduce radio interference that is caused when each Base Station acts independently. This is shown in FIG. 5.

However, radio frequency (RF) Interference can mutually occur for cell sites with overlapping geographies and bandwidth reuse. Overlapping coverage area between any two adjacent cells varies between different types of deployment. The interference level is correlated to the size of the overlapping area which can get to high numbers of around 50% of the coverage area in dense urban deployment.

FIG. 6 is a schematic drawing of a cellular radio access network with UEs at the cell edge, in accordance with some embodiments. UE1 is attached to cell site A, UE2 and 3 are attached to cell site B, UE4 is attached to cell site C. When UE1 and UE2 UL allocations overlap in time and frequency, UE2 might interfere with cell site A to receive UE1's transmission (UL data). In the same manner, when UE1 and UE2 DL allocations overlap in time and frequency, UE2 will experience a significant interference due to cell site A transmission to UE1 (DL data).

FIG. 7 is a schematic drawing of a cellular network architecture with a centralized BBU scheduler, in accordance with some embodiments. As shown, the scheduling coordination process can be done utilizing a centralized scheduling approach for all cells in a cluster, which may be in one embodiment a fully Centralized scheduler: a single scheduling entity serves all UEs on all different cells. The centralized scheduler can be implemented as a set of workers in a scheduling micro-service (or be broken down into several micro-services), acting as a single logical scheduling entity for the entire cluster. Another embodiment may be a semi-centralized scheduler, wherein a common scheduling entity determines the allocations for cell-edge UEs only, then passes that information to the relevant individual schedulers to carry out the allocation and individually determine the allocation for the rest of the available BW. Other embodiments may mix the two schedulers.

FIG. 8 is a schematic drawing of a cellular radio access network with UEs in a cross-site interference area, in accordance with some embodiments. A Cross-Site Interference Area (CSIA) defined as an area in which UEs may be interfered by other cells (in overlapping DL allocations) or by UEs served by another cell (in overlapping UL allocations). In FIG. 8, one CSIA is induced by cells A and B, another by A and C.

FIG. 9 is a flow diagram for a cellular radio access network with UEs in a cross-site interference area, in accordance with some embodiments. To reduce the interference in a CSIA, the cells inducing the CSIA shall communicate to coordinate/collaborate the UL/DL scheduling of UEs residing inside the CSIA.

Step 1: Evaluate if UE is inside CSIA: To determine if a UE suffers for interference, we rely on CQI reports in DL and/or BLER percentage in UL and/or location reports and/or data accumulated over time. A single BBU may induce several interference areas with adjacent sites, as shown in FIG. 8.

Step 2: Associate UE with specific CSIA. One or more of the following can be utilized to determine in which CSIA a specific UE resides in: UEs cell measurements reports (containing GPS data); MDT-Minimization of Drive Test; Correlation with data shared by other BBUs; iv. UE clustering for CSIA and non CSIA learned by AI/ML algorithm based on channel conditions and soft measurements, like but not only, SINR/CQI/Noise measurements/BLER/etc. can be leveraged to classify specific UE to specific CSIA zone; or a combination thereof.

Step 3: Communicate with cells inducing the CSIA to adjust allocations. In each scheduling opportunity (TTI resolution), each BBU performs its scheduling process for candidate UEs. For all UEs associated to a CSIA, the following data shall be shared over the channel, in some embodiments: PRB Start; Num PRB; UE Score—as defined below.

Step 4: Optimize for specific metric. Many different metrics can be considered, such as (and not limited to): Type of service-based on QCI; UE AMBR; Average number of re-transmissions; CQI; Overall channel TPT; minimizing SDR; UEs in Handover procedure; FEC iterations in UL; UE fairness (preventing starvation); Cell-level priority: round robin; Weighted by number of UEs in CSIAs; Weighted by number of sector layers.

Dynamic Latency Compensation for RAN Transport (72815)

As RAN technology continues to evolve, it is increasingly common for CSPs to adopt a centralized RAN approach, enabling the re-location of various network components from cell site to a centralized location. This architecture has many advantages such as: reducing cell sites maintenance cost, leverage of cloud technologies, cluster level performance management and optimizations, improved spectral efficiency, etc.

However, a major challenge with this approach is the increased latency derived from the geographical separation of the network functionalities, as well as the network topology between them and the possible causes for route changes (e.g., routing change to backup route when master route fails) affecting that latency dynamically. Specifically, the latency limitations become stricter, the lower the layer being centralized.

We propose a novel approach for identifying the latency rate and mitigating that latency effects by different means of calibration/compensation, if required. In this proposal, we also address the cyber-security risks and approaches to mitigate them.

In this document the "RAN compute platform" will be referred to as a "BBU" or "Base Band Unit".

The traditional approach to RAN implementation is an "all-in-one" solution which is comprised of dedicated HW that serves the entire base-station (sector or site level) functionalities from radio and the physical layer (L1) to the higher layer (L3).

Figure 11:
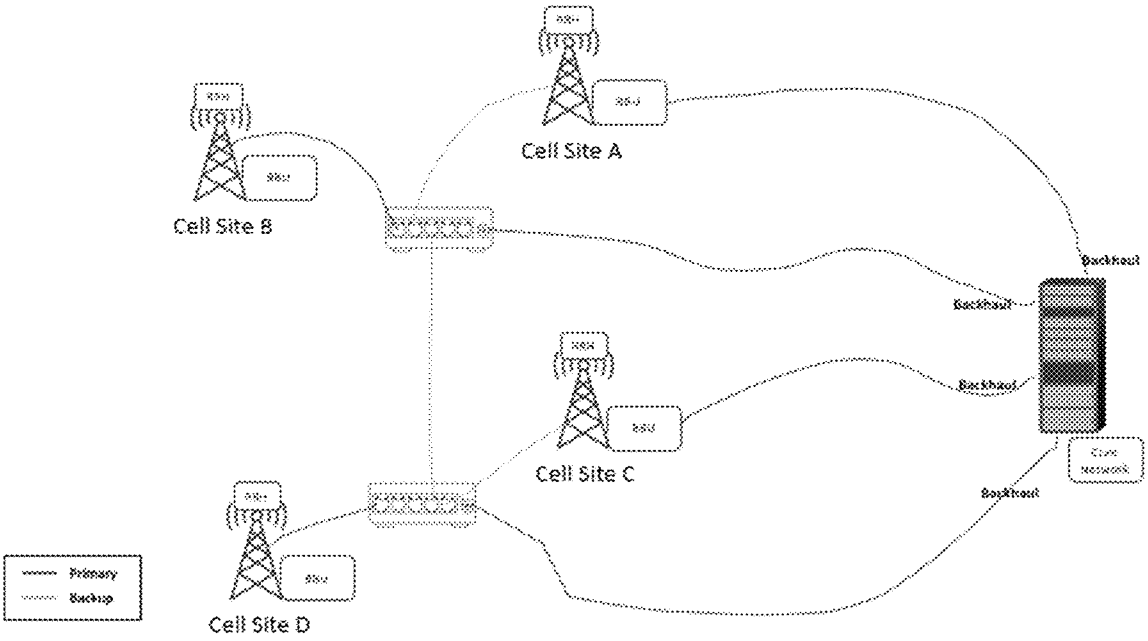
FIG. 11 is a further schematic drawing of a distributed cellular radio access network architecture, in accordance with some embodiments.

An increasingly common trend is the decoupling of the different functionalities, implemented as a separation of dedicated Radio HW and COTS computing components serving the RAN functionalities (BBU), which reside on the cell site, as shown in FIG. 11.

Figure 10:
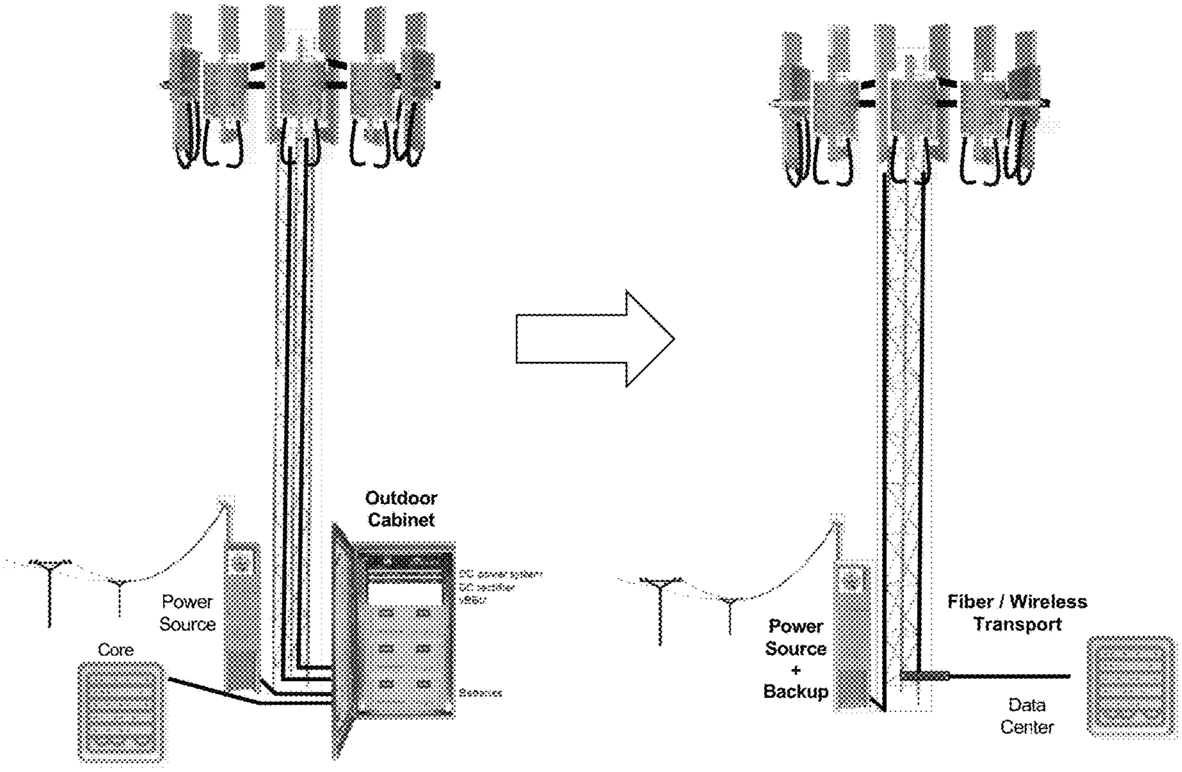
FIG. 10 is a further schematic drawing of a cellular radio access network showing an on-site to cloud transition, in accordance with some embodiments.

This evolution of RAN allows the distancing of the BBU component from the cell site to a centralized location, up to a certain range which depends on the specific implementation and RAN constraints in terms of latency, jitter, transport technology etc, as shown in FIG. 10.

Figure 12:
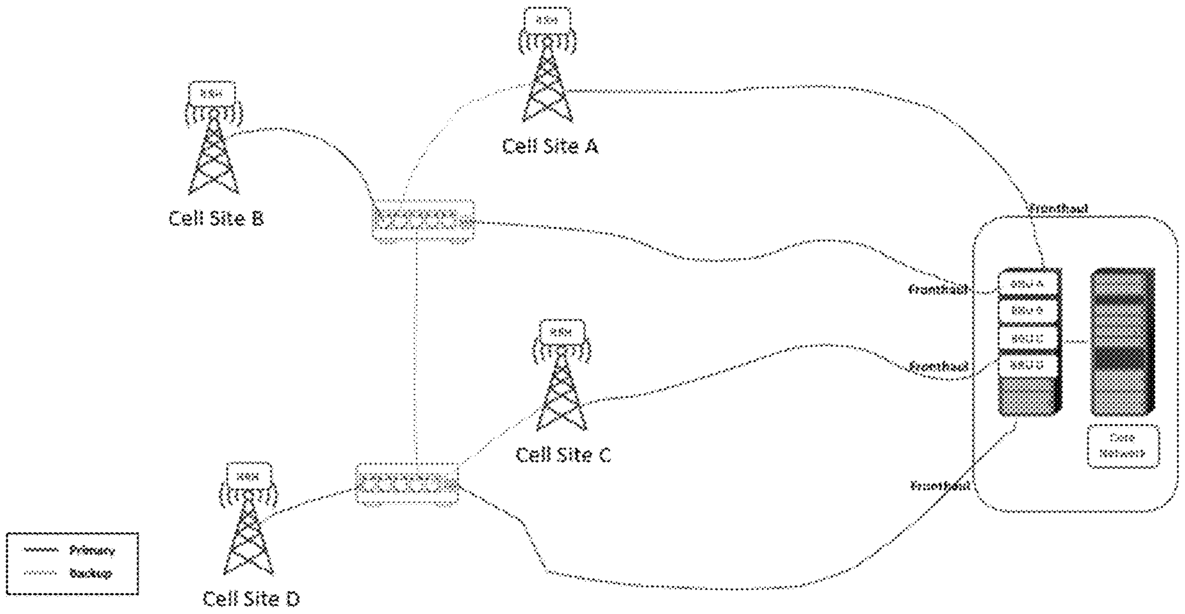
FIG. 12 is a further schematic drawing of a cellular radio access network architecture with centralized BBU hosting, in accordance with some embodiments.

A significant challenge to consider when centralizing the BBUs, is the change in traffic type between the data center and the cell site—the link traditionally carrying Backhaul traffic is now passing Fronthaul traffic (or mid-haul traffic, depending on the cell-site, data center split), as shown in FIG. 12, which has higher latency and jitter constraints, making it harder to secure.

Figure 13:
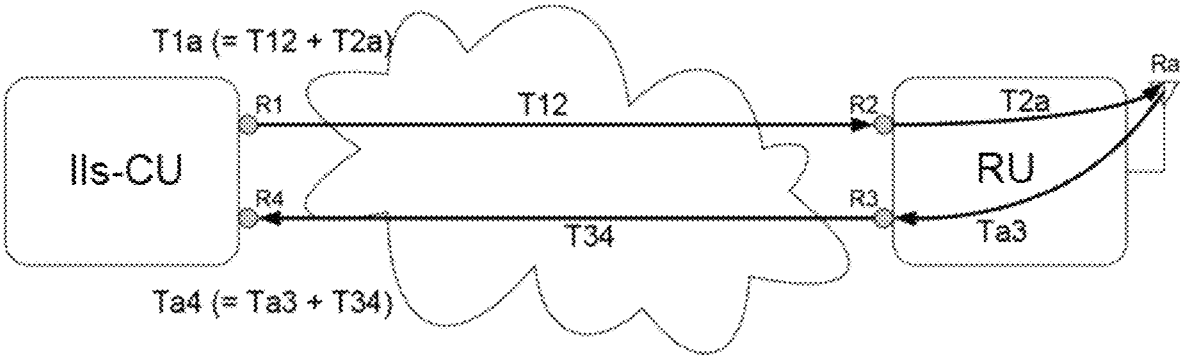
FIG. 13 is a schematic diagram of latency timings for communications between a centralized unit and a radio unit, in accordance with some embodiments.

In general, increasing the distance between the BBU and the RRH affects only the BBU-RRH propagation time (T12, T34) and not the processing on either side, which should remain constant per configuration. This is shown in FIG. 13.

Centralized RAN architecture imposes new challenges when separating lower layer functionalities to different HW and geographic locations, in terms of real time constraints and synchronization accuracy between these functions. The lower the layer being split, the stricter the latency constraints become.

The geographical distance, network topology and network equipment capabilities all contribute to the accumulated latency between L1 and RRH and shall not breach the constraints mentioned above.

Moreover, the latency may be dynamic, as routing changes (intentional or not) may cause drastic changes—for instance, a fault on a default route might cause a backup route to be used, which may add significant latency.

Another concern when distributing the functions is that the medium between them may be exposed to various cyber-security risks, such as MITM attacks to intercept data or gaining control over the RRH, etc.

We propose an approach which includes latency monitoring, compensating for it if required—and doing so while mitigating the security risks over the transport network. All to enable CSPs to increase the distance between the data center and cell site, to leverage the benefits of fully centralized RAN architecture.

In some embodiments, there are two main steps in the proposed approach for dealing with the latency problem, the first one is latency monitoring and the second is latency auto-compensation.

Figure 14:
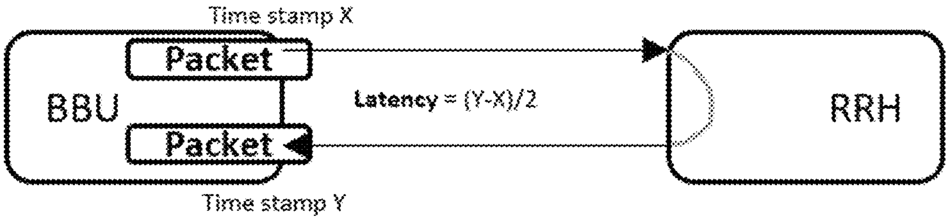
FIG. 14 is a schematic diagram of communications between a BBU and an RRH, in accordance with some embodiments.
Figure 15:
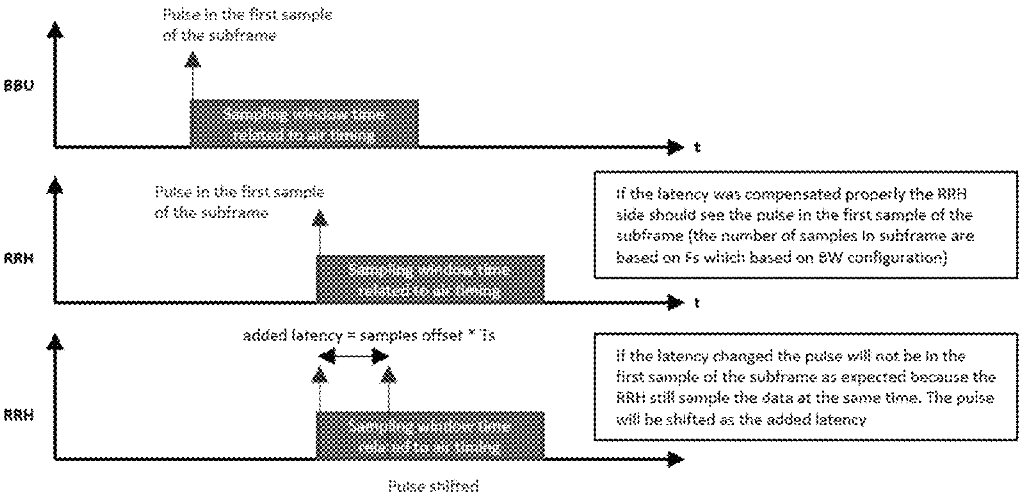
FIG. 15 is a schematic diagram showing sampling window time relating to air timing, in accordance with some embodiments.

Latency monitoring involves obtaining periodic latency measurements or triggered latency measurements by a specific event; the number of samples and the desired threshold determined based on the specific deployment characteristics. Another option it to trigger the latency measurements based on transport network routing changes that CSPs might perform if required. Various measurements methods can be utilized separately or in combination, such as: measurements based on late/early/on time packets counters in the RRH/BBU side, where the counters are defined as part of O-RAN standard and/or implemented on both sides related to transmission/reception window defined in the system; measurements based on delay calculation as part of the s-plane protocol (1588 PTP); measurements based on various standard tools such as: ping, iperf, netperf, etc.; measurements based on RRH loopback capability—by using dedicated indication over u-plane/c-plane packets under the ORAN header (or equivalent method on non-ORAN interface), the RRH can enable/disable loopback mode. The enable indication will be sent periodically in order to monitor the latency, wherein the calculation shall be as shown in FIG. 14; measurements based on UEs measurements reports—by using UEs periodic measurements reports towards BBU, such as: TA (timing advance), GPS location and/or channel estimation, the BBU can identify latency changes if the TA value changes but GPS location and the channel remain the same for example. This would indicate that the change in latency is added in the RRH-BBU channel. Namely, transport latency change that affects RAN to user timing identified by standard RAN means; and/or, measurements based on periodic transmission of a dedicated signal for latency measurement utilizing idle/non idle periods—by using a dedicated indication over u-plane/c-plane packets under the ORAN header (or equivalently on non-ORAN interface), the BBU can initiate a latency report from the RRH. In this u-plane packet, the IQ-data represents a pre-defined calibration IQ, the RRH should do the following measurement and calculation; this is shown in FIG. 15. The dedicated signal shall include a pulse in the first sample of the subframe, in some embodiments, with the sampling window time related to the air timing. If the latency was compensated properly the RRH side should see the pulse in the first sample of the subframe (the number of samples in subframe are based on Fs which based on BW configuration). If the latency changed the pulse will not be in the first sample of the subframe as expected because the RRH still sample the data at the same time. The pulse will be shifted as the added latency. All or any subset of the above methods can be used individually or in combination, in some embodiments.

Latency auto-compensation involves steps where, when high latency or significant enough latency change is identified on the transport network, any one or more of the following means used to mitigate it. In general, a CSP even can plan a network deployment that will require latency mitigation by design. Adjusting the transmission/reception window on the BBU/RRH can be performed by assessing various measurements, including the following: measurements that are available which give an indication about the existence of the latency, but not its duration, in which case the latency compensation will utilize an iterative process of window adjustment in small steps (convergence process); or, measurements which produce a calculated added latency, in which case it is possible to adjust the windows by the desired offset.

The window adjustment for latency auto-compensation has a strict bound-its duration plus the overall processing time cannot breach the TTI boundary. In the case that the windows can't be shortened, the processing time needs to be considered. It follows that shortening the processing time budget of the BBU can accommodate the increased latency on the BBU-RRH channel. In some embodiments, a certain level of reduced network performance may be accommodated to allow extended transmission/reception windows. Reducing processing time may be performed by reducing the processing time budget for the PHY layer, and/or the L2/L3 layer, as follows. As used herein, the term PHY layer (or alternatively L1) is meant as a general term encompassing the processing steps involved in transforming analog RF samples to digital data, from whatever waveform is in use for the particular operating mode or radio access technology. L2 and L3 are the next two immediately higher layers from PHY, in some embodiments.

Reduction of PHY processing time may be performed by, for example, in some embodiments, adding CPU resources to parallelize the processing; adding hardware accelerators or other such resources to accelerate processing time; and/or reducing max FEC iterations in the uplink.

Reduction of L2/L3 processing time may be achieved by, in some embodiments: limiting the number of PRBs scheduled; limiting MCS (Stricter % BLER target) and/or increase transmit power (e.g. required transmit power by the user) to improve probability of successful communication; reducing MIMO streams; modifying MU-MIMO capabilities by, e.g., reducing number of UEs served at the same time in MU mode; modifying PRACH configuration index by, e.g., reduce number of PRACH opportunities; (for 5G) modifying resource Allocation in time domain for feedback and transmission response timing (K0, K1, K2, N1, N2), which can space the work need to be done in the system and effectively reduce the amount of processing needed at a given time; (for 4G) performing selective UCI processing by modifying re-transmission procedure mode of work—by ignoring specific RVs (selective feedback), thereby spacing the work need to be done in the system, relying on future UE re-transmissions to be answered, or similarly, selectively ignoring SR, CQI, RI reports in a way that RAN service is still maintained but might be with reduced KPIs; and/or, finally, extending UCI periodicities (SR, CQI, RI reports). Other analogous reductions of L2/L3 processing time are also possible.

Figure 16:
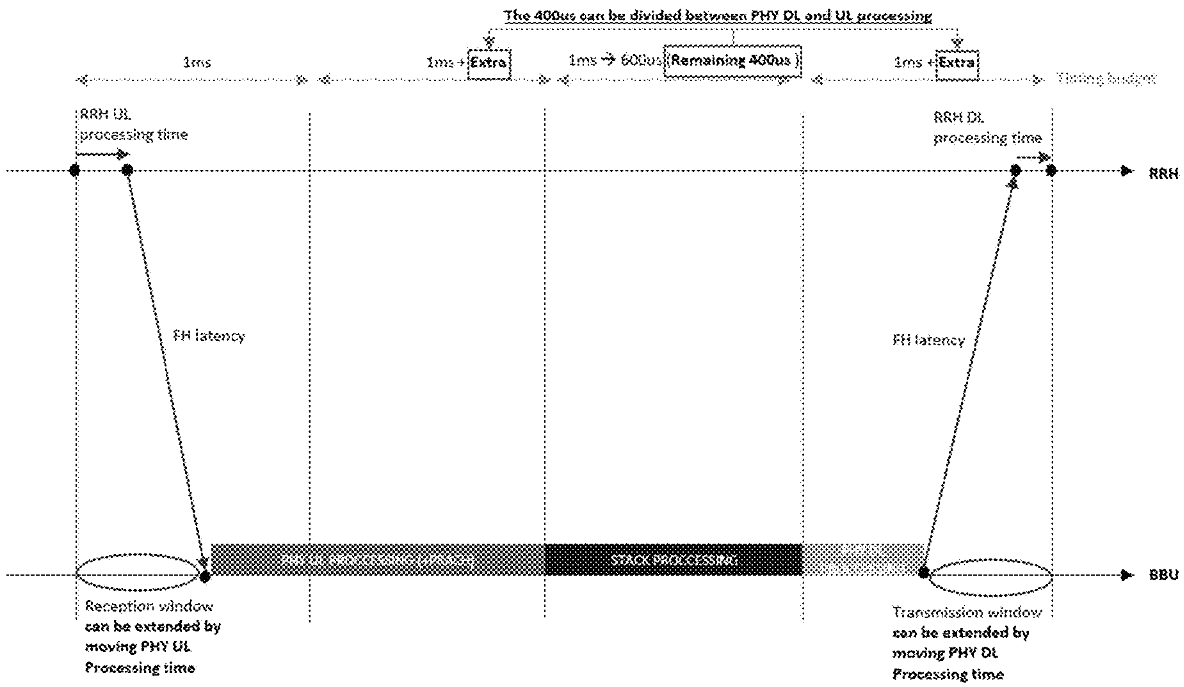
FIG. 16 is a first timing diagram showing a centralized RAN deployment architecture, in accordance with some embodiments.
Figure 17:
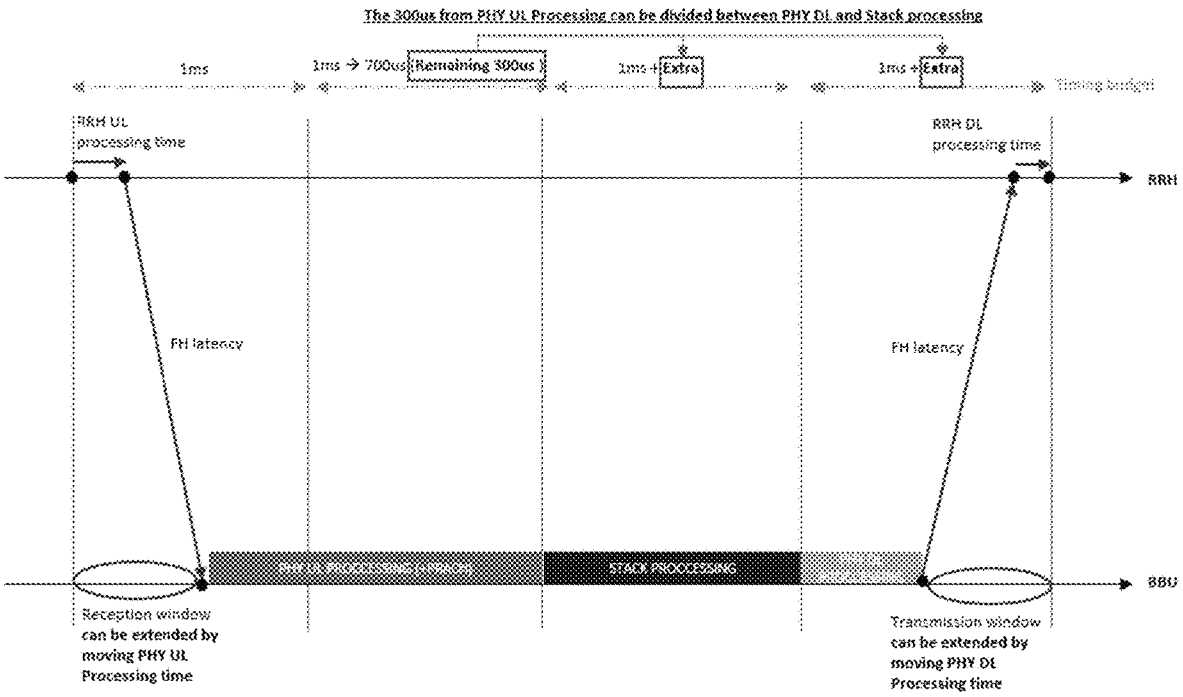
FIG. 17 is a second timing diagram showing a centralized RAN deployment architecture, in accordance with some embodiments.
Figure 18:
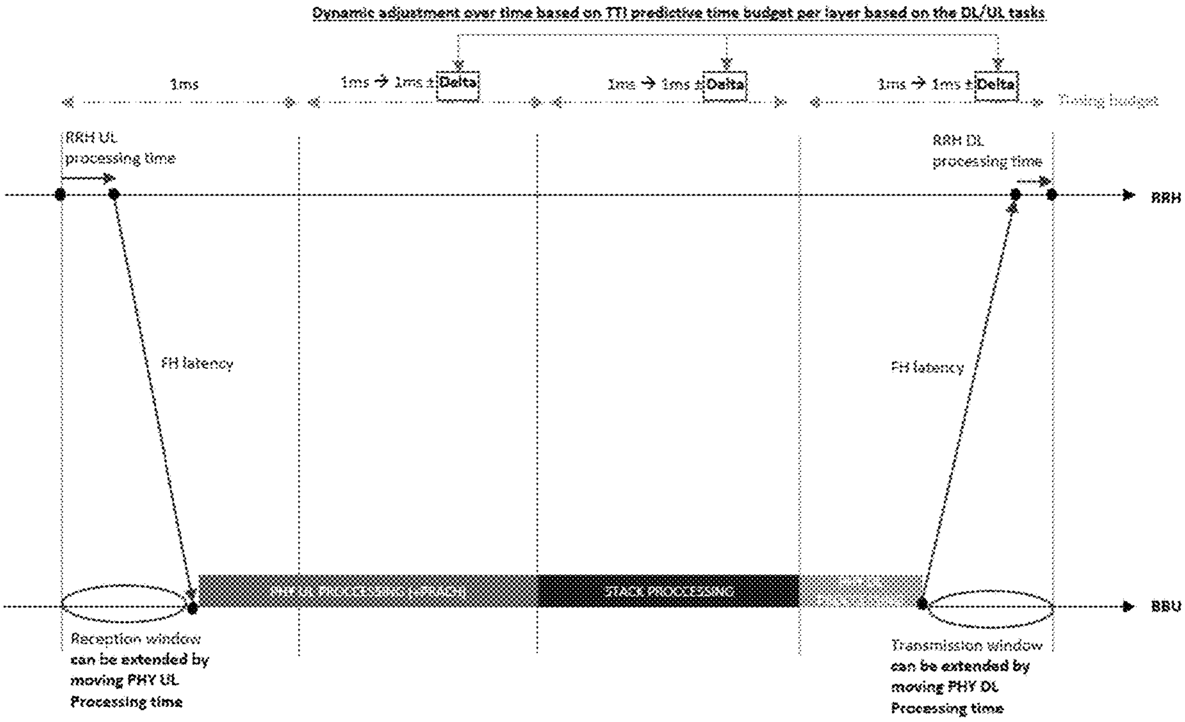
FIG. 18 is a third timing diagram showing a centralized RAN deployment architecture, in accordance with some embodiments.
Figure 19:
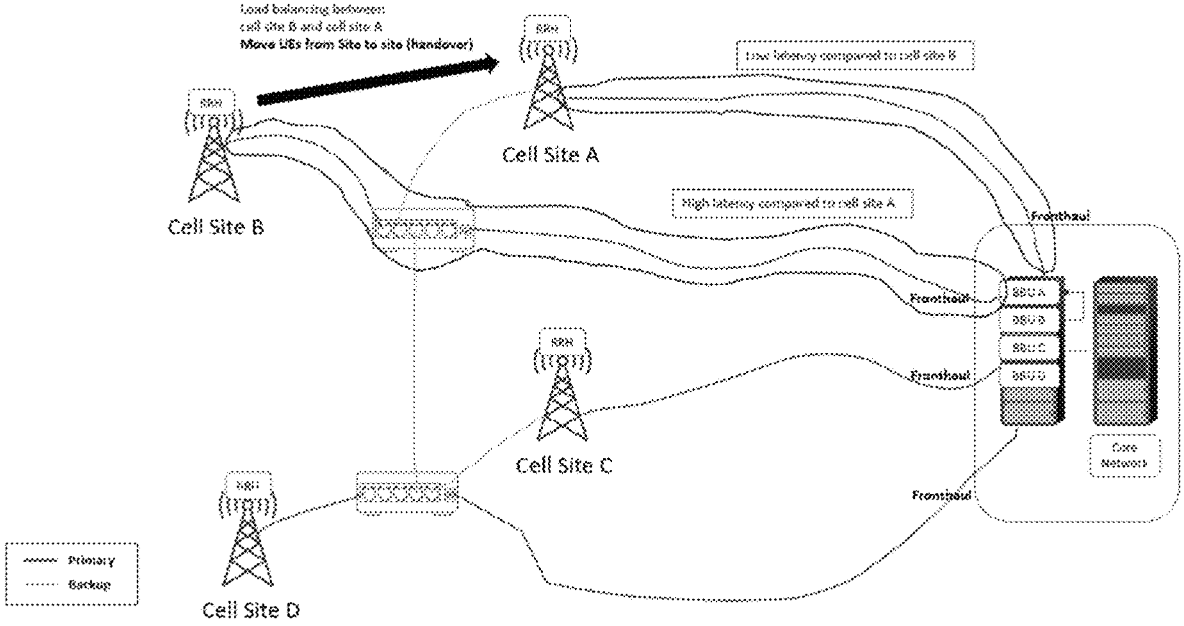
FIG. 19 is a schematic diagram of a centralized RAN deployment in operation, in accordance with some embodiments.
Figure 20:
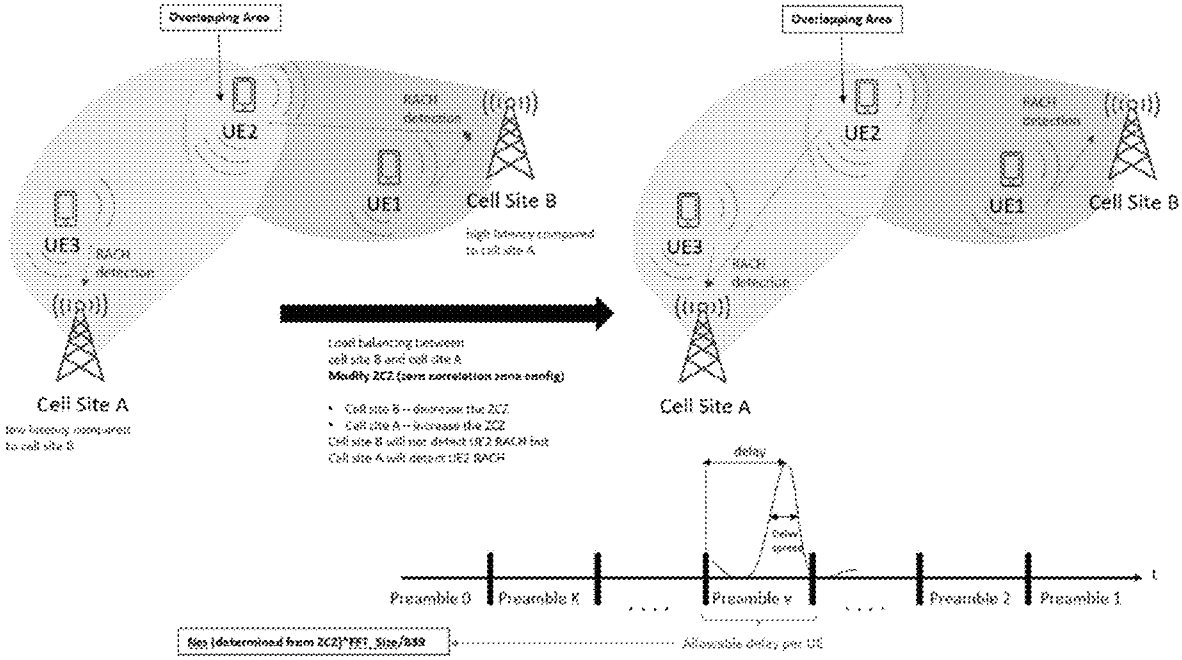
FIG. 20 is a schematic diagram of load balancing in a centralized RAN deployment, in accordance with some embodiments.
Figure 21:
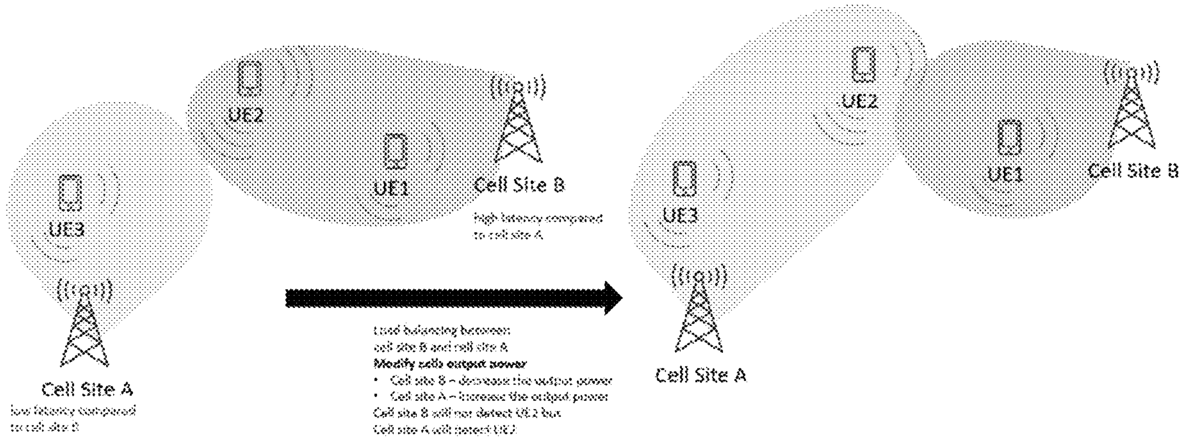
FIG. 21 is a further schematic diagram of load balancing in a centralized RAN deployment, in accordance with some embodiments.

Reduction of processing time may also be performed at other layers or at the system level, in some embodiments. In some embodiments, adjusting processing time budget (shrinking) of any layer to allow other layers more processing time may include: reducing the higher layer TTI processing budget to extend the lower layers processing timing budget; this is shown in FIG. 16; reducing the lower layer TTI processing budget to extend the higher layers processing timing budget; this is shown in FIG. 17; and/or performing dynamic adjustment over time based on TTI predictive time budget per layer based on the DL/UL tasks; this is shown in FIG. 18. When possible, reallocation of resources from other RAN processing entities (e.g. from RAN applications processing different cells/sites) to the RAN processing entity that became stricter on processing time budget In some embodiments, as part of cluster level optimizations in centralization approach, it is useful to utilize load balancing, to reduce load on cells with high latency, thus additionally reducing the BBU processing time. Load balancing may be performed by, e.g.: moving UEs from a loaded cell to a less-loaded cell earlier, (handover), by adjusting measurements thresholds, as is shown in FIG. 19; modifying ZCZ (zero correlation zone config), such that the higher layers can identify load on BBUs with high latency, which may include balancing and optimize the ZCZ configuration between cells to affect the UE cell selection and attach to a less-loaded cell, effectively reducing the cell range of loaded cells, as is shown in FIG. 20; and/or modifying cells' minimum Rx power threshold, enabling the higher layers can identify load on BBUs with high latency, using the RX threshold measured by the UEs (e.g., in 4G/NR—QrxLevMin) to reduce the number of UEs selecting this site for network entry, as is shown in FIG. 21.

FIG. 10 is a further schematic drawing of a cellular radio access network showing an on-site to cloud transition, in accordance with some embodiments. On the left, a prior art cellular radio access network is shown. A power source and a core network are shown connected to an outdoor cabinet, which in turn contains a DC power switch, a DC rectifier, and a vBBU, along with batteries. The outdoor cabinet is at the base of a tower, and wires connect the outdoor cabinet to radio elements at the top of the tower.

Continuing on, on the right, an on-site to cloud transition is shown, with the advantages that: the cell site becomes a mechanical solution; real estate saving is provided, which is critical in dense urban; and easy and efficient scalability is provided. The power source is no longer coupled to the outdoor cabinet but connects directly to the radio elements on the tower. As well, fiber/wireless transport is shown, directly connecting the radio elements on the tower to a data center.

FIG. 11 is a further schematic drawing of a distributed cellular radio access network architecture, in accordance with some embodiments. The traditional approach to RAN implementation is an "all-in-one" solution which is comprised of dedicated HW that serves the entire base-station (sector or site level) functionalities from radio and the physical layer (L1) to the higher layer (L3). An increasingly common trend is the decoupling of the different functionalities, implemented as a separation of dedicated Radio HW and COTS computing components serving the RAN functionalities (BBU), which reside on the cell site, as shown in FIG. 11.

FIG. 12 is a further schematic drawing of a cellular radio access network architecture with centralized BBU hosting, in accordance with some embodiments. This evolution of RAN allows the distancing of the BBU component from the cell site to a centralized location, up to a certain range which depends on the specific implementation and RAN constraints in terms of latency, jitter, transport technology etc.

FIG. 13 is a schematic diagram of latency timings for communications between a centralized unit and a radio unit, in accordance with some embodiments. A main challenge to consider when centralizing the BBUs, is the change in traffic type between the data center and the cell site—the link traditionally carrying Backhaul traffic is now passing Fronthaul traffic (or mid-haul traffic, depending on the cell-site, data center split), which has higher latency and jitter constraints, making it harder to secure. In general, increasing the distance between the BBU and the RRH affects only the BBU-RRH propagation time (T12, T34) and not the processing on either side, which should remain constant per configuration.

FIG. 14 is a schematic diagram of communications between a BBU and an RRH, in accordance with some embodiments. Latency monitoring is made possible in FIG. 14 using RRH loopback capability—by using dedicated indication over u-plane/c-plane packets under the ORAN header (or equivalent method on non-ORAN interface), the RRH can enable/disable loopback mode. The enable indication will be sent periodically in order to monitor the latency. The calculation is shown in FIG. 14.

FIG. 15 is a schematic diagram showing sampling window time relating to air timing, in accordance with some embodiments. Measurements may be based on periodic transmission of a dedicated signal for latency measurement utilizing idle/non idle periods—by using a dedicated indication over u-plane/c-plane packets under the ORAN header (or equivalently on non-ORAN interface), the BBU can initiate a latency report from the RRH. In this u-plane packet, the IQ-data represents a pre-defined calibration IQ, the RRH should do the measurement and calculation as shown in FIG. 15.

FIG. 16 is a first timing diagram showing a centralized RAN deployment architecture, in accordance with some embodiments. Adjusting processing time budget (shrinking) of a layer to allow other layers more processing time is shown, in FIG. 16 as a reduction of the higher layer TTI processing budget to extend the lower layer's processing timing budget.

FIG. 17 is a second timing diagram showing a centralized RAN deployment architecture, in accordance with some embodiments. Adjusting processing time budget (shrinking) of a layer to allow other layers more processing time is shown, in FIG. 17 as a reduction of the lower layer TTI processing budget to extend the higher layer's processing timing budget.

FIG. 18 is a third timing diagram showing a centralized RAN deployment architecture, in accordance with some embodiments. Dynamic adjustment over time based on TTI predictive time budget per layer based on DL/UL tasks is shown. This is done by when possible, reallocate resources from other RAN processing entities (e.g. from RAN applications processing different cells/sites) to the RAN processing entity that became stricter on processing time budget.

FIG. 19 is a schematic diagram of a centralized RAN deployment in operation, in accordance with some embodiments. As part of cluster level optimizations in centralization approach, utilize load balancing to reduce load on cells with high latency, thus reducing the BBU processing time, for example as shown in FIG. 19, by moving UEs from a loaded cell to a less-loaded cell earlier, (handover), by adjusting measurements thresholds.

FIG. 20 is a schematic diagram of load balancing in a centralized RAN deployment, in accordance with some embodiments. As part of cluster level optimizations in centralization approach, utilize load balancing to reduce load on cells with high latency, thus reducing the BBU processing time, for example as shown in FIG. 20, by modifying ZCZ (zero correlation zone config). The higher layers can identify load on BBUs with high latency, Balancing and optimize the ZCZ configuration between cells to affect the UE cell selection and attach to a less-loaded cell. This effectively reduces the cell range of loaded cells.

FIG. 21 is a further schematic diagram of load balancing in a centralized RAN deployment, in accordance with some embodiments. As part of cluster level optimizations in centralization approach, utilize load balancing to reduce load on cells with high latency, thus reducing the BBU processing time, for example as shown in FIG. 21, by modifying cells' min Rx power TH. The higher layers can identify load on BBUs with high latency, Using the RX threshold measured by the UEs (in 4G/NR-QrxLevMin)—to reduce the number of UEs selecting this site for network entry.

Packet Security for RAN Transport (72815)

As mentioned before, when distributing the functions (between cell site and data center), a consideration is that the medium between them may be exposed to various cybersecurity risks. CSPs which adopt fully centralization approach will move the BBUs from cell site to data center and this will change the traffic type to FH (fronthaul) traffic. FH traffic includes two main types of traffic: non-RT (non-real time) traffic, principally management plane (M-plane) traffic, and, RT (real-time) traffic. Non-RT packets (M-plane) packets have no strict RT constraints, allowing the usage of standard security protocols such as (IPSEC/TLS/etc.) for security (like BH traffic). This is possible since the traffic load in low and latency requirements are non-stringent.

RT traffic is provided in packets and involves C/U/S-plane data.

In contrast to M-plane packets, C/U/S-planes packets have strict RT constraints. Encryption/securing can be implemented in SW and/or in dedicated HW. There are various ways to secure the FH traffic such as: scrambler/descrambler the FH data on BBU/RRH with unique pattern that may be fixed or changing over time; pre-defined non-standard IQ compression (no BFP or modulation compression). Namely, a proprietary compression approach known to both sides and hence will be hard to decipher; and/or performing a mathematical/logical operation on the IQ data using a bank of sequences known in advance to both sides of the system (BBU/RRH). The mathematical/logical operation and the bank of sequences are coordinated and change periodically (just the sequence/operation or both). This is shown in FIG. 22.

Figure 22:
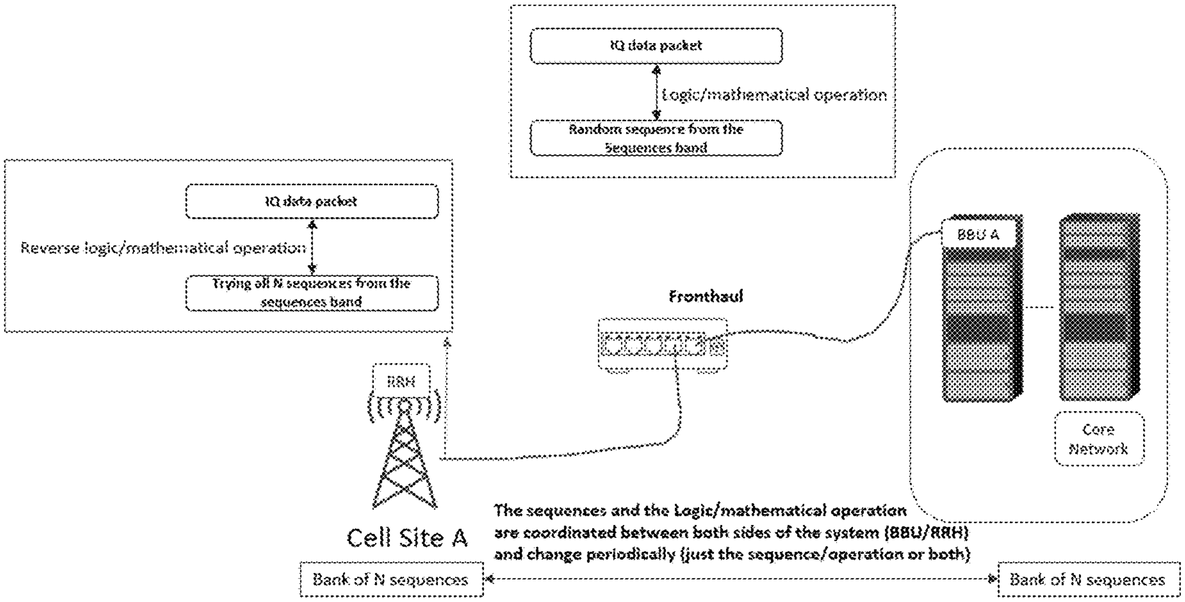
FIG. 22 is a schematic diagram showing fronthaul encryption in a centralized RAN architecture, in accordance with some embodiments.

FIG. 22 is a schematic diagram showing fronthaul encryption in a centralized RAN architecture, in accordance with some embodiments. Fronthaul packet security is also contemplated. As mentioned before, when distributing the functions between cell site and data center, one consideration is that the medium between them may be exposed to various cybersecurity risks. CSPs which adopt fully centralization approach may move the BBUs from cell site to data center and this will change the traffic type to FH (fronthaul) traffic. FH traffic includes two main types of traffic: Non-RT packets (M-plane), which have no strict RT constraints, allowing the usage of standard security protocols such as (IPSEC/TLS/etc.) for security (like BH traffic). This is possible since the traffic load in low and latency requirements are non-stringent; and, RT Packets (C/U/S-planes), which, in contrast to M-plane packets, have strict RT constraints. Encryption/securing of C/U/S-plane packets can be implemented in software and/or in hardware. There are various ways to secure the FH traffic such as: Scramble/descramble the FH data on BBU/RRH with unique pattern that may be fixed or changing over time; Pre-defined non-standard IQ compression (no BFP or modulation compression), namely, a proprietary compression approach known to both sides and hence will be hard to decipher; performing a mathematical/logical operation on the IQ data using a bank of sequences known in advance to both sides of the system (BBU/RRH), where the mathematical/logical operation and the bank of sequences are coordinated and change periodically (just the sequence/operation or both). The encryption/securing ways described for RT-packets are applicable also to the non-RT packets.

The encryption/securing methods and systems described for RT packets are applicable also to the non-RT packets, in some embodiments. The methods and systems disclosed herein are applicable to wired and/or wireless FH, in some embodiments. The methods and systems above are applicable to DL (downlink) and/or UL (uplink), in some embodiments. The methods and systems above are applicable for 4G and 5G, and where appropriate, 2G and 3G, in some embodiments. 2G and 3G have less stringent latency considerations and are able to be centralized with remote RRH with or without the methods and systems described herein, but will have favorable characteristics when used in conjunction with the methods and systems described herein.

Broader Implications

This disclosure enables Moving from site level granularity to cluster level granularity—this is significantly different from what was possible before. The competition is centralizing cell site compute platforms and gain some of the centralization gains, they can do 2-4 site clustering. By reducing latency across a large number of sites, it is possible to run 10s and 100s of sites cluster as if it's a single machine running the full workload.

Also, Better approach for cell processing pooling over data center infrastructure—predicted to reduce 50% of compute requirements. This is also driven from the fact that now we need to accommodate large cluster peak instead of a specific site peak which means lower RAN compute requirements.

Also, Improved spectral efficiency by cross-site processing features. Far better than being able to provide cross-site processing across clusters of 2-4 sites, rather, with PW's solution any sites joint processing is possible—this means that joint processing benefits will not be limited to specific group of sites (small amount of sites) only.

With cluster level granularity this also allows for full cluster level optimization. This means that the overall network configuration and performance are tuned in a way that was never done before and our cluster level approach predicted to shows better performance compared to traditional SON algorithms. Simple example is taking power saving optimization to refer to cluster level instead of site level. Similar example can be cluster level spectral efficiency management compared to site level.

Total elimination of cell site compute platform reduces dramatically site visits and maintenance, saving rental cost and reducing site power backup.

Also, centralization allows for greater level of resiliency and redundancy for RAN functions—this will reduce dramatically the down time of the cells/sites.

True CI-CD process enabled with full centralization-SW installation/upgrade/downgrade will be done in minimal time saving CSPs the burden in planning maintainance widows exhaustively. This is done by leveraging our cloudified solutions and the ability to "hot-swap" RAN SW for specific cells/sites in extremely short time.

The main challenge is the increased requirements (greater TPT and stringent latency) over the transport that now need to carry fronthaul traffic instead of backhaul or midhaul (commonly, split 2) traffic, which is solved by the present disclosure.

In some cases reduction of fronthaul required data rate may also be used in complementary fashion to enable greater aggregation and centralization, or to enable centralization at a greater physical distance from the cell site.

We can deploy distributed architecture and mix such sites with partially centralized or fully centralized sites in single network with single orchestration and management system, in some embodiments.

Cluster Level Approach for RAN Application Redundancy and Resiliency (72818)

As RAN technology evolves it is increasingly common for different functionalities in the network to run on general purpose, COTS compute platforms. This approach has many advantages which may include (1) a bigger variety of compatible HW-thus reducing costs, (2) easier to manage with standard tools, (3) faster to upgrade platforms or add dedicated accelerators, (4) reusable, etc.

Moreover, operating a RAN on COTS HW enables the adoption of various methodologies used to ensure system redundancy and resiliency for the sake of High Availability.

We propose an approach for improving RAN redundancy, by utilizing concepts of backup SW and HW, flexible abstraction layers to reduce dependencies between components, clustering of HW in distributed or centralized locations-all to reduce the cell down time and minimize service disruption.

For the ease of reading, a "BBU" or "Base Band Unit" may be referred to as interchangeably as a "RAN compute platform".

The traditional approach to RAN implementation is an "all-in-one" solution which comprises of dedicated HW running embedded SW that serves the entire base-station (sector or site level) functionalities from the physical layer (L1) to the higher layer (L3).

Traditionally, this kind of solution is not very flexible in the redundancy aspect-when such a fault occurs, it results in service down time, until a recovery procedure takes place. This often includes temporary reduced NW coverage, degraded KPIs, etc.

Centralizing the BBUs in a single location was generally referred to as C-RAN in a previous generation, or centralization and can be greatly beneficial in terms of operation cost reduction. New methods and systems are described herein to enable the use of a centralized BBU architecture with new technologies.

The centralization can be further leveraged to optimize network redundancy and create RAN service resiliency in better ways compared to the traditional approach; the BBUs can be treated as nodes within a cluster (as defined in bullet 3.a), backed by resources meant to compensate for a temporary fault in any of the nodes. This can help reducing the down time and/or hit to performance in the effected cell site.

The BBU and RRH level are commonly susceptible to service disrupt when various faults occur.

This proposal leverages the migration of most RAN functionalities to COTS HW and centralization to data centers, to allow a flexible redundancy scheme with a variety of capabilities and costs. It's better than a typical embedded solution since COTS allows the adoption of a range of mature approaches to system redundancy, which cannot be achieved on dedicated HW.

There are many practices to achieve redundancy in general purpose COTS HW. As RAN functionalities are migrated to COTS HW, they can benefit from various ways aiming to ensure system resiliency.

The key to the following suggestions is the compartmentalization of a fault, coupled with a modular approach to SW and HW components, allowing to amend/replace a faulty component with minimal effect on the rest of the system and with minimal service impact to the end user.

In the following discussion we propose a variety of options to improve redundancy, depending on the deployment type—from a single compute node (for distributed BBU deployment in cell sites), through stacked platform to a virtualization host (many BBUs running on the same platform in a data center). These options may be stacked, combined, or used individually, in some embodiments, as discussed below.

Figure 23:
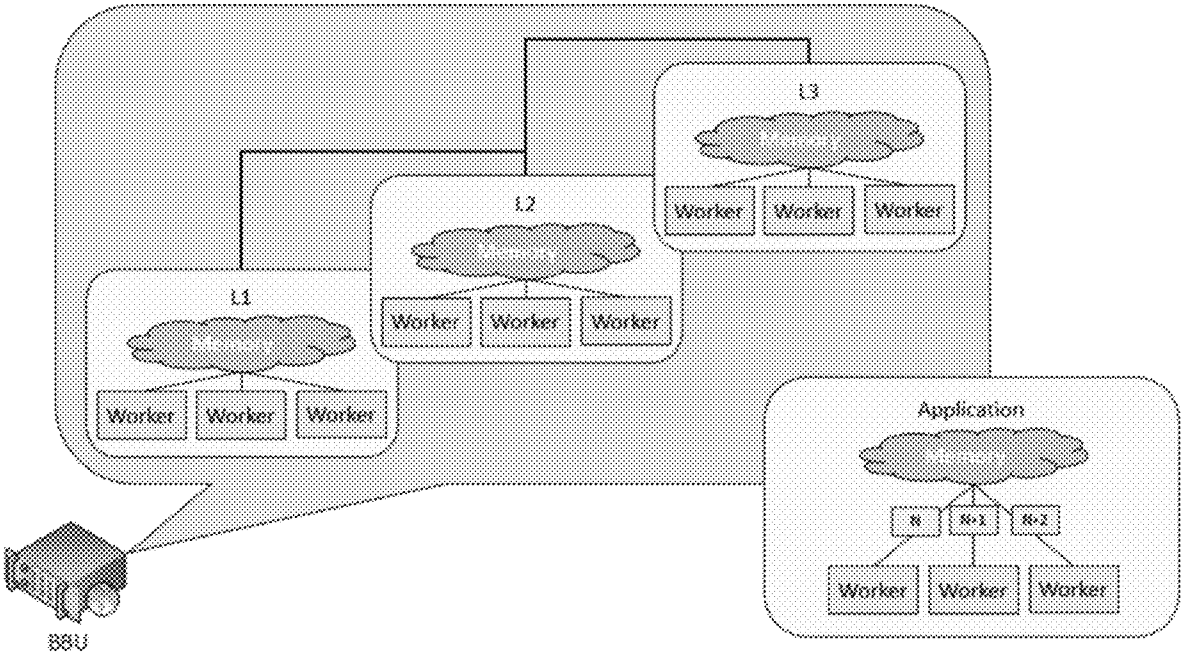
FIG. 23 is a schematic diagram of a centralized cellular radio access network architecture, in accordance with some embodiments.

FIG. 23 is a schematic diagram of services at a BBU, in accordance with some embodiments. A COTS compute platform is shown serving various RAN functionalities from Layer 1 (L1) to Layer 3 (L3). Each functionality has a workload. Each workload has shared memory and individual workers. Cloud architecture is used, in some embodiments.

Figure 24:
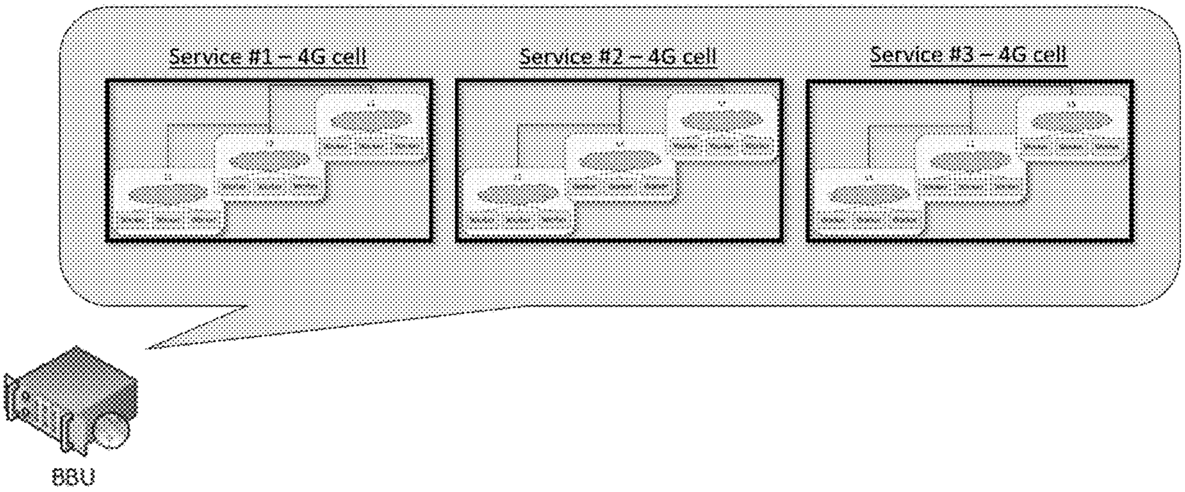
FIG. 24 is a schematic diagram of a distributed cellular radio access network architecture, in accordance with some embodiments.

FIG. 24 is a further schematic diagram of services at a BBU, in accordance with some embodiments. A service on (or at) a BBU is defined as the SW and HW used to realize a RAN functionality and is independent of other services which may reside on the same BBU. For instance, a service implementing a single cell is comprised of all layer applications, RRH, antenna, etc. A cluster is comprised of several BBUs capable of compensating (partially or fully in a service granularity) for each other's faults, considering various constraints—CPUs, memory, latency—and decoupled from their geographical location in relation to other BBUs in the same cluster.

Figure 25:
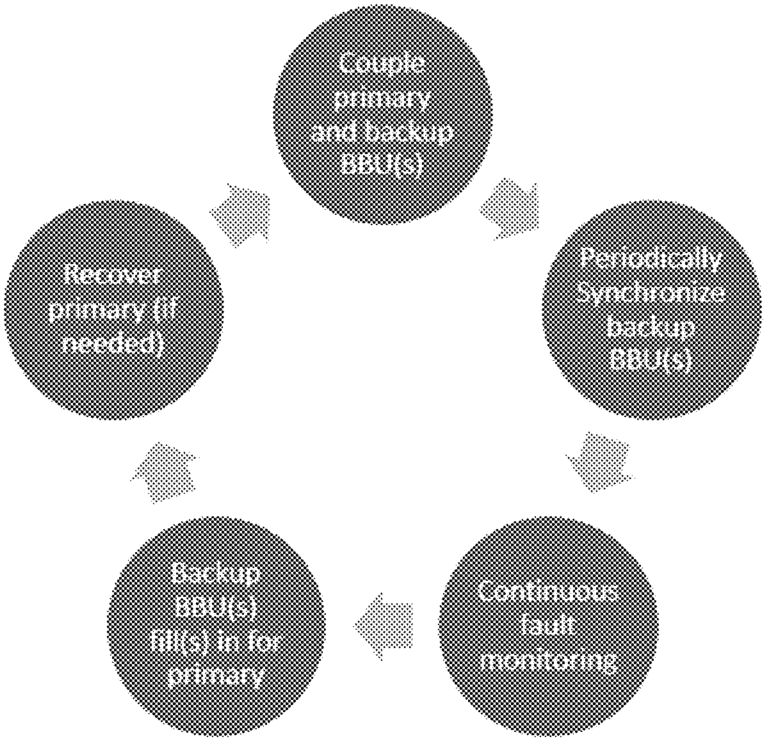
FIG. 25 is a schematic diagram of a second distributed cellular radio access network architecture, in accordance with some embodiments.

FIG. 25 is a flow diagram of BBU fault monitoring and failover, in accordance with some embodiments. The suggested approach to leveraging BBU clustering requires a several step procedure, does not require any centralized entity and is based on BBU-to-BBU communication, as follows: Couple primary and backup BBUs; periodically synchronize backup BBUs; continuous fault monitoring; backup BBUs fill in for primary; recovery primary if needed. Couple primary and backup BBUs: this should occur periodically (e.g., daily, or when the cell load changes significantly, etc). The reported resources (in the negotiation reply) are a pre-defined set—such as available CPUs, memory, storage, network latency between the nodes. Periodically synchronize backup BBU(s): The synchronization periodicity can vary depending on the desired UE experience in a fault event. for a minimal service interruption, a TTI resolution synchronization is required. Continuous fault monitoring: May use an active approach (faulty system instructs the backup to kick in) or a passive approach (a heartbeat mechanism-a missing heartbeat indicates a fault in primary system, implicitly causing backup to kick in). Backup BBU (s) fill(s) in for primary: When a fault is detected, a configuration is applied to allow the backup BBU to control HW components (e.g. RRH) in the faulty cell-site, acting as the primary BBU for that site until the recovery is done. The abstraction layer can be part of the switch functionality and/or a separate load balancer. Recover primary system (if needed): The primary system should recover and indicate to the backup system(s) it's up and running. Then it synchronizes its state and assumes control of each service from an agreed time.

Figure 26:
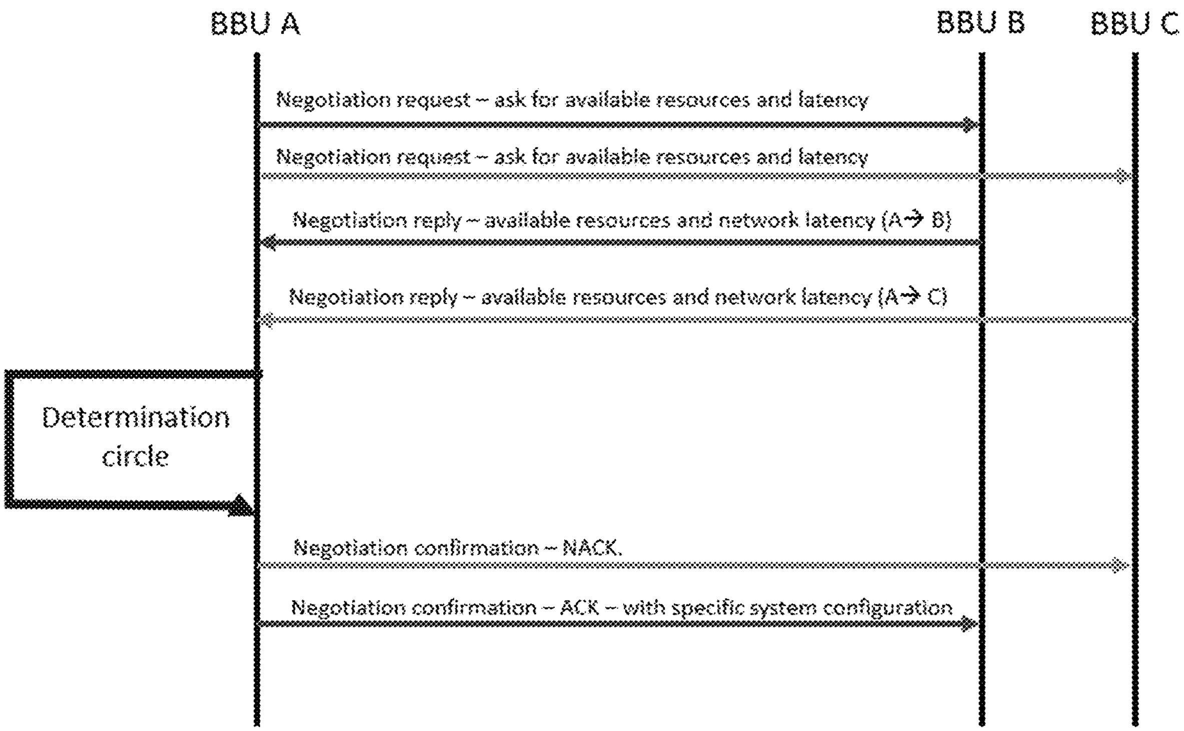
FIG. 26 is a sequence diagram of inter-BBU coordination, in accordance with some embodiments.

FIG. 26 is a sequence diagram of inter-BBU coordination, in accordance with some embodiments. This is further detail regarding negotiation to be performed for coupling primary and backup BBUs, in some embodiments.

Figure 27:
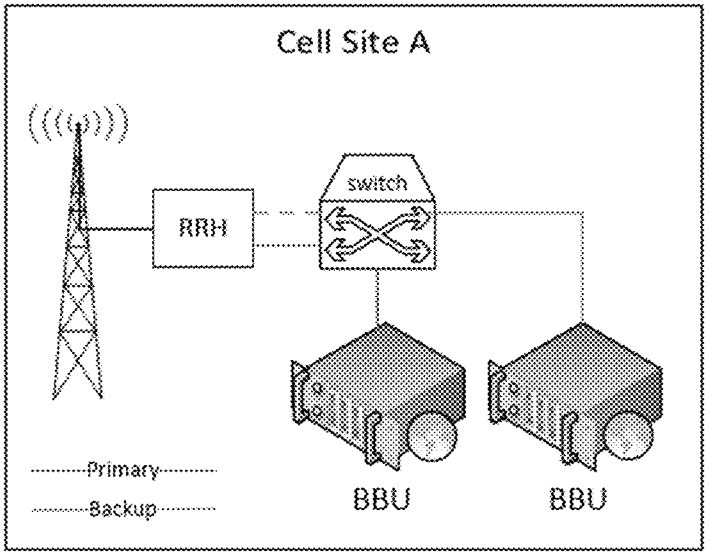
FIG. 27 is a flow diagram of BBU fault monitoring and failover, in accordance with some embodiments.

The BBU fault monitoring and failover sequence described in FIGS. 25 and 26 applies at least to the following figures: FIG. 27, 28, 29.

FIG. 27 is a schematic diagram of a distributed cellular radio access network architecture, in accordance with some embodiments.

Figure 28:
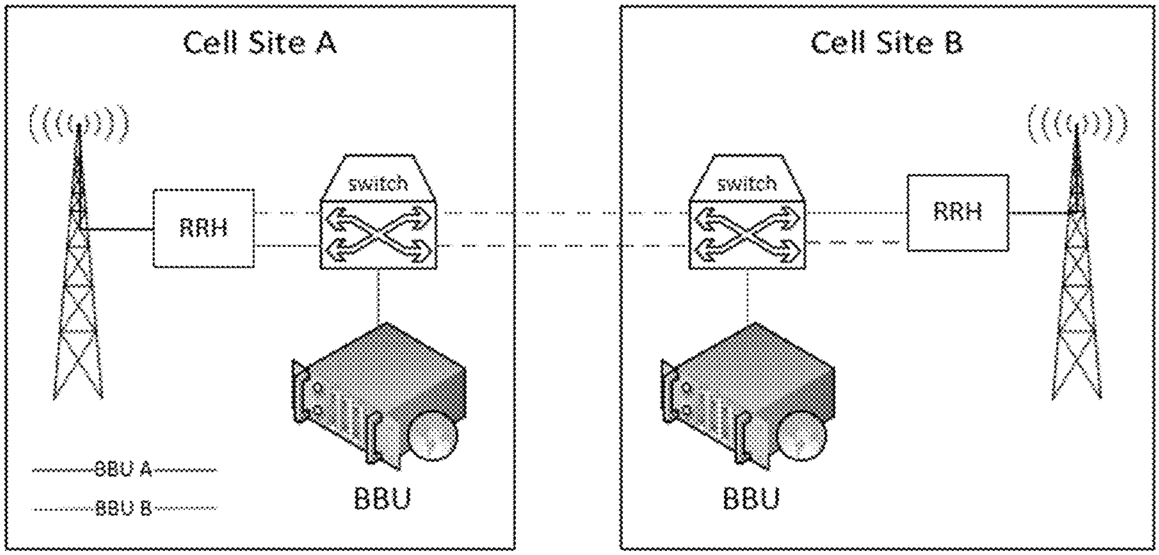
FIG. 28 is a schematic diagram of services at a BBU, in accordance with some embodiments.

FIG. 28 is a schematic diagram of a second distributed cellular radio access network architecture, in accordance with some embodiments.

Figure 29:
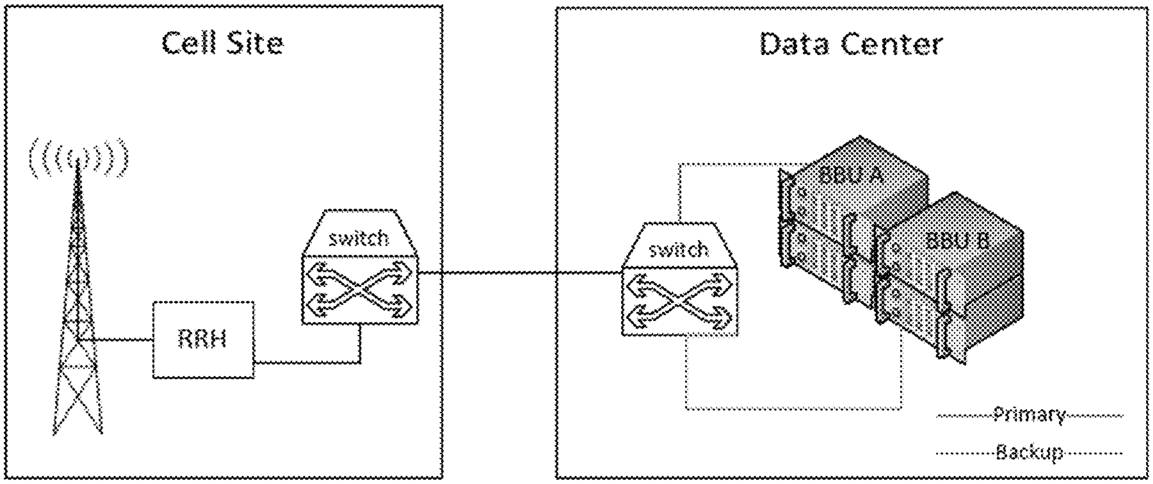
FIG. 29 is a further schematic diagram of services at a BBU, in accordance with some embodiments.

FIG. 29 is a schematic diagram of a centralized cellular radio access network architecture, in accordance with some embodiments.

Redundancy can be provided on a single compute platform (distributed BBU or virtualization host). BBU functions can be provided on a single COTS compute platform serving various RAN functionalities ranging from L1 to L3. Connected to at least one RRH, it can serve a single or multiple sectors, of the same or different RAT. In case of SW faults, redundancy can be provided using a micro-service architecture or monolithic stateless architecture, as disclosed in, e.g., U.S. Ser. No. 18/155,732, hereby incorporated by reference, in some embodiments using containers at a cloud server, which may be public cloud (e.g., AWS) or private cloud. When a crash occurs, its effect is localized and contained to the processed context, thus reducing/eliminating service disruption. PHY layer workload may be divided to workers; the division of the PHY layer can be performed per DL/UL PHY, per TTI (transport time interval), per functional block: FEC, modulator, precoding, compression, coding/decoding, etc., or by physical channel level: PDCCH/PDSCH/PRACH/PUSCH/PUCCH/PBCH, in some embodiments. The MAC layer workload may be divided to workers per cell, per direction-UL/DL, per functional block: UE selection, physical RB allocation, in some embodiments. PDCP/EGTP layer workload may be divided to workers per packet, per functionality block, packet admission, encryption, ROHC, in some embodiments. RRC layer workload may be divided to workers: Per UE, or per transaction, in some embodiments. The workloads described can be divided by a centralized BBU or other centralized node, in some embodiments, that meets the needed latency requirements.

By adopting the approach described above, we achieve better resiliency inherently. The specific implementation regarding number of workers/instances can vary: a single worker may be processing the work with another worker ready to take over in case of a fault; And/or the workload can be shared across multiple workers at runtime, such that a fault can cause a loss of processing localized by the faulty worker and yet replace the faulty worker with non to minimal delay and loss of processing. By the fact that the workload shared between workers, each worker is ready to replace faulty worker and inherently, all of the workers are redundant version of each other. The recovery takes place as soon as a backup worker steps in and can be minimized down to no service interruption.

The BBU shall log the fault occurrences to detect cross-context faults (meaning that the drop of a specific context did not recovery the system). In such a case, it will escalate the measures taken to recover from that fault. These may include the following steps (selectively or not): UE context release; Packet drop; Tunnel termination; RRC transaction release; Offload tasks to HW (encryption, FEC); Full application reset, in some embodiments.

We have contemplated the following ways to improve the resiliency in case of HW Faults:

Software (SW) backup for hardware (HW)—it's common to offload some functionalities to dedicated HW to accelerate the compute and/or reduce costs, such as: Encryption/decryption—for backhaul (BH) connectivity, PDCP functionality such as ciphering and integrity, PHY functionalities such as FEC, in some embodiments.

We have contemplated using a SW implementation of functions offloaded to HW, in some embodiments. When a fault occurs, the SW implementation for that functionality can be used, sustaining the system availability. A key requirement for such implementation is using abstraction layers capable of quickly switching to the backup instance.

Redundancy F can also be provided using clustering on BBU. A method for clustering in accordance with some embodiments follows.

Clustering

A service on a BBU is defined as the SW and HW used to realize a RAN functionality and is independent of other services which may reside on the same BBU. For instance, a service implementing a single cell is comprised of all layer applications, RRH, antenna, etc. A cluster is comprised of several BBUs capable of compensating (partially or fully in a service granularity) for each other's faults, considering various constraints—CPUs, memory, latency—and decoupled from their geographical location in relation to other BBUs in the same cluster. In some embodiments, leveraging BBU clustering is performed using a procedure that advantageously does not require any centralized entity and is based on BBU-to-BBU communication, as follows, with the following steps: i. couple primary and backup BBUs; ii. periodically synchronize backup BBUs; iii. continuous fault monitoring; iv. backup BBU fills in for primary; v. recover primary system if needed. The approach can apply to several BBUs in one cell site, or by a BBU residing in another cell-site or data center.

For coupling primary and backup BBUs—the following negotiation process shall occur for every BBU in a cluster: Each BBU shall perform this procedure with other BBUs periodically (e.g., daily, or when the cell load changes significantly, etc). The reported resources (in the negotiation reply) are a pre-defined set—such as available CPUs, memory, storage, network latency between the nodes.

The Determination circle—In some embodiments, a process shall sort the services on the BBU in order of importance, by a pre-defined metric, such as coverage/Capacity, Number of UEs, Overall TPT served by that service, Maximum geographical coverage, etc., as defined by the operator, in accordance with some embodiments. For each service, a process shall identify a suitable BBU (in terms of available resources) to act as a backup. If several BBUs qualify as a backup, the selected BBU will be the one that optimizes for the overall number of backed-up services. The process shall send that BBU a confirmation including the configuration to be initialized.

For periodically synchronize backup BBU(s): The synchronization periodicity can vary depending on the desired UE experience in a fault event. for a minimal service interruption, a TTI resolution synchronization is required.

For continuous fault monitoring: May use an active approach (faulty system instructs the backup to kick in) or a passive approach (a heartbeat mechanism—a missing heartbeat indicates a fault in primary system, implicitly causing backup to kick in).

For backup BBU(s) fill(s) in for primary: When a fault is detected, a configuration is applied to allow the backup BBU to control HW components (e.g. RRH) in the faulty cell-site, acting as the primary BBU for that site until the recovery is done. The abstraction layer can be part of the switch functionality and/or a separate load balancer.

For recover primary system (if needed): The primary system should recover and indicate to the backup system(s) it's up and running. Then it synchronizes its state and assumes control of each service from an agreed time.

For BBUs stacked in a centralized location/virtualized on the same host, the BBU serving as a backup may be a dedicated platform (basically implementing a N+1 approach in that cluster) or based on HW serving its own cell-site with adequate extra resources. This solution may be subject to increased latency/insufficient resources, resulting in a sub-optimal result—the extent of which should be determined by the CSP considering the cost of each solution. The suboptimality of the backup may be adjusted to reflect the CSPs priorities, and may include one or more of the following (This shall be given in the "negotiation confirmation" message to the backup): prioritizing the redundancy of coverage layers over capacity layers; lower number of FEC iterations; reduced number of UEs/TTI; capping of max number of PRBs; limiting max MCS (stricter % BLER target) or increasing UE TX power; reducing MIMO streams; reducing MU-MIMO capabilities; modifying PRACH configuration to reduce PRACH opportunities; modifying resource allocation in time domain (K0, K1, K2, N1, N2); selective UCI processing, relying on re-transmissions to be served; extending UCI periodicities; and/or disabling CA capabilities, in some embodiments.

The backup methods described here may be invoked intentionally, in cases such as maintenance windows, planned SW/HW rolling upgrade, etc., in some embodiments.

When using a N+1 approach, an additional functionality of AI/ML may be used to predict an expected fault, initializing the backup instance in advance to match the required configuration. Doing this will provide the 2N "Active-Active" approach benefits, while paying only the N+1 costs.

We also on the other hand have virtualized networking, in some embodiments. But how we set our product over generic COTS servers, on the level of SW architecture, benefiting in resiliency, is a key innovation of this disclosure.

Mapping workload onto workers. This disclosure describes how to do redundancy on a single platform, and then talks about how to help other platforms.

A clustering BBU process may occur as follows. Define the most atomic element as any element providing service, such as a 4G BBU. Each of 3 sectors is a 4G cell, which is an atomic element. Once atomic elements are defined, we can now negotiate with neighboring BBUs who are in a cluster. Next, Map each of its services. Next, Start the negotiation process.

Next, we can couple primary and backup BBUs (i.e., pair them together or associate them). Ex. for a BBU deployed with many services, there is no one single platform around it that will be able to process its own workload in case of a failure. Divide the workload into multiple sub-backups. In that way we are able to recover from the fault. If we can't do it even with several servers, perhaps we can relax some of the requirements so that the config might change but overall service might be mostly maintained, thus vastly improving user experience. This should virtually eliminate backup.

Next, sync state periodically (millisecond, depending on the resolution, TTI level). You can sync deltas. Not a 3GPP feature because this resolution for backup is not supported by 3GPP. A tradeoff is made (a degree of freedom is provided) between desired resolution and amount of traffic to the sync transport here. The vendor or MNO can provision this. This is relevant for different types of deployments. For example, a centralized deployment at a data center may house a bunch of BBUs. That enables extremely fast interconnection. Or with a distributed deployment you are now requiring BBUs to backup each other over backhaul and over your network backhaul, switching. This affects sync latency. These factors are considered by an operator or an automated process when determining what parameters should be set and what assumptions should be made regarding the periodicity and desired granularity of sync state.

Various methods are considered for mitigating operating latency for when the backup is swapped in, in some embodiments. U.S. Provisional Pat. App. No. 63/485,790, hereby incorporated by reference for all purposes, includes a number of approaches to minimize latency, which are all considered for this purpose, in some embodiments. Or, we can change some parameters for the service to enable it to work in some manner: autocompensation of latency, start by monitoring latency changes.

Imagine a failover from a primary to a failover, primary is on site, failover is in the data center. Each RRH and DU has its monitoring latency. When this changes we kick in one of the autocompensation mechanisms, e.g., change transmission window. ORAN standard. Delay adjustment. Defined as, when in the BBU you transmit the backhaul and when at the TX [?] you get that signal, add CPUs to the PHY at the failover, to accelerate processing to reduce latency, reducing the load, not just handling the load. Reducing MIMO layers; do selective UCI uplink control processing; rely on retransmission mechanisms that will keep you going instead, which creates more retransmissions but reduces the peak transmission level, at the system level, remote RRH, do adjustment of the processing time budget by layer. PRACH gives you Ims for the stack and Ims for the downlink, for a 4 ms budget for HARQ. But this budget can be reallocated if you have control at the system level. For the higher layers, not the radio layer, you can squeeze or stretch the time. This is all in the same context because the failover/backup BBU converges into all the same approaches that are in the remote RRH document (63/485,790).

Creating a list of workload and how to divide it among workers. This is based on the software architecture, e.g., MAC layer, per direction: UL/DL; this means 2 separate instances of MAC, one for UL and one for DL, Or, e.g., MAC layer, per cell: one instance per cell. This would be us; we are implementing this; the way we are doing it now is a monolithic architecture. Per cell in sequence. In another embodiment, option B would be multithreaded, per direction UL/DL, to enable us to parallelize UL vs DL on different threads. Could be mutex, semaphore for coordinating these. Single task queue w/workers. No need for a centralized scheduler, in typical cases redundant. We want no dependencies between these functional blocks. In some emb embodiments a monolithic architecture is enabled, in another embodiment microservices are used. Inside one platform (one BBU), data in shared memory enabling moving data among each workers. Zero copy policy for performance. This contributes to how to localize a fault because the data is already shared for the benefit of the failover.

Each BBU is a separate container, in some embodiments. Handover, etc. is handled according to 3GPP protocols. What data needs to be given from one BBU to another for failover. 3GPP doesn't define this and this is user-definable.

Determination circle. In some embodiments, determination is performed without a central coordinating server. For example, BBU A. Ask for other BBUs with capacity to backup something, anything. No disclosure of specific workload. BBUs B, C, D, E sends back a predefined report w/available CPU, memory, network latency between us. BBU A considers which other backup can handle its usage—this is distributed, as BBU A gets to make this decision without a centralized entity. Once chosen, BBU B brings up a new cell that. Predefined parameter. Important that the backup one will act exactly like the primary, how the RRH sees it and how the core sees it. The UE doesn't need to understand that the primary has changed. All parameters to allow the replica to act as the primary are transferred. Incl. encryption keys, tunnel IDs, etc.

The suboptimality of the backup may be adjusted, as it is not needed in all embodiments to be a perfect copy. PHY level, mostly stateless so not a lot of state req'd to be synced. Modifying the modem in the DL side is sufficient, in some embodiments. UL involves configuration of the blocks in the UL modem.

Stack is stateful. This is most of the benefit. Control plane sharing, not much data required to be synced. Mb/s. If you need to mirror user plane data going from the primary the secondary this would be an undesirable amount of data to be synced. Hope that TCP/IP will retransmit at the higher layer level.

This technique can be used whatever the radio access technology (RAT). It's a modem, it's blocks, from the PHY side, assuming that we don't have a latency problem and that we don't have to do a full replica. Related to actual deployments, latency is commonly a bigger problem with 3G. 3G is the most constrained in terms of latency. Given that you can compensate for latency this should work for 2G, 3G, 4G, 5G.

"Modifying resource allocation in time domain (K0, K1, K2, N1, N2)"—this allows us to compensate for time latency. Identifying crashes—this is all generic software and COTS stuff. Just need to be able to meet our backup resolution. Could be kernel level stuff.

Decomposing the BBU workload in this way enables redundancy advantages.

In terms of commercial value, we are saying we offer cluster-level tools such as backups, but not just for centralization. In this patent we are talking about bringing that benefit but not just for centralization. Decoupling the clustering aspect from the centralization aspect. We can give the benefit of uptiming your service without centralization.

Cross-site scheduling requires colocating BBUs and scheduler data sharing. But for this patent and for autocompensation, we can support deployments that are not in a centralized mode.

So we could actually just provide this redundancy functionality to anyone, as a plug and play drop-in solution, regardless of an operator's current deployment model. It turns clustering into a logical benefit.

FIG. 1 shows a schematic diagram 100 of a CU-CP Open RAN architecture, in accordance with a 5G architecture. CU-CP 103 is in communication with a plurality of DUs 102, with one or more CU-UPs 104, service management and orchestration node (SMO) 101, and AMF/SMF 105. UPF 106 is also in communication with AMF/SMF and CU-UP.

FIG. 2 shows a CU-CP internal logical architecture and internal nodes shown as microservices, in accordance with some embodiments. A variety of microservices provide the benefits of a microservices-based architecture, such as massively parallel processing, restart and management and availability, advanced monitoring, etc. This microservices architecture enables 4G and 5G, as shown, and can be readily extended to 2G and 3G as well (not shown). All of these nodes can use microservices, in some embodiments. However, although a microservice architecture provides high availability and scalability for stateless services seamlessly, it is noted that a session created on SCTP association can be lost if one of the SCTP pods (microservices) crashes and existing connection are not restored in time-bound manner.

FIG. 3 is a schematic diagram of an SCTP microservice, in accordance with some embodiments. An active-active model is shown, wherein one microservice is the primary and another microservice is the backup, with both being active and the backup ready to take over at any time.

FIG. 5 is a schematic diagram of a microservice control architecture, in accordance with some embodiments. Shown is a schematic diagram showing a pod microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod.

FIG. 7 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

FIG. 6 is a third schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interwokring processes or which may involve supporting a subset of available commands for a RAT, in some embodiments.

Network Agility

Traffic steering between two cells is known in the art. Traffic steering differs from admission control, although admission control is load balancing in a way, in that traffic steering involves redirecting UEs after they have attached to the network, whereas admission control involves rejecting UEs before they have attached to the network. Briefly, traffic steering involves transitioning a device from a first frequency to a second frequency, or from a first radio access technology (RAT) to a second RAT, or from a first network slice to another network slice, etc., without the device necessarily changing its physical location. Traffic steering works in conjunction with mobility (e.g., handover) to ensure seamless connectivity for a UE in motion and at rest, while it is in multiple operational states.

For example, in regular traffic steering, if a given UE is dragging the performance of a given cell down, traffic steering involves sending a message to steer that UE to go to another cell. This frees up the spectrum that was used by that UE. In many cases this helps a lot because that UE probably had a bad link, in which case this UE is likely to have been using a lot of spectrum. The traffic is now going from the new cell (because the traffic follows the UE), and in some cases, the UE is closer to the new cell by distance anyway. Further, the original cell gets freed up spectrum, which provides a quite huge improvement for any user on the original cell.

Advanced traffic steering in 5G is even more a part of our everyday lives, as 5G frequencies include high, mid, and low frequency bands that have significant differences in terms of coverage and capacity, with concomitant differences in their utility and applicability to different usage scenarios. 5G cells also have primary and secondary cells with dual connectivity, as well as carrier aggregation for enabling multiple carriers to be used for a given UE; each of these can also benefit from 5G traffic steering to steer (change attachment cell) for a given UE.

This works for almost any two cells. Steering is based on a range evaluation using UE measurements. However, traffic steering at a cluster level, where the target cell for traffic steering is evaluated in the context of a cluster of cells, is new. Steering is possible in this new paradigm not only to the next neighbor cell, but to second- and third-order neighbors, in some embodiments. This is called network agility traffic steering in the context of this disclosure.

In network agility traffic steering, a centralized management entity performs decision making of which UEs should use which resources throughout the cluster, taking into account load management information for the whole cluster, not just for the individual cells where steering is taking place, including load management for different frequency bands, carriers, RATs, etc. The centralized management entity also takes into account the location of the UE or at least the signal strength of the different cells as seen from the UE. The centralized management entity receives steering messages from the cells, performs assessments, and then sends messages to the cells, which are then caused to enact the centralized management entity's steering decisions by sending the appropriate traffic steering messages.

In some embodiments, a Near-RT RIC is used for management. In some embodiments, the near-RT RIC is an all-G/multi-RAT near-RT RIC, capable of handling at least 4G and 5G, and in some cases 2G/4G/5G or 2G/3G/4G/5G. This works for any 5G RRH functional split as well (e.g., Option 7.2, Option 6, Option 8). Can work for centralized or non-centralized latency networks as well.

In some embodiments, the centralized management entity performs decision making taking into account energy savings. For example, by steering traffic to a smaller number of carriers, it is possible to reduce the number of active carriers at a given time, with a large impact on power savings. This applies to RATs, frequencies, etc. as well. In some embodiments, various heuristics and algorithms, for example, those described in U.S. Pat. No. 10,420,170 (hereby incorporated by reference), could be used for reducing power.

As background, typical mobile operator networks are statically configured, and dynamic changes to the network are made to individual sectors or carriers, but not typically propagated to other divisions in the network. Traffic steering is a form of load balancing that is known in the prior art. In some cases, traffic steering involves directing a UE to move from one base station/carrier/frequency layer to another based on a traffic-related heuristic. However, it is complex to configure prior art networks to automatically perform load balancing in a holistic manner. More information about traffic steering is found below and in 3GPP TS 29.144, hereby incorporated by reference in its entirety for all purposes.

In the present application, certain ideas associated with centralization of RAN functions are adapted to enable load balancing throughout the network. This concept is called network agility. Instead of a statically configured network, an ideal network solution would have flexibility and adaptability while being able to maximize network resources. This is achieved by enabling the network to quickly adjust to network changes and to efficiently allocate cluster resources, in addition to resources of individual base stations or radios.

Certain embodiments of the present application involve the use of RAN centralization technology, e.g., technology that enables management and control of resources within an entire cluster from a single location in the network. This may be embodied in a cluster management system that takes the place of a plurality of multiple baseband units (BBUs) without coordination. This is an efficient use of physical resources as in the prior art, multiple BBUs may be physically housed in a single data center or data cabinet. By adding an intelligent coordination layer and by adding application programming interfaces (APIs) and other interfaces on top of these already-present resources, a dynamic, proactive management system is enabled.

FIG. 1 is a schematic drawing of a cellular network, in accordance with the prior art. While multiple cells are physically close to each other and may be intended to be managed as a cluster, the cluster still contains certain cells that are more heavily loaded than others. FIG. 1 uses different grayscale patterns to show load, with size of each cell shown by the visual size of the icon representing the radio.

FIG. 2 is a schematic drawing of a cellular network, in accordance with some embodiments. This figure shows active management of a cluster in such a way that each cell throughout the network is more evenly loaded.

FIG. 3 is a schematic drawing of a large cellular network separated into clusters, in accordance with some embodiments. Contiguous cells are separated into clusters.

FIG. 4 is a further schematic drawing of a cellular network separated into clusters, in accordance with some embodiments. A congested site reaches a usage threshold and an alert is triggered for a self-organizing network application. Traffic steering is performed, which is Not admission control but load balancing, e.g., if a given UE asks for more throughput, or if a given UE is dragging the cell down, how about steering that UE to go to another cell. This frees up the spectrum that was used by that UE. In many cases this helps a lot because that UE probably had a bad link and was using a lot of spectrum. The traffic is now going from the new cell because the traffic follows the UE. The original cell gets freed up spectrum, which provides a quite large improvement for almost any two cells. We know UE is in range because you have UE measurements.

FIG. 5 is a further schematic drawing of a cellular network separated into clusters, in accordance with some embodiments. The previous figure is extended by showing traffic steering at a cluster level, not only Not only to the next neighbor cell, but to second- and third-order neighbors. This results in rebalancing the entire cluster. This may be performed at the Near-RT RIC. The app may appropriately decide which UE to go where. This works for any radio access technology (e.g., 3G, 4G, 5G, etc.), any CU/DU functional split, centralized or non-centralized latency networks, etc. Implementation is performed in the RIC, in some embodiments.

FIG. 6 is a schematic drawing of a cellular network reacting to a load situation, in accordance with the prior art. The figure shows a reactive system in which the system reacts only when a given site reaches its max load, typically by aggressively load-shedding from the heavily-loaded cell site.

FIG. 7 is a schematic drawing of a cellular network reacting to a load situation, in accordance with some embodiments. Instead of waiting for a single cell to reach its maximum load, here, a 50% threshold is high enough to cause the entire cluster to rebalance itself via traffic steering.

FIG. 8 is a further schematic drawing of a cellular network reacting to a load situation, in accordance with some embodiments. The present diagram shows a further example of a proactive rebalancing network.

FIG. 9 is a further schematic drawing of a cellular network reacting to a load situation, using rebalancing to create increased capacity to enable multi-site carrier aggregation, in case of a given UE designated as eligible for more throughput, in accordance with some embodiments.

FIG. 11 is a schematic diagram of a legacy RAN deployment architecture, as known in the prior art. Radio tower 1101 is used for co-locating a 2G base station 1102, 3G base station 1103, 4G base station 1104, and 5G base station 1105, each individual RAT base station having its own radio(s) and processing. To support and enable the radios to perform their necessary functions, including PHY, MAC, backhaul, RRC, etc., several base band units (BBUs) 1106 are typically located at the base of the tower and are connected to the individual RAT base stations using a physical cable. This cable itself introduces signal loss and heat/power wastage. The BBUs themselves are expensive to purchase and deploy to the site, are expensive to operate given their need for real estate, HVAC and electrical support, and are expensive also to maintain, as a typical maintenance activity requires a dedicated truck roll to the site with a skilled technician.

FIG. 12 shows a schematic diagram of radio functional splits showing split 7.2X RU as well as other splits. The use of these functional splits is encouraged by ORAN.

When the RAN functional split architecture (FIG. 14) is fully virtualized, CU and DU functions runs as virtual software functions on standard commercial off-the-shelf (COTS) hardware and be deployed in any RAN tiered datacenter, limited by bandwidth and latency constraints.

Option 7.2 (shown) is the functional split chosen by the O-RAN Alliance for 4G and 5G. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

FIG. 13 is a schematic diagram of an Open RAN 4G/5G deployment architecture, as known in the prior art. The O-RAN deployment architecture includes an O-DU and O-RU, as described above with respect to FIG. 12, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network (not shown). Absent from the ORAN network concept is any integration of 2G, 3G. Also absent is any integration of a 2G/3G/4G DU or RU. The present application describes network agility; this is also missing from the ORAN network concept.

FIG. 14 is a first schematic diagram of a multi-RAT RAN deployment architecture, in accordance with some embodiments. FIG. 14 shows a radio tower with a remote radio head (RRH) supporting multiple RATs, 2G/3G/4G/5G, but without requiring four generations of radio base stations as shown in FIG. 11. Instead, one or more software-upgradable, remotely configurable base stations is coupled to radio heads and filters that are able to operate on the appropriate frequencies for 2G, 3G, 4G, and 5G RATs. The multiple BBUs located at the bottom of the tower in FIG. 11 have been replaced with one or more vBBUs, baseband units that are rearchitected to use modern virtualization technologies. FIG. 14 can be enabled using a technology like CPRI or eCPRI, which enables digitization and transfer of radio I/Q samples for further processing at a BBU or vBBU.

FIG. 15 is a second schematic diagram of a multi-RAT RAN deployment architecture, in accordance with some embodiments. As shown, a single RRH supports a 5G RAT with an Option 7.2 split, a 4G RAT with an Option 7.2 split, and 2G+3G with an Option 8 split. With the Option 7.2 split, the PHY is split into High PHY and Low PHY. For option 7-2, the uplink (UL), CP removal, fast Fourier transform (FFT), digital beamforming (if applicable), and prefiltering (for PRACH (Physical Random Access Channel) only) functions all occur in the RU. The rest of the PHY is processed in the DU. For the downlink (DL), the inverse FFT (IFFT), CP addition, precoding functions, and digital beamforming (if applicable) occur in the RU, and the rest of the PHY processing happens in the DU. This is the preferred ORAN split for 5G, and can also be used for 4G. For 2G+3G, an Option 8 split is preferred, where only RF will be performed at the RU and further processing (PHY/MAC/RLC/PDCP) is performed at the vBBU. This is desirable because the processing and latency requirements for 2G and 3G are lower, and are readily fulfilled by a BBU or VBBU.

Continuing with FIG. 15, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway services, may be the next destination via the backhaul connection; the HNG may disaggregate the different RAT communications to be directed to different RAT cores (i.e., a 2G core, a 3G core, a 4G core, a 5G core and so on). In some embodiments and in certain situations, an HNG may perform virtualization or interworking of aggregated communications such that, e.g., 2G communications may be interworked to 4G IP voice communications and routed through the 4G core. In some embodiments, the HNG may perform virtualization of one or more cores such that the communications may not need to terminate at a RAT-specific core; this feature may be combined with interworking in some embodiments. In some embodiments, no aggregator may be present and the vBBU may directly route communications to each RAT's individual core.

FIG. 16 is a third schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

FIG. 17 is a fourth schematic diagram of a multi-RAT RAN deployment architecture, in accordance with some embodiments. The multi-RAT CU protocol stack 701 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G.

FIG. 18 is a fifth schematic diagram of a multi-RAT RAN deployment architecture, in accordance with some embodiments. This schematic diagram shows the use of the near/non-RT RIC to provide AI/ML (artificial intelligence and machine learning) policies and enrichment across Gs. This may also involve an SMO framework that is outside of the RAN, that is interfaced through the non-RT RIC, and may also involve an external system providing enrichment data to the SMO, as well as the core network and any services thereon, in some embodiments. The all-G Non-RT RIC serves as the integration point for performing network optimizations and adjustments that take into account any offline processes for AI/ML that involve adjustments that operate outside of the UE latency window (for 4G/5G~100 ms), in some embodiments.

FIG. 19 is a schematic diagram of a multi-RAT RAN deployment in operation, in accordance with some embodiments. Diagram 1901 is a schematic diagram of users in proximity to a variety of cells, labeled coverage cells and capacity cells. Coverage cells provide users with a connection to the network that is durable, typically located at a high tower; this type of connection may not, however, enable high bandwidth given the large number of users supported at such cells. Capacity cells support a smaller number of users and use different radio technologies to enable high throughput to users. Capacity and coverage cells are enabled to trade off users as needed to maintain the needs of the network and the users as well. The diagram shows that while there are several capacity cells available in the network, they are all turned off.

Diagram 1902 is a schematic diagram of the operator network, in accordance with some embodiments. A multi-RAT vBBU is in communication with a near-RT RIC and a non-RT RIC, as well as a Parallel Wireless element management system (EMS), which provides the system with awareness about active network nodes, as well as a MANO (OSS/BSS/NFVO) for network operational capabilities. The coverage and capacity cells shown in 1901 are in communication with the all-G near-RT RIC and all-G non-RT RIC. Network functions are managed by applications, called xApps when running on the near-RT RIC and rApps when running on the non-RT RIC, and these applications are in communication with each other and aware of the network conditions through information available at the systems on which they are running.

FIG. 20 is a schematic diagram of an OpenRAN core architecture, in accordance with some embodiments. The present disclosure is enabled for use with the disclosed architecture in this figure. Various nodes, for example the CU-CP and CU-UP nodes (here marked O-CU-CP and O-CU-UP to denote OpenRAN-compatible nodes), use SCTP and may use the methods and systems described herein for SCTP high availability. The node marked "Infrastructure-COTS/White Box/Peripheral Hardware and Virtualization Layer" may, in some embodiments, use the containerized architecture described herein and may use SCTP high availability features to provide this functionality to any of the higher layers and nodes, e.g., O-XXX, Near-RT RIC, etc. of this architecture as shown in the figure, in some embodiments.

FIG. 21 shows a schematic diagram 100 of a CU-CP Open RAN architecture, in accordance with a 5G architecture. CU-CP 103 is in communication with a plurality of DUs 102, with one or more CU-UPs 104, service management and orchestration node (SMO) 101, and AMF/SMF 105. UPF 106 is also in communication with AMF/SMF and CU-UP.

FIG. 22 shows a CU-CP internal logical architecture and internal nodes shown as microservices, in accordance with some embodiments. A variety of microservices provide the benefits of a microservices-based architecture, such as massively parallel processing, restart and management and availability, advanced monitoring, etc. This microservices architecture enables 4G and 5G, as shown, and can be readily extended to 2G and 3G as well (not shown). All of these nodes can use microservices, in some embodiments. However, although a microservice architecture provides high availability and scalability for stateless services seamlessly, it is noted that a session created on SCTP association can be lost if one of the SCTP pods (microservices) crashes and existing connection are not restored in time-bound manner.

FIG. 23 is a schematic diagram of a microservice control architecture, in accordance with some embodiments. Shown is a schematic diagram showing a pod microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod. In some embodiments, an internal controller keeps track of health of some or all pods & micro services in a given namespace. As soon as any pod/container crashes, it updates the remaining pods. And takes necessary steps to bring system in workable state. In some embodiments, a database (Service registry) may act as service registry database for some or all pods and microservice in given namespace. All the pods on start-up can update required information in database & fetch required information from service registry database.

FIG. 24 is a schematic diagram of an SCTP microservice, in accordance with some embodiments. An active-active model is shown, wherein one microservice is the primary and another microservice is the backup, with both being active and the backup ready to take over at any time.

Further details regarding some embodiments may be found in U.S. Pat. App. Publication Nos. US20200045565A1 and US20200042365A1, each of which are hereby incorporated by reference in their entirety for all purposes.

This application also incorporates by reference the U.S. patent application, filed 2022 Aug. 16 with application Ser. No. 17/819,950 and title "4G/5G Open RAN CU-UP High Availability Solution"; the U.S. patent application, filed 2022 Dec. 19 with application Ser. No. 18/068,520 and title "CU-CP High Availability"; and the U.S. patent application, filed 2022 Dec. 29 with application Ser. No. 18/148,432 and title "Singleton Microservice High Availability."

Where virtualization is described herein, one having skill in the cloud technology arts would understand that a variety of technologies could be used to provide virtualization, including one or more of the following: containers, Kubernetes, Docker, hypervisors, virtual machines, hardware virtualization, microservices, AWS, Azure, etc. In a preferred embodiment, containerized microservices coordinated using Kubernetes are used to provide baseband processing for multiple RATs as deployed on the tower.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Shown above is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Shown above is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606*a*, RAN configuration module 608, and RAN proxying module 610. The ANR module 606*a* may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than SIAP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface.

The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

APPENDIX: TABLE OF REFERENCES

The following U.S. patent references are hereby incorporated by reference in their entirety for all purposes.

| | | |
|---|---|---|
| 1. U.S. Pat. No. 8,867,418B2 | 2. U.S. Pat. No. 8,879,416B2 | 3. U.S. Pat. No. 9,113,352B2 |
| 4. U.S. Pat. No. 9,232,547B2 | 5. US20140133456A1 | 6. US20150094114A1 |
| 7. US20150098385A1 | 8. US20150098387A1 | 9. US20150257051A1 |
| 10. US20160044531A1 | 11. US20160135132A1 | 12. US20170013513A1 |
| 13. US20170019375A1 | 14. US20170026845A1 | 15. US20170048710A1 |
| 16. US20170055186A1 | 17. US20170064621A1 | 18. US20170070436A1 |
| 19. US20170077979A1 | 20. US20170111482A1 | 21. US20170127409A1 |
| 22. US20170171828A1 | 23. US20170181119A1 | 24. US20170202006A1 |
| 25. US20170208560A1 | 26. US20170238278A1 | 27. US20170257133A1 |
| 28. US20170272330A1 | 29. US20170273134A1 | 30. US20170288813A1 |
| 31. US20170295510A1 | 32. US20170303163A1 | 33. US20170347307A1 |
| 34. US20180123950A1 | 35. US20180152865A1 | 36. US20210045193A1 |
| 37. US20210176823A1 | 38. US20210243156A1 | 39. US20210306899A1 |
| 40. US20210289433A1 | | |

This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

Although the above systems and methods are described in reference to 3GPP, one of skill in the art would understand that these systems and methods could be adapted for use with other wireless standards or versions thereof.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

This application hereby incorporates by reference in their entirety for all purposes the U.S. patent application, filed Feb. 11, 2023 under U.S. provisional patent application No. 63/484,485 and titled "Cluster level approach for RAN user scheduling"; the U.S. patent application, filed Feb. 17, 2023 under U.S. provisional patent application No. 63/485,790 and titled "Dynamic latency compensation and packet security for RAN transport"; the U.S. patent application, filed Feb. 27, 2023 under U.S. provisional patent application No. 63/487,245 and titled "Cluster level approach for RAN user scheduling"; the U.S. patent application, U.S. provisional patent application No. 63/493,599, filed Mar. 31, 2023, and titled "Cluster Level Approach for RAN Application Redundancy and Resiliency"; the U.S. patent application, titled "Coherence Time-Based Scheduling".

Figure 30:
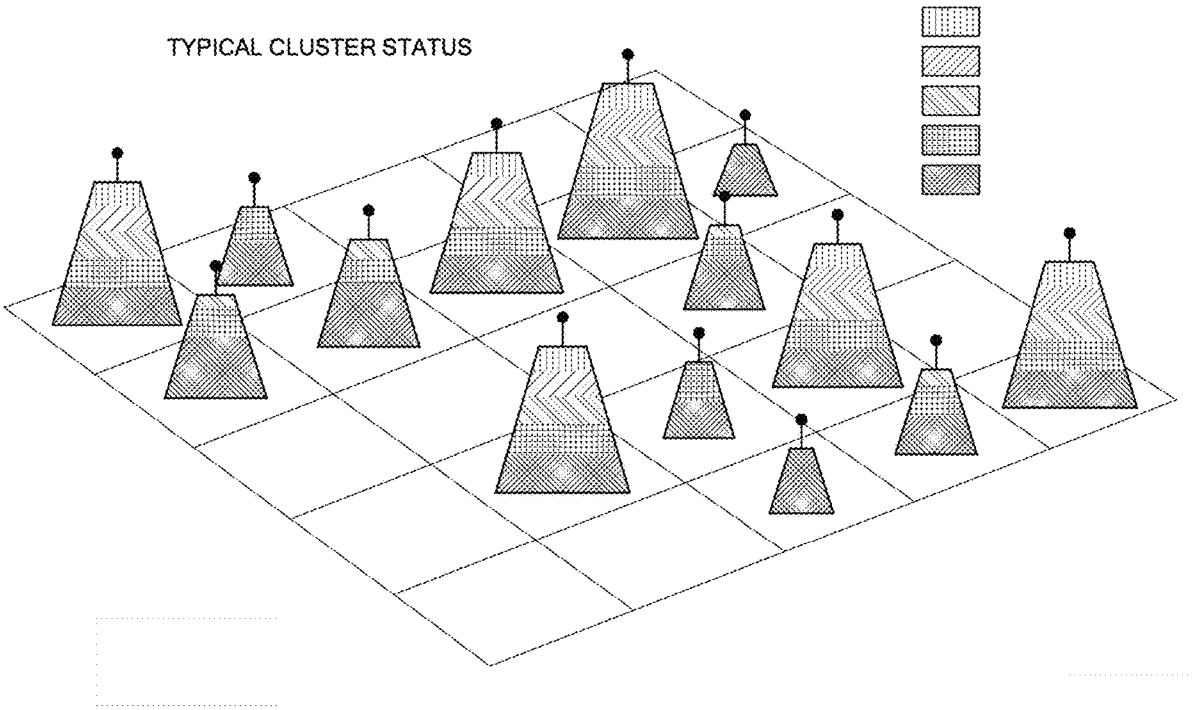
FIG. 30 is a schematic drawing of a cellular network, in accordance with the prior art.

FIG. 30 is a schematic drawing of a cellular network, in accordance with the prior art. While multiple cells are physically close to each other and may be intended to be managed as a cluster, the cluster still contains certain cells that are more heavily loaded than others. FIG. 1 uses different grayscale patterns to show load, with size of each cell shown by the visual size of the icon representing the radio.

Figure 31:
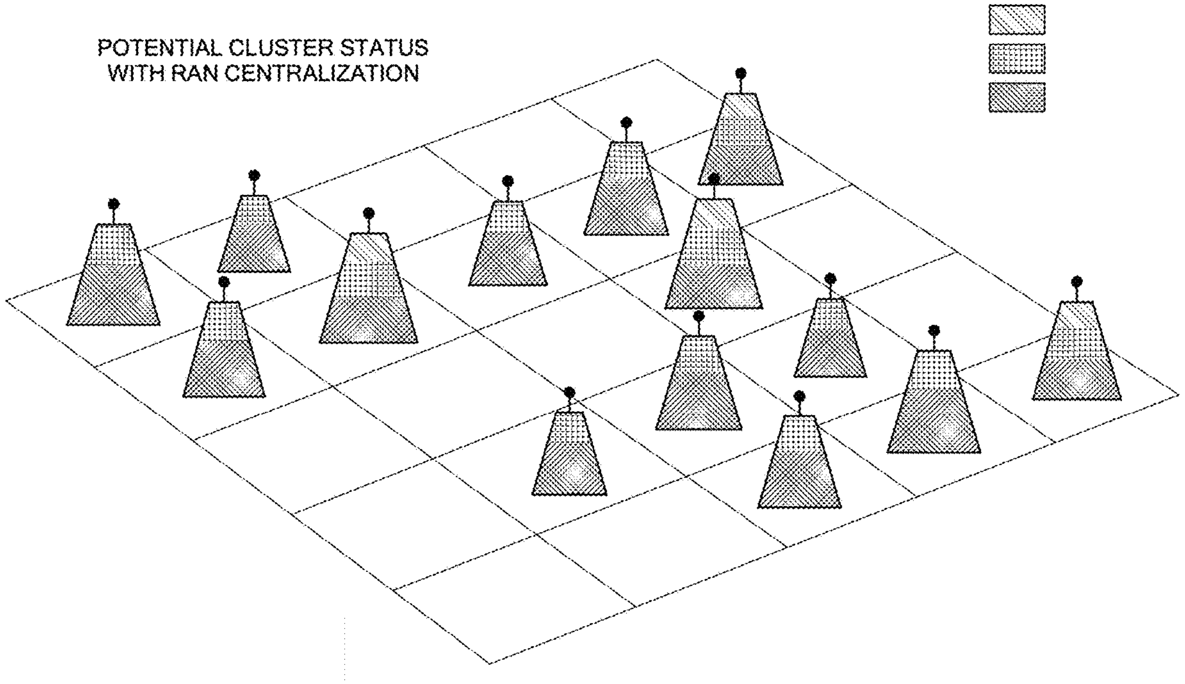
FIG. 31 is a schematic drawing of a cellular network, in accordance with some embodiments.

FIG. 31 is a schematic drawing of a cellular network, in accordance with some embodiments. This figure shows active management of a cluster in such a way that each cell throughout the network is more evenly loaded.

Figure 32:
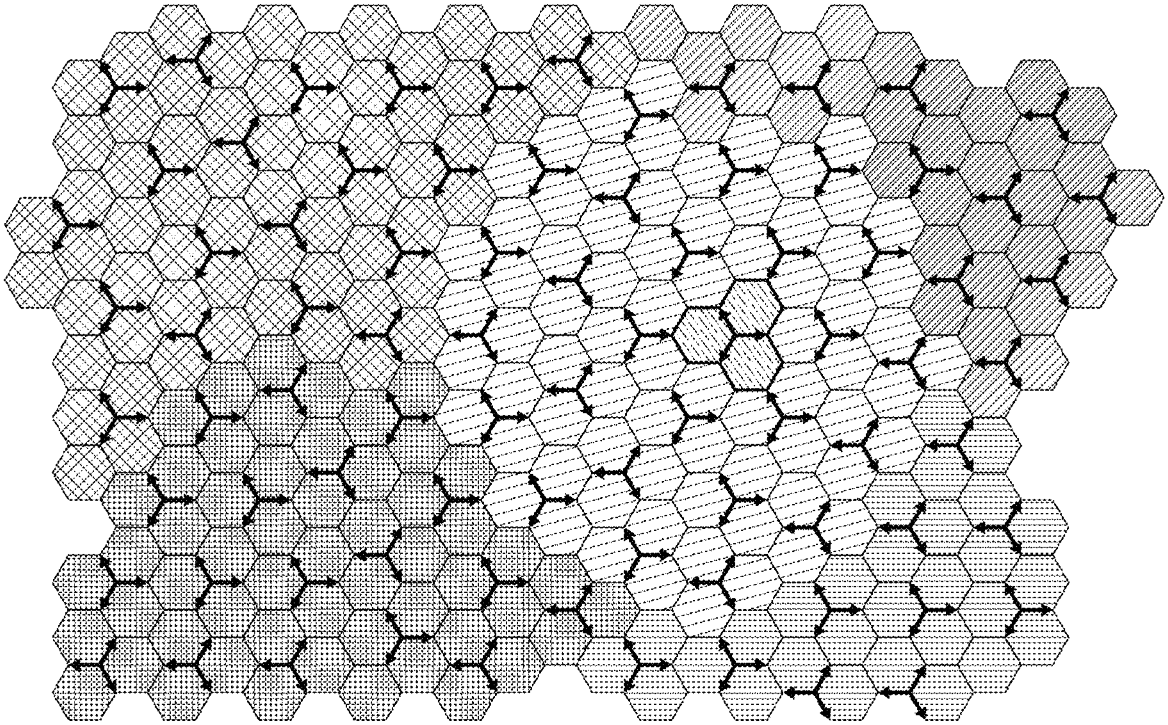
FIG. 32 is a schematic drawing of a large cellular network separated into clusters, in accordance with some embodiments.

FIG. 32 is a schematic drawing of a large cellular network separated into clusters, in accordance with some embodiments. Contiguous cells are separated into clusters.

Figure 33:
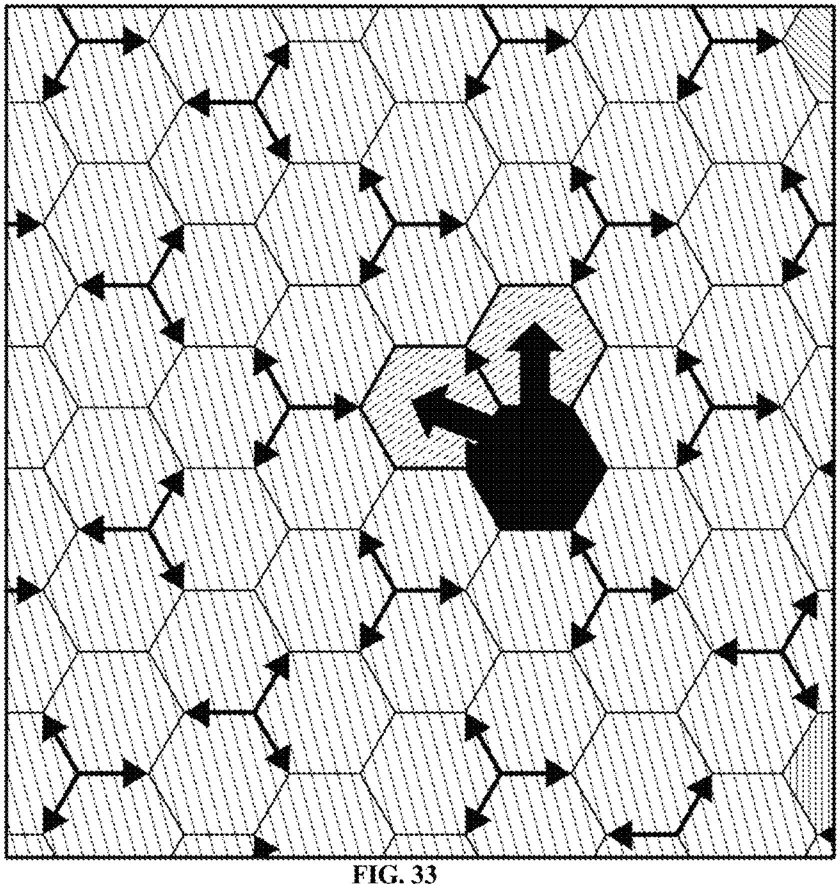
FIG. 33 is a further schematic drawing of a cellular network separated into clusters, in accordance with some embodiments.

FIG. 33 is a further schematic drawing of a cellular network separated into clusters, in accordance with some embodiments. A congested site reaches a usage threshold and an alert is triggered for a self-organizing network application. Traffic steering is performed, which is Not admission control but load balancing, e.g., if a given UE asks for more throughput, or if a given UE is dragging the cell down, how about steering that UE to go to another cell. This frees up the spectrum that was used by that UE. In many cases this helps a lot because that UE probably had a bad link and was using a lot of spectrum. The traffic is now going from the new cell because the traffic follows the UE. The original cell gets freed up spectrum, which provides a quite large improvement for almost any two cells. We know UE is in range because you have UE measurements.

Figure 34:
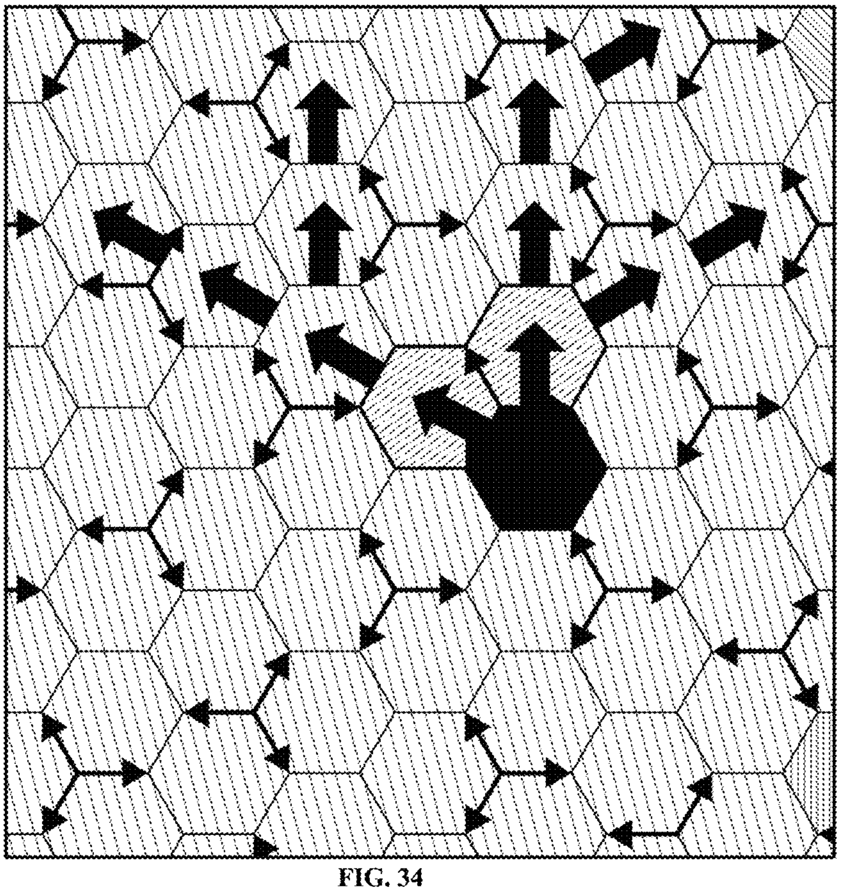
FIG. 34 is a further schematic drawing of a cellular network separated into clusters, in accordance with some embodiments.

FIG. 34 is a further schematic drawing of a cellular network separated into clusters, in accordance with some embodiments. The previous figure is extended by showing traffic steering at a cluster level, not only Not only to the next neighbor cell, but to second- and third-order neighbors. This results in rebalancing the entire cluster. This may be performed at the Near-RT RIC. The app may appropriately decide which UE to go where. This works for any radio access technology (e.g., 3G, 4G, 5G, etc.), any CU/DU functional split, centralized or non-centralized latency networks, etc. Implementation is performed in the RIC, in some embodiments.

Figure 35:
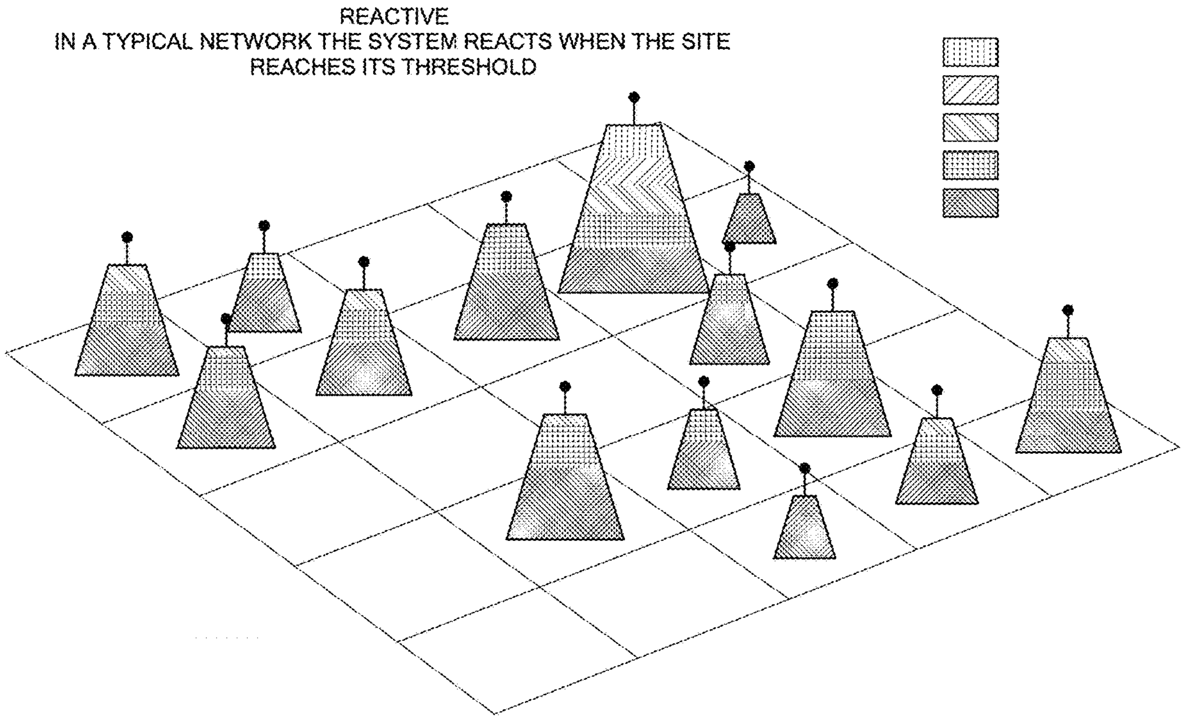
FIG. 35 is a schematic drawing of a cellular network reacting to a load situation, in accordance with the prior art.

FIG. 35 is a schematic drawing of a cellular network reacting to a load situation, in accordance with the prior art. The figure shows a reactive system in which the system reacts only when a given site reaches its max load, typically by aggressively load-shedding from the heavily-loaded cell site.

Figure 36:
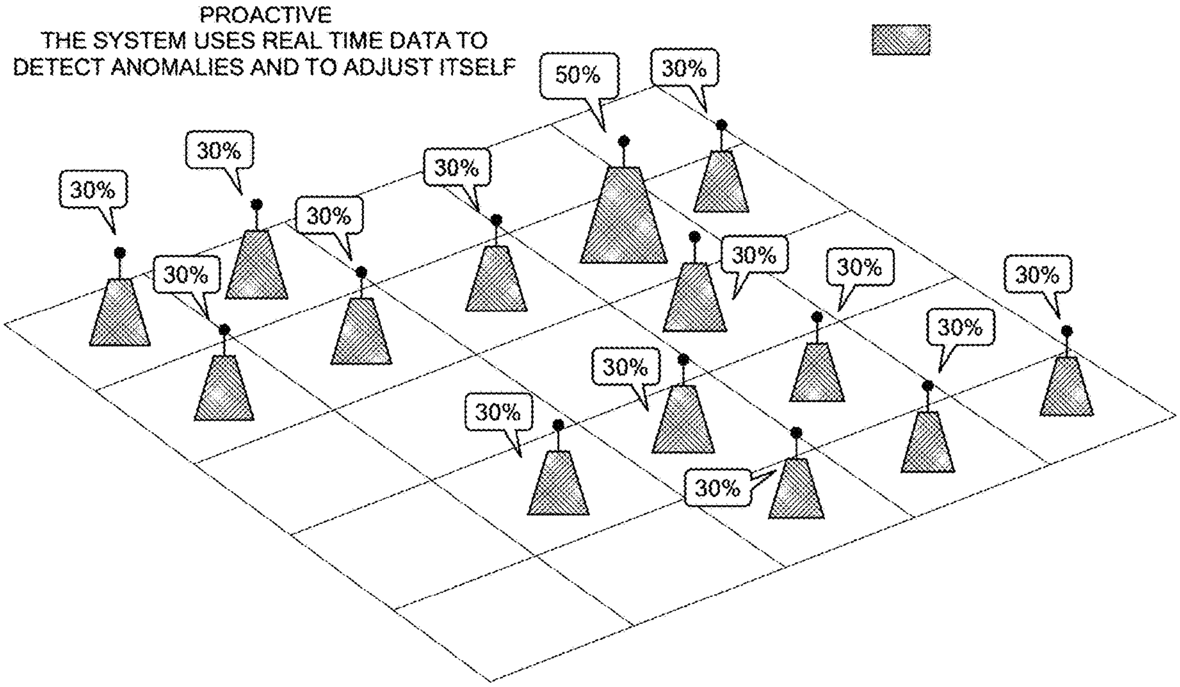
FIG. 36 is a schematic drawing of a cellular network reacting to a load situation, in accordance with some embodiments.

FIG. 36 is a schematic drawing of a cellular network reacting to a load situation, in accordance with some embodiments. Instead of waiting for a single cell to reach its maximum load, here, a 50% threshold is high enough to cause the entire cluster to rebalance itself via traffic steering.

Figure 37:
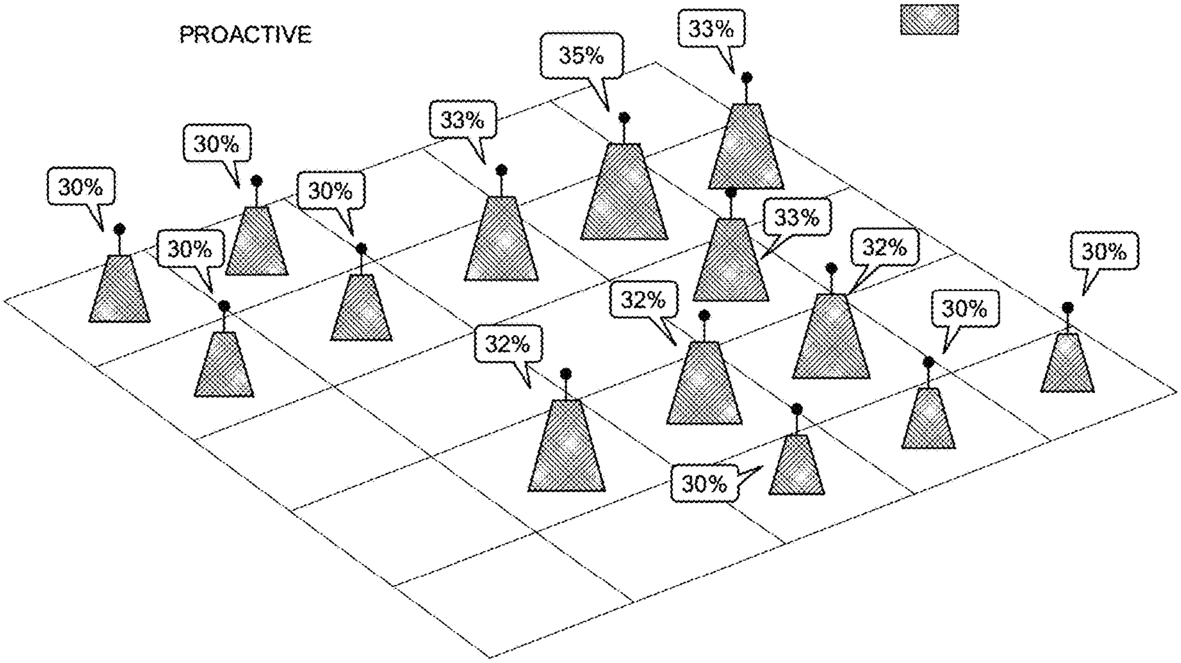
FIG. 37 is a further schematic drawing of a cellular network reacting to a load situation, in accordance with some embodiments.

FIG. 37 is a further schematic drawing of a cellular network reacting to a load situation, in accordance with some embodiments. The present diagram shows a further example of a proactive rebalancing network.

Figure 38:
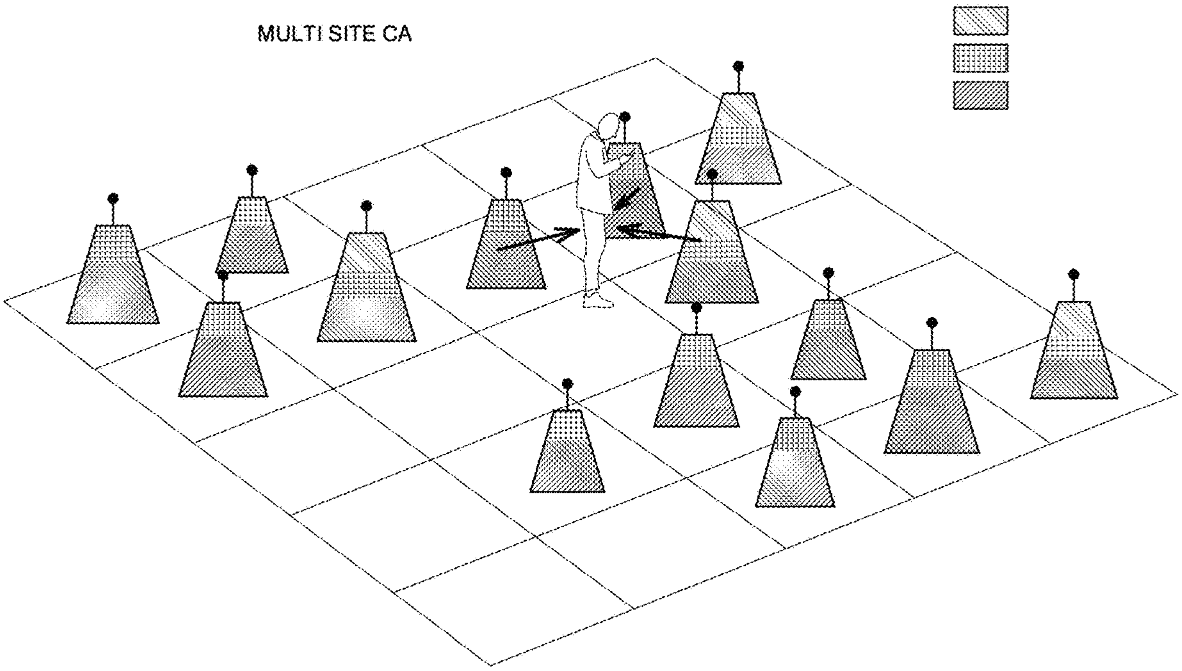
FIG. 38 is a further schematic drawing of a cellular network reacting to a load situation, in accordance with some embodiments.

FIG. 38 is a further schematic drawing of a cellular network reacting to a load situation, using rebalancing to create increased capacity to enable multi-site carrier aggregation, in case of a given UE designated as eligible for more throughput, in accordance with some embodiments.

FIG. 39 is a schematic diagram of a legacy RAN deployment architecture, as known in the prior art. Radio tower 3901 is used for co-locating a 2G base station 3902, 3G base station 3903, 4G base station 3904, and 5G base station 3905, each individual RAT base station having its own radio(s) and processing. To support and enable the radios to perform their necessary functions, including PHY, MAC, backhaul, RRC, etc., several base band units (BBUs) 3906 are typically located at the base of the tower and are connected to the individual RAT base stations using a physical cable. This cable itself introduces signal loss and heat/power wastage. The BBUs themselves are expensive to purchase and deploy to the site, are expensive to operate given their need for real estate, HVAC and electrical support, and are expensive also to maintain, as a typical maintenance activity requires a dedicated truck roll to the site with a skilled technician.

FIG. 40 shows a schematic diagram of radio functional splits showing split 7.2X RU as well as other splits. The use of these functional splits is encouraged by ORAN.

5G New Radio (NR) was designed to allow for disaggregating the baseband unit (BBU) by breaking off functions beyond the Radio Unit (RU) into Distributed Units (DUs) and Centralized Units (CUs), which is called a functional split architecture. This concept has been extended to 4G as well.

RU: This is the radio hardware unit that coverts radio signals sent to and from the antenna into a digital signal for transmission over packet networks. It handles the digital front end (DFE) and the lower PHY layer, as well as the digital beamforming functionality. 5G RU designs are supposed to be inherently intelligent, but the key considerations of RU design are size, weight, and power consumption. Deployed on site.

DU: The distributed unit software that is deployed on site on a COTS server. DU software is normally deployed close to the RU on site and it runs the RLC, MAC, and parts of the PHY layer. This logical node includes a subset of the eNodeB (eNB)/gNodeB (gNB) functions, depending on the functional split option, and its operation is controlled by the CU.

CU: The centralized unit software that runs the Radio Resource Control (RRC) and Packet Data Convergence Protocol (PDCP) layers. The gNB consists of a CU and one DU connected to the CU via Fs-C and Fs-U interfaces for CP and UP respectively. A CU with multiple DUs will support multiple gNBs. The split architecture lets a 5G network utilize different distributions of protocol stacks between CU and DUs depending on midhaul availability and network design. It is a logical node that includes the gNB functions like transfer of user data, mobility control, RAN sharing (MORAN), positioning, session management etc., except for functions that are allocated exclusively to the DU. The CU controls the operation of several DUs over the midhaul interface. CU software can be co-located with DU software on the same server on site.

When the RAN functional split architecture (FIG. 42) is fully virtualized, CU and DU functions runs as virtual software functions on standard commercial off-the-shelf (COTS) hardware and be deployed in any RAN tiered datacenter, limited by bandwidth and latency constraints.

Option 7.2 (shown) is the functional split chosen by the O-RAN Alliance for 4G and 5G. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

FIG. 41 is a schematic diagram of an Open RAN 4G/5G deployment architecture, as known in the prior art. The O-RAN deployment architecture includes an O-DU and O-RU, as described above with respect to FIG. 40, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network (not shown). Absent from the ORAN network concept is any integration of 2G, 3G. Also absent is any integration of a 2G/3G/4G DU or RU. The present application describes network agility; this is also missing from the ORAN network concept.

FIG. 42 is a first schematic diagram of a multi-RAT RAN deployment architecture, in accordance with some embodiments. FIG. 42 shows a radio tower with a remote radio head (RRH) supporting multiple RATs, 2G/3G/4G/5G, but without requiring four generations of radio base stations as shown in FIG. 39. Instead, one or more software-upgradable, remotely configurable base stations is coupled to radio heads and filters that are able to operate on the appropriate frequencies for 2G, 3G, 4G, and 5G RATs. The multiple BBUs located at the bottom of the tower in FIG. 39 have been replaced with one or more vBBUs, baseband units that are rearchitected to use modern virtualization technologies. FIG. 42 can be enabled using a technology like CPRI or eCPRI, which enables digitization and transfer of radio I/Q samples for further processing at a BBU or vBBU.

Where virtualization is described herein, one having skill in the cloud technology arts would understand that a variety of technologies could be used to provide virtualization, including one or more of the following: containers, Kubernetes, Docker, hypervisors, virtual machines, hardware virtualization, microservices, AWS, Azure, etc. In a preferred embodiment, containerized microservices coordinated using Kubernetes are used to provide baseband processing for multiple RATs as deployed on the tower.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware.

FIG. 43 is a second schematic diagram of a multi-RAT RAN deployment architecture, in accordance with some embodiments. As shown, a single RRH supports a 5G RAT with an Option 7.2 split, a 4G RAT with an Option 7.2 split, and 2G+3G with an Option 8 split. With the Option 7.2 split, the PHY is split into High PHY and Low PHY. For option 7.2, the uplink (UL), CP removal, fast Fourier transform (FFT), digital beamforming (if applicable), and prefiltering (for PRACH (Physical Random Access Channel) only) functions all occur in the RU. The rest of the PHY is processed in the DU. For the downlink (DL), the inverse FFT (IFFT), CP addition, precoding functions, and digital beamforming (if applicable) occur in the RU, and the rest of the PHY processing happens in the DU. This is the preferred ORAN split for 5G, and can also be used for 4G. For 2G+3G, an Option 8 split is preferred, where only RF will be performed at the RU and further processing (PHY/MAC/RLC/PDCP) is performed at the vBBU. This is desirable because the processing and latency requirements for 2G and 3G are lower, and are readily fulfilled by a BBU or VBBU.

Continuing with FIG. 43, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway services, may be the next destination via the backhaul connection; the HNG may disaggregate the different RAT communications to be directed to different RAT cores (i.e., a 2G core, a 3G core, a 4G core, a 5G core and so on). In some embodiments and in certain situations, an HNG may perform virtualization or interworking of aggregated communications such that, e.g., 2G communications may be interworked to 4G IP voice communications and routed through the 4G core. In some embodiments, the HNG may perform virtualization of one or more cores such that the communications may not need to terminate at a RAT-specific core; this feature may be combined with interworking in some embodiments. In some embodiments, no aggregator may be present and the vBBU may directly route communications to each RAT's individual core.

FIG. 44 is a third schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interwokring processes or which may involve supporting a subset of available commands for a RAT, in some embodiments.

FIG. 45 is a fourth schematic diagram of a multi-RAT RAN deployment architecture, in accordance with some embodiments. The multi-RAT CU protocol stack 701 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G.

FIG. 46 is a fifth schematic diagram of a multi-RAT RAN deployment architecture, in accordance with some embodiments. This schematic diagram shows the use of the near/non-RT RIC to provide AI/ML (artificial intelligence and machine learning) policies and enrichment across Gs. This may also involve an SMO framework that is outside of the RAN, that is interfaced through the non-RT RIC, and may also involve an external system providing enrichment data to the SMO, as well as the core network and any services thereon, in some embodiments. The all-G Non-RT RIC serves as the integration point for performing network optimizations and adjustments that take into account any offline processes for AI/ML that involve adjustments that operate outside of the UE latency window (for 4G/5G~100 ms), in some embodiments.

FIG. 47 is a schematic diagram of a multi-RAT RAN deployment in operation, in accordance with some embodiments. Diagram 1901 is a schematic diagram of users in proximity to a variety of cells, labeled coverage cells and capacity cells. Coverage cells provide users with a connection to the network that is durable, typically located at a high tower; this type of connection may not, however, enable high bandwidth given the large number of users supported at such cells. Capacity cells support a smaller number of users and use different radio technologies to enable high throughput to users. Capacity and coverage cells are enabled to trade off users as needed to maintain the needs of the network and the users as well. The diagram shows that while there are several capacity cells available in the network, they are all turned off.

Diagram 1902 is a schematic diagram of the operator network, in accordance with some embodiments. A multi-RAT vBBU is in communication with a near-RT RIC and a non-RT RIC, as well as a Parallel Wireless element management system (EMS), which provides the system with awareness about active network nodes, as well as a MANO (OSS/BSS/NFVO) for network operational capabilities. The coverage and capacity cells shown in 1901 are in communication with the all-G near-RT RIC and all-G non-RT RIC. Network functions are managed by applications, called xApps when running on the near-RT RIC and rApps when running on the non-RT RIC, and these applications are in communication with each other and aware of the network conditions through information available at the systems on which they are running.

In operation, for some embodiments, for example, when a coverage cell is heavily loaded, an rApp on the non-RT RIC and an xApp on the near-RT RIC coordinate to identify a mitigation, which can include identifying an appropriate capacity cell to activate; activating the cell; and handing over users from the coverage cell to the newly active cell. In another example, in some embodiments, in the case that admission control is identified as causing too many users to be admitted to the network at the same time, throttling may be performed. Monitoring of network load and a subsequent instruction to perform throttling may be initiated at the near-RT RIC using an xApp, in some embodiments. This may be a multi-RAT activity and this may involve monitoring of network load for a first RAT and an instruction to perform throttling for a second RAT, in some embodiments.

FIG. 48 shows a schematic diagram 4800 of a CU-CP Open RAN architecture, in accordance with a 5G architecture. CU-CP 4803 is in communication with a plurality of DUs 4802, with one or more CU-UPs 4804, service management and orchestration node (SMO) 4801, and AMF/SMF 4805. UPF 4806 is also in communication with AMF/SMF and CU-UP.

FIG. 49 shows a CU-CP internal logical architecture and internal nodes shown as microservices, in accordance with some embodiments. A variety of microservices provide the benefits of a microservices-based architecture, such as massively parallel processing, restart and management and availability, advanced monitoring, etc. This microservices architecture enables 4G and 5G, as shown, and can be readily extended to 2G and 3G as well (not shown). All of these nodes can use microservices, in some embodiments. However, although a microservice architecture provides high availability and scalability for stateless services seamlessly, it is noted that a session created on SCTP association can be lost if one of the SCTP pods (microservices) crashes and existing connection are not restored in time-bound manner.

FIG. 50 is a schematic diagram of a microservice control architecture, in accordance with some embodiments. Shown is a schematic diagram showing a pod microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod. In some embodiments, an internal controller keeps track of health of some or all pods & micro services in a given namespace. As soon as any pod/container crashes, it updates the remaining pods. And takes necessary steps to bring system in workable state. In some embodiments, a database (Service registry) may act as service registry database for some or all pods and microservice in given namespace. All the pods on start-up can update required information in database & fetch required information from service registry database.

FIG. 51 is a schematic diagram of an SCTP microservice, in accordance with some embodiments. An active-active model is shown, wherein one microservice is the primary and another microservice is the backup, with both being active and the backup ready to take over at any time.

Additional Embodiments

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to 3GPP, one of skill in the art would understand that these systems and methods could be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 or ARM microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality. Where the term "all-G" is used herein, it is understood to mean multi-RAT (having at least two radio access technologies).

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing workload redundancy in a virtualized radio access network (RAN), comprising:
- distributing a baseband workload from a plurality of cells onto a first virtualized baseband unit (vBBU) at a centralized site;
- provisioning a second vBBU as a redundant vBBU for the plurality of cells;
- synchronizing state from the first vBBU to the second vBBU according to a first periodicity;
- performing failover from the first vBBU to the second vBBU at a first time; and
- adjusting an operating latency during the performed failover such that the plurality of cells continues operation without an interruption of service.

2. The method of claim 1, wherein the distributed baseband workload includes a PHY workload and a stack workload for each of the plurality of cells.

3. The method of claim 1, wherein synchronizing state further comprises synchronizing deltas.

4. The method of claim 1, wherein synchronizing state further comprises synchronizing at a 1 transport time interval (TTI) resolution.

5. The method of claim 1, wherein adjusting an operating latency further comprises adjusting one or more of: a transmission window; a delay adjustment; a number of processing units assigned to PHY processing; a number of processing units assigned to stack processing; performing load shedding; reducing supported multiple-in multiple-out (MIMO) layers; performing selective uplink control processing; increasing a number of retransmission; and changing a ratio of time allocated for stack processing versus PHY processing.

6. The method of claim 1, further comprising restoring service from the second vBBU to the the first vBBU at a second time.

7. The method of claim 1, further comprising maintaining a redundant vBBU for a plurality of primary vBBUs.

* * * * *